US008589961B2

(12) United States Patent
Takasawa et al.

(10) Patent No.: US 8,589,961 B2
(45) Date of Patent: Nov. 19, 2013

(54) DISC CHANGER FOR DIVERSE RECORDING MEDIA

(75) Inventors: Takeharu Takasawa, Kanagawa (JP); Takeshi Kubo, Kanagawa (JP); Naofumi Goto, Kanagawa (JP); Akira Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 13/113,156

(22) Filed: May 23, 2011

(65) Prior Publication Data

US 2011/0296445 A1     Dec. 1, 2011

(30) Foreign Application Priority Data

May 28, 2010  (JP) ................................ P2010-123337
Nov. 9, 2010   (JP) ................................ P2010-251269

(51) Int. Cl.
*G11B 17/04* (2006.01)

(52) U.S. Cl.
USPC ............... 720/615; 369/30.68; 369/30.83; 369/30.84

(58) Field of Classification Search
USPC .............. 720/612, 615, 616, 626, 640, 645; 369/30.45, 30.57, 30.47, 30.59, 30.67, 369/30.78–30.8, 30.83, 30.42, 30.66–30.68, 369/30.72; 700/213–244
See application file for complete search history.

(56) References Cited

U.S. PATENT DOCUMENTS

| | | | | | |
|---|---|---|---|---|---|
| 4,561,078 | A | * | 12/1985 | Nakayama | 369/30.78 |
| 4,701,899 | A | * | 10/1987 | d'Alayer de Costemor d'Arc | 369/30.78 |
| 5,210,728 | A | * | 5/1993 | Noguchi et al. | 369/30.78 |
| 5,384,760 | A | * | 1/1995 | Kumakura | 369/30.78 |
| 5,502,697 | A | * | 3/1996 | Taki | 369/30.33 |
| 5,680,375 | A | * | 10/1997 | Christie et al. | 369/30.45 |
| 5,970,043 | A | * | 10/1999 | Fujisawa | 720/714 |
| 2007/0130579 | A1 | * | 6/2007 | Owens et al. | 720/718 |
| 2007/0211581 | A1 | * | 9/2007 | Yoshida et al. | 369/30.85 |

FOREIGN PATENT DOCUMENTS

JP          08-297905 A     11/1996

* cited by examiner

*Primary Examiner* — Brian Miller
*Assistant Examiner* — Adam B Dravininkas
(74) *Attorney, Agent, or Firm* — Sony Corporation

(57) ABSTRACT

A disc changer includes: a disc cartridge having a case body in which a plurality of disc-shaped recording media are storable by being arrayed in the axial direction of the center axis, and an information input medium to which at least information relating to pitch between disc-shaped recording media and the number of stored disc-shaped recording media is input; a disc holder configured to hold the disc cartridge, a portion of which is moveable in the center axial direction of the disc-shaped recording media; and a movement mechanism including an encoder, configured to determine a stop position in the center axial direction of the disc holder based on information input to the information input medium.

15 Claims, 43 Drawing Sheets

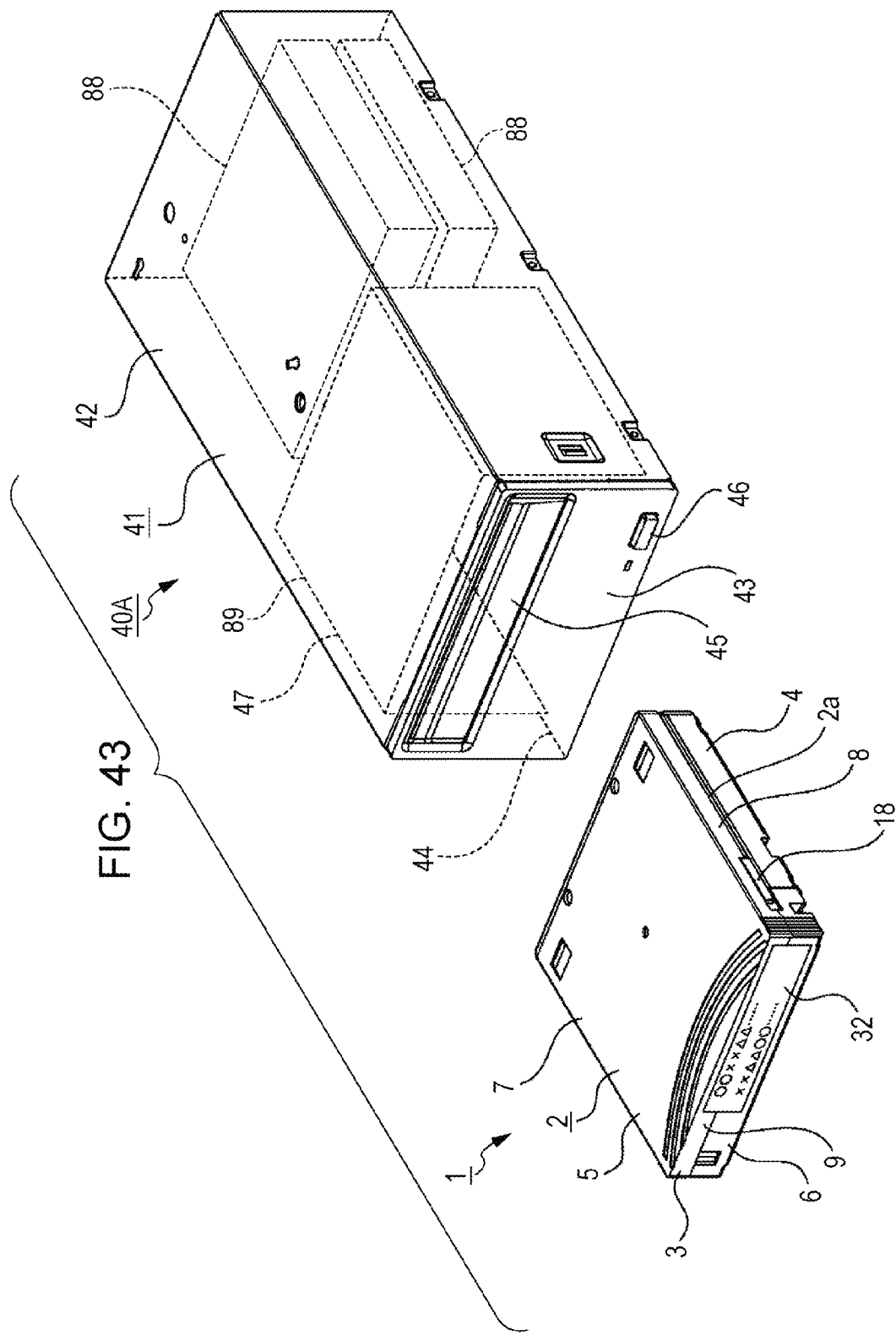

DISC CHANGER FOR DIVERSE RECORDING MEDIA

BACKGROUND OF THE INVENTION

1. Field of the Invention

The present invention relates to a technical field regarding disc changers, and more specifically relates to a technical field for determining the stop position of a disc holder which holds a disc cartridge having an information input medium based on information input to the information input medium, thereby realizing improvement in versatility.

2. Description of the Related Art

There is a disc charger wherein multiple disc-shaped recording media are storable within a disc cartridge by being arrayed in the axial direction of the center axis, a desired disc-shaped recording medium is ejected from the disc cartridge, whereby recording or playback of information signals as to this disc-shaped recording medium can be performed at a drive unit.

With such a disc changer may, in order to move a disc-shaped recording medium to a predetermined stop position as to the drive unit, there may be provided a movement mechanism for moving the disc-shaped recording medium to the axial direction (see Japanese Unexamined Patent Application Publication No. 8-297905).

SUMMARY OF THE INVENTION

However, the disc changer described in Japanese Unexamined Patent Application Publication No. 8-297905 is not configured to move a disc-shaped recording medium to a suitable stop position according to difference of the types of disc-shaped recording media or the types of disc cartridges in which disc-shaped recording media are stored, e.g., according to difference of the thicknesses or the numbers of stored disc-shaped recording media.

Accordingly, only a predetermined type of disc-shaped recording media or disc cartridges can be employed, which results in a problem wherein versatility is poor.

It has been found desirable to enable movement operation corresponding to the type of a disc-shaped recording medium, or the type of a disc cartridge, thereby realizing improvement in versatility.

A disc changer according to an embodiment of the present invention includes: a disc cartridge having a case body in which a plurality of disc-shaped recording media are storable by being arrayed in the axial direction of the center axis, and an information input medium to which at least information relating to pitch between disc-shaped recording media and the number of stored disc-shaped recording media is input; a disc holder configured to hold the disc cartridge, a portion of which is moveable in the center axial direction of the disc-shaped recording media; and a movement mechanism including an encoder, configured to determine a stop position in the center axial direction of the disc holder based on information input to the information input medium.

Accordingly, with the disc changer, the disc holder is moved by the movement mechanism based on information input to the information input medium of the disc cartridge held in the disc holder.

A predetermined position in the movement direction of the disc cartridge or the disc holder may be determined as an initial position in the movement direction of the disc holder.

A predetermined position in the movement direction of the disc cartridge or disc holder is determined as the initial position in the movement direction of the disc holder, thereby facilitating detection of the initial position.

One of edge faces in the movement direction of the disc cartridge may be determined as the initial position.

One of edge faces in the movement direction of the disc cartridge is determined as the initial position, thereby further facilitating detection of the initial position.

The disc cartridge may be inserted into and held at the disc holder; with scanning of information input to the information input medium being performed when the disc cartridge is inserted into and held at the disc holder.

Scanning of information input to the information input medium is performed when the disc cartridge is inserted into and held at the disc holder, whereby holding of the disc cartridge by the disc holder, and scanning of information input to the information input medium are performed at the same time.

An information input sheet may be adhered to the surface of the case body of the disc cartridge as the information input medium.

The information input sheet is adhered to the surface of the case body of the disc cartridge as the information input medium, whereby the information input medium is disposed on the surface of the case body.

There may be provided a holder movement portion where the disc holder is moved to at least the center axial direction; and a plurality of drive units where a plurality of the disc-shaped recording media stored in the disc cartridge held in the disc holder which is moved in the holder movement portion are ejected in a direction orthogonal to the center axial direction from the disc cartridge, and are mounted thereupon; wherein different types of the disc-shaped recording media are storable in the disc cartridge, and the plurality of drive units are each taken as different types according to different types of the disc-shaped recording media, and also disposed arrayed in the center axial direction; and wherein each of the plurality of disc-shaped recording media is mounted on a predetermined the drive unit based on information input to the information input medium.

Each of the multiple disc-shaped recording media is configured so as to be mounted on a predetermined drive unit based on information input to the information input medium, whereby recording or playback can be performed as to multiple types of disc shaped recording media at the disc changer.

A disc changer according to an embodiment of the present invention includes: a disc cartridge having a case body in which a plurality of disc-shaped recording media are storable by being arrayed in the axial direction of the center axis, and an information input medium to which at least information relating to pitch between disc-shaped recording media and the number of stored disc-shaped recording media is input; a disc holder configured to hold the disc cartridge, a portion of which is moveable in the center axial direction of the disc-shaped recording media; and a movement mechanism including an encoder, configured to determine a stop position in the center axial direction of the disc holder based on information input to the information input medium.

Accordingly, the disc-shaped recording media can be moved to a suitable stop position according to difference of the thicknesses or the number of stored disc-shaped recording media, and movement operation according to the types of the disc-shaped recording media or disc cartridges is enabled, whereby improvement in versatility can be realized.

A predetermined position in the movement direction of the disc cartridge or the disc holder may be determined as an initial position in the movement direction of the disc holder.

Accordingly, detection of the initial position can readily be performed, and also the initial position can accurately be detected.

One of edge faces in the movement direction of the disc cartridge may be determined as the initial position.

Accordingly, detection of the initial position can further readily be performed, and also the stop position of the disc holder can accurately be calculated.

The disc cartridge may be inserted into and held at the disc holder, with scanning of information input to the information input medium being performed when the disc cartridge is inserted into and held at the disc holder.

Accordingly, scanning of information can be performed at the optimal position and optimal point-in-time.

An information input sheet may be adhered to the surface of the case body of the disc cartridge as the information input medium.

Accordingly, scanning of information can be performed by a simple mechanism without leading to runaway growth of manufacturing costs.

There may be provided a holder movement portion where the disc holder is moved to at least the center axial direction; and a plurality of drive units where a plurality of the disc-shaped recording media stored in the disc cartridge held in the disc holder which is moved in the holder movement portion are ejected in a direction orthogonal to the center axial direction from the disc cartridge, and are mounted thereupon; wherein different types of the disc-shaped recording media are storable in the disc cartridge, and the plurality of drive units are each taken as different types according to different types of the disc-shaped recording media, and also disposed arrayed in the center axial direction; and wherein each of the plurality of disc-shaped recording media is mounted on a predetermined the drive unit based on information input to the information input medium.

Accordingly, the disc changer has wider application, whereby improvement in usability can be realized.

BRIEF DESCRIPTION OF THE DRAWINGS

FIG. 43 is a perspective view illustrating a disc changer where multiple drive units are disposed, along with a disc cartridge.

DESCRIPTION OF THE PREFERRED EMBODIMENTS

Figure 1:
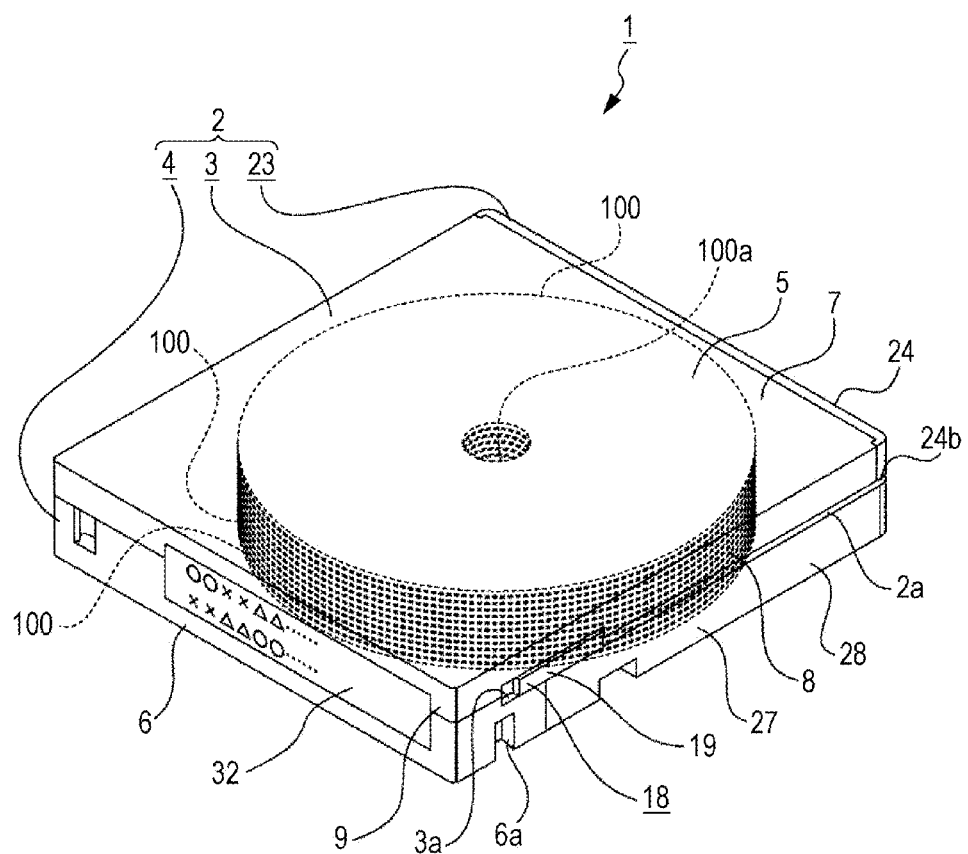
FIG. 1 illustrates an embodiment of a disc changer according to the present invention along with FIGS. 2 through 43, and is a perspective view of a disc cartridge used for the disc changer.

Now, embodiments of a disc changer according to the present invention will be described in accordance with appended drawings.

With the following description, directions of front, back, up, down, left, and right are illustrated with a direction where a disc cartridge is inserted into a cartridge insertion/detachment opening of the disc changer, as the front.

Note that directions of front, back, up, down, left, and right illustrated below are for convenience of description, and embodiments of the present invention are not restricted to these directions.

Overall Configuration of Disc Cartridge

First, the configuration of a disc cartridge used for the disc changer will be described (see FIGS. 1 through 8).

A disc cartridge 1 is configured so that the components are disposed within a case body 2, and the case body 2 has a first shell 3 and a second shell 4. Multiple disc-shaped recording media 100 are storable with an equal interval in the vertical direction.

Figure 2:
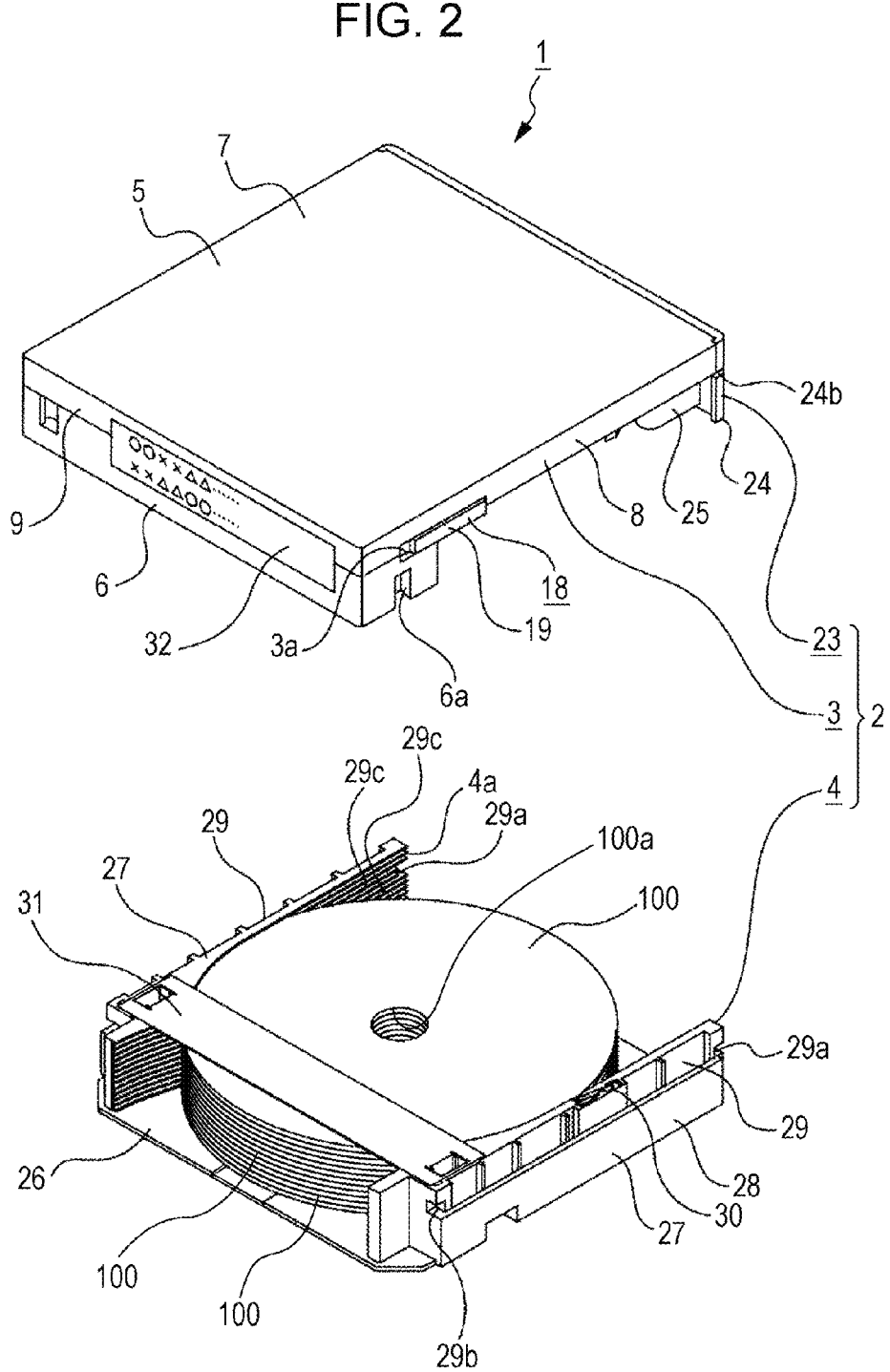
FIG. 2 is a perspective view of the disc cartridge, which illustrates a separated state between a first shell and a second shell.
Figure 3:
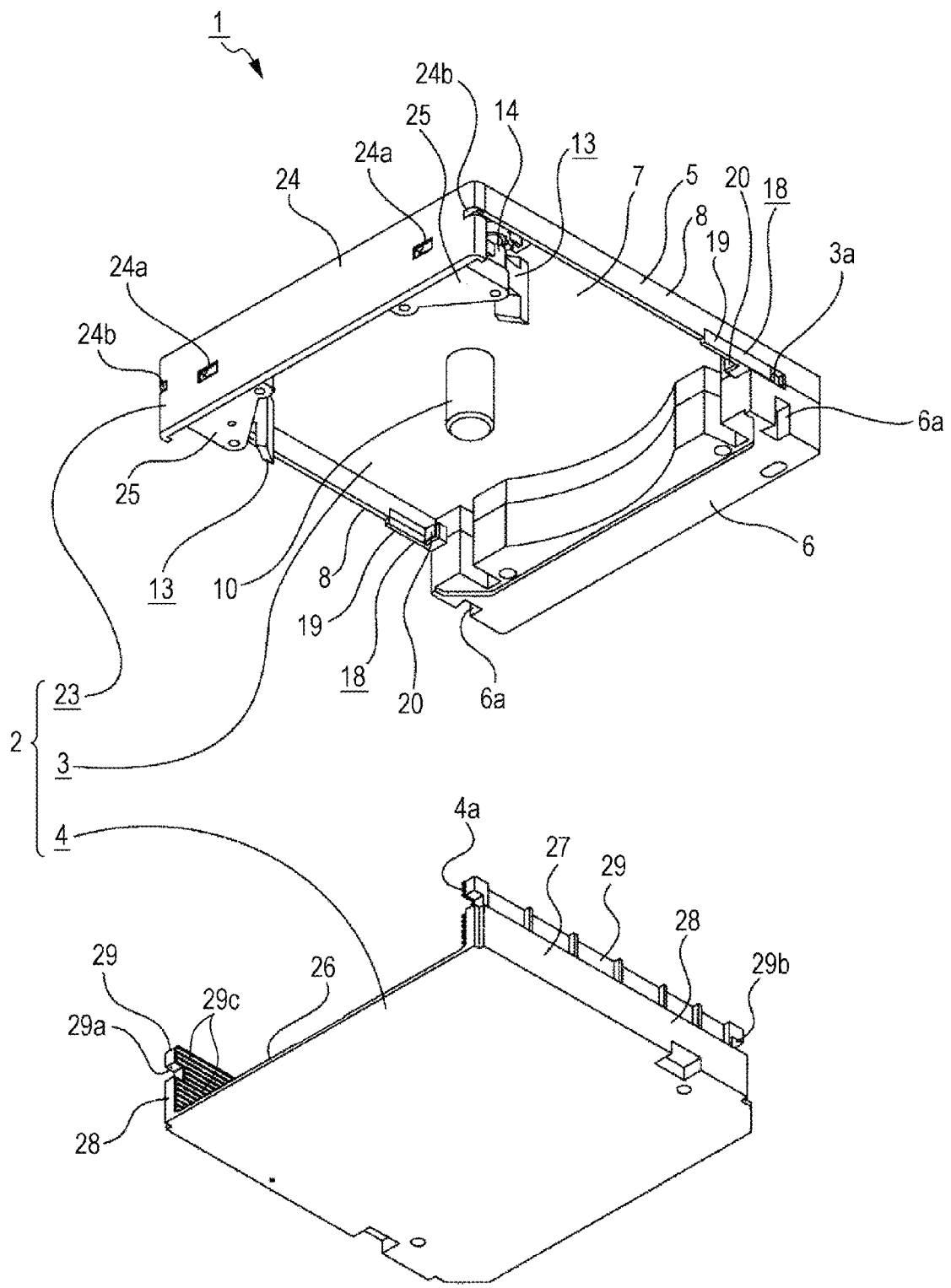
FIG. 3 is a perspective view of the disc cartridge, which illustrates a separated state between the first shell and the second shell in a state viewed from a different direction from FIG. 2.

The first shell 3 and the second shell 4 are configured so as to be connected or separated in the vertical direction, for example (see FIGS. 1 through 3). Note that, in the event that the case body 2 is configured in a vertically long shape, the first shell 3 and the second shell 4 are connected or separated in the horizontal direction.

The first shell 3 is formed of a resin material, and is configured by a base member 5 and an auxiliary base 6 attached to the rear edge portion of the base member 5 being connected in the vertical direction.

Figure 4:
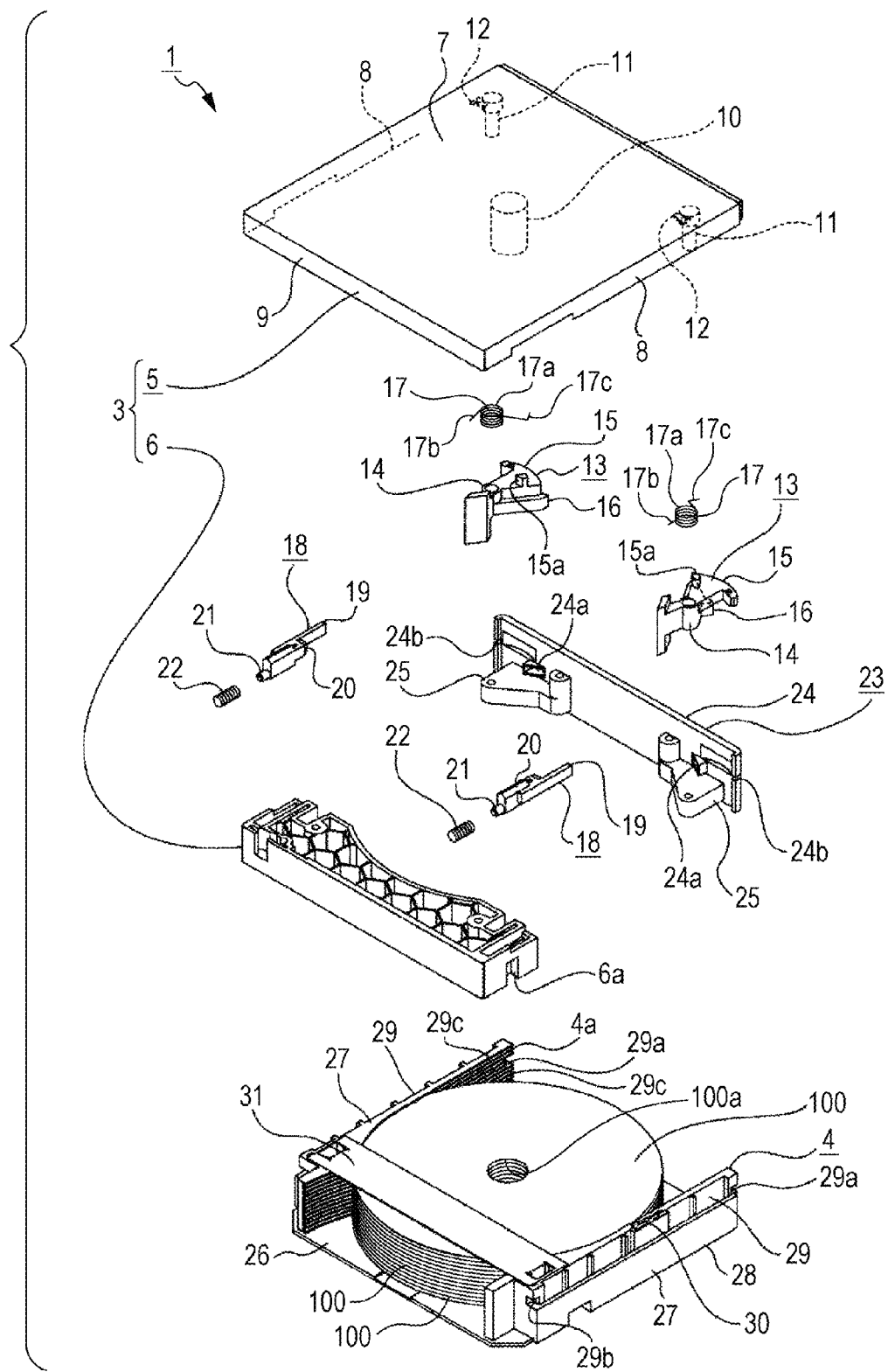
FIG. 4 is an exploded perspective view of the disc cartridge.
Figure 5:
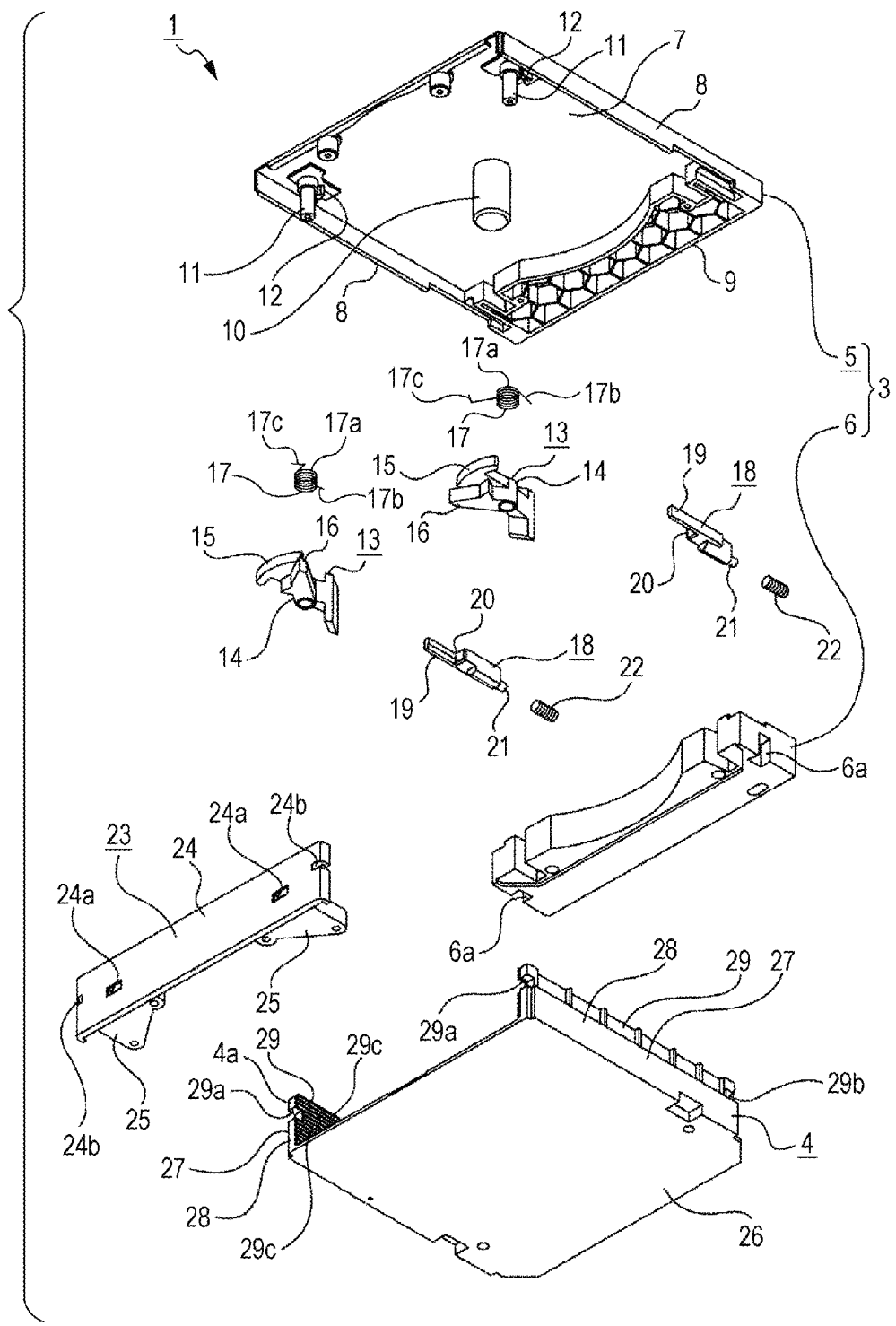
FIG. 5 is an exploded perspective view of the disc cartridge illustrated in a state viewed from a different direction from FIG. 4.

The base member 5 includes, as illustrated in FIGS. 4 and 5, a base face portion 7 facing the vertical direction, side face portions 8 each protruding downward from both side edge portions of this base face portion 7, and a rear face portion 9 protruding downward from the rear edge portion of the base face portion 7.

A cylindrical shaft-shaped center pin 10 protruding downward is provided to the central portion of the base face portion 7.

Support shafts 11 protruding downward are provided to front edge-sided portions of the base face portion 7 in a horizontally separated manner. Spring hook protrusions 12 are provided to nearby positions of the support shafts 11 in the lower face of the base face portion 7, respectively.

Groove-shaped grippers 6a opened sideward and downward are formed on the lower edge portions of the both side edge portions of the auxiliary base 6, respectively.

Slider support portions 3a are formed in the rear edge-sided positions of the both side face portions of the first shell 3, respectively (see FIGS. 1 through 3).

Locking levers 13 are supported by the support shafts 11 of the first shell 3 so as to freely turn (see FIGS. 3 through 5).

Figure 6:
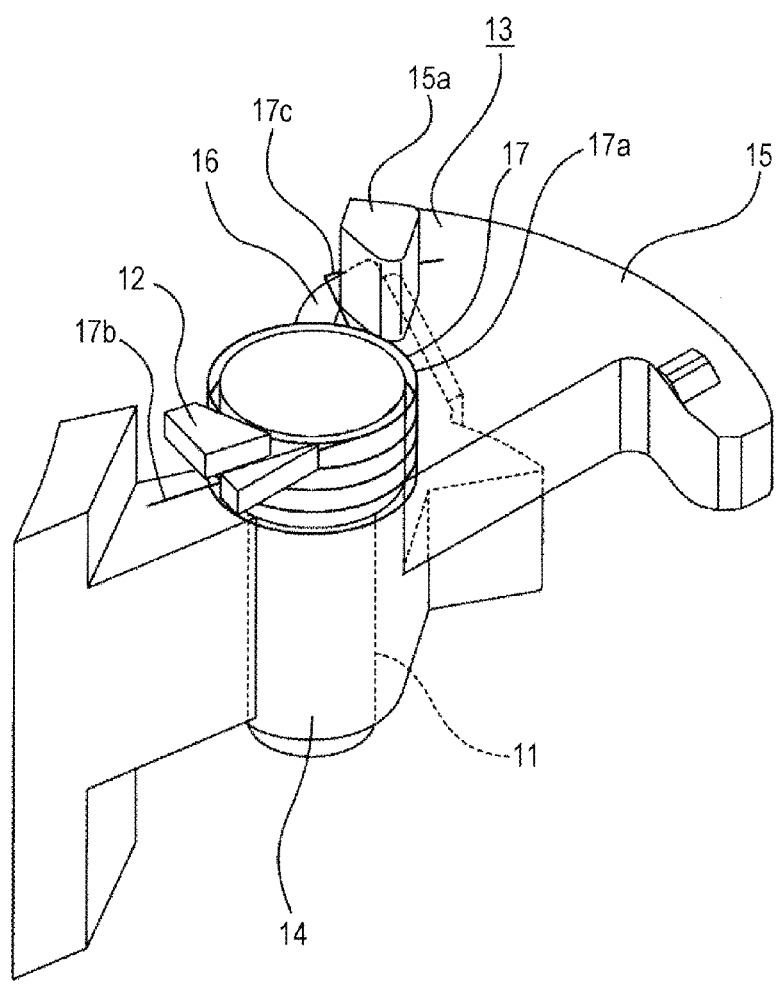
FIG. 6 is an enlarged perspective view illustrating a locking lever supported by a support shaft along with a pressing spring.

The locking levers 13 include, as illustrated in FIGS. 4 through 6, a cylindrical-shaped supported portion 14 supported by the support shaft 11 being inserted thereinto, a locking portion 15 protruding generally forward from a generally upper half portion of the supported portion 14, and an unlocking portion 16 protruding obliquely forward from a generally lower half portion of the supported portion 14.

The locking portion 15 includes a protruding portion 15a for locking protruding sideward at the tip portion. A spring support protruding portion 15b protruding upward is provided to the locking portion 15.

With the locking levers 13, the support shafts 11 are inserted into the supported portions 14 respectively, and the locking levers 13 are configured so as to turn with each center shaft of the support shafts 11 as the center (see FIG. 6). In a state in which the locking levers 13 are supported by the support shafts 11, with the locking levers 13, protruding portions 15a of the locking potions 15 are pressed in a direction approaching the side face portions 8 by pressing springs 17, respectively.

The pressing springs 17 are, for example, torsion coil springs, and are made up of a pair of arm portions 17c protruding coil portions 17a respectively. With the pressing springs 17, the coil portion 17a is supported by the support shaft 11, one of the arm portions 17b is engaged with a spring hook protruding portion 12 provided to the base face portion 7 of the first shell 3, and the other arm portion 17c is engaged with a spring support protruding portion 15b provided to the locking portion 15 of the locking lever 13.

Locking sliders 18 are slidably supported in the forward/backward direction by the slider support portions 3a of the first shell 3 (see FIGS. 3 through 5).

The locking sliders 18 are made up of a spring support shaft portion 21 protruding backward from the rear face of locking portions 20 protruding inward from a portion except for the front edge portions of supported portions 19 extending forward and backward.

With the locking sliders 18, the supported portions 19 are slidably supported by the slider supporting portions 3a of the first shell 3 respectively, and coil springs 22 are supported by the spring support shaft portions 21 respectively. With the coil springs 22, both edges are in contact with the rear face of the locking portion 20, and a rear face where the slider support portion 3a is formed, respectively. Accordingly, the locking sliders 18 are pressed forward by the coil springs 22.

An opening/closing panel 23 is attached to the front edge portion of the first shell 3 (see FIGS. 1 through 3). The opening/closing panel 23 includes, as illustrated in FIGS. 4 and 5, panel portions 24 formed in a horizontally long rectangular plate shape facing the forward/backward direction, and attached protruding portions 25 protruding backward from the lower edge portion in the rear faces of panel portions 24.

Insertion holes 24a are formed in the panel portions 24 with a horizontal elongation. Notches 24b for insertion opened outward are formed on both side edge portions of the panel portions 24, respectively.

The attached protruding portions 25 are provided with a horizontal elongation.

The opening/closing panel 23 is attached to the first shell 3 by the tip portions of the attached protruding portions 25 being screwed to the lower faces of the support shafts 11 provided to the base face portion 7 respectively.

In a state in which the opening/closing panel 23 is attached to the first shell 3, the attached protruding portions 25 are screwed below the support shafts 11 respectively, and accordingly, the locking levers 13, and the pressing springs 17 supported by the support shafts 11 are prevented from falling out.

In a state in which the opening/closing panel 23 is attached to the first shell 3, unlocking portions 16 of the locking levers 13 are positioned right behind the insertion holes 24a.

Figure 7:
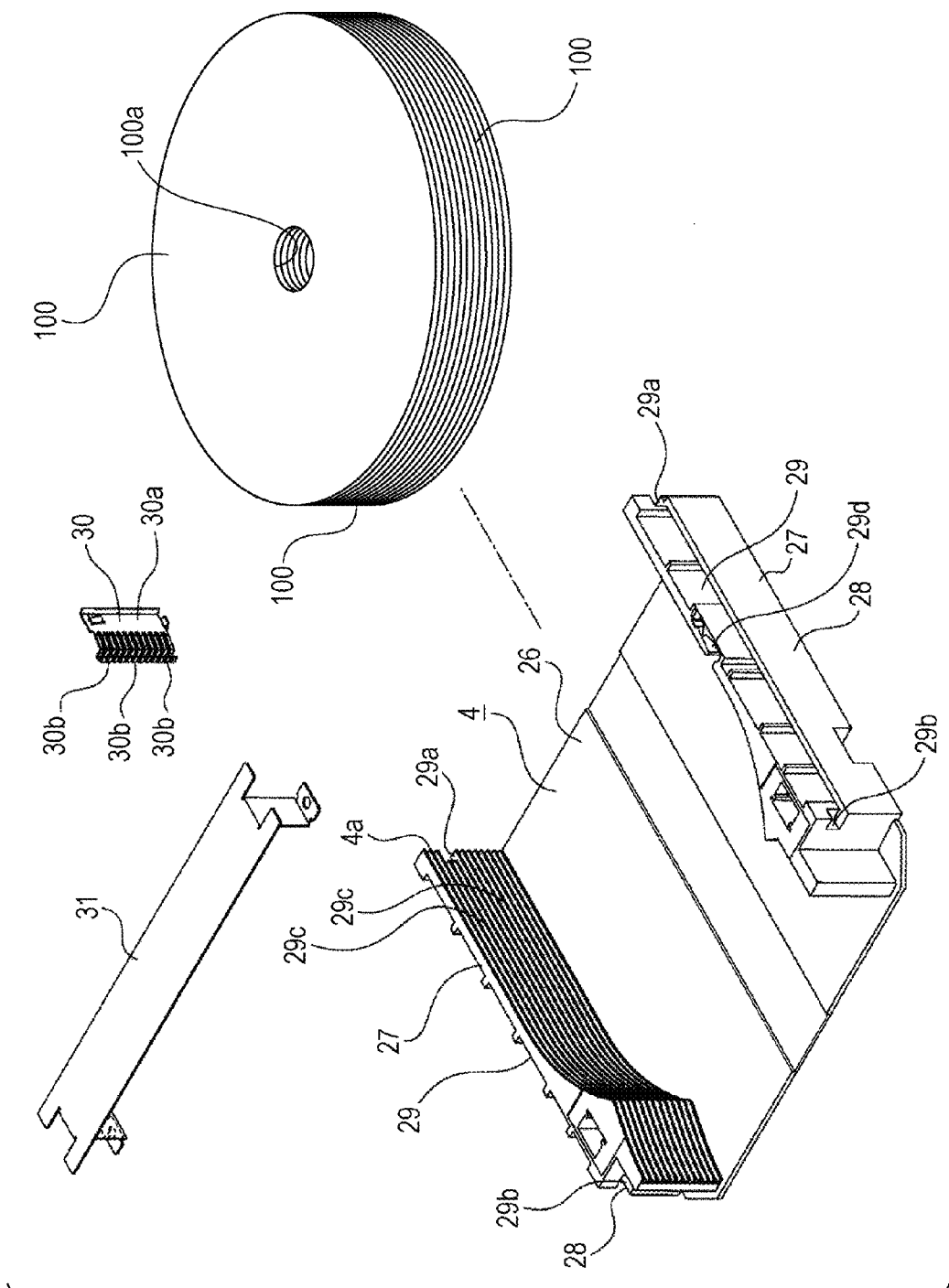
FIG. 7 is an exploded perspective view illustrating the second shell, a bridge member, a hold-down spring, and disc-shaped recording media.

The second shell 4 is formed of a resin material, and is configured by side face portions 27 protruding upward from both side portions of base face portions 26 facing the vertical direction being formed in an integral manner (see FIGS. 3, 5, and 7).

The side face portions 27 are made up of an outer side wall portion 28, and an inner side wall portion 29 positioned in the inner side of the outer side wall portion 28. With the outer side wall portion 28, the height is set to generally a half of the height of the inner side wall portion 29, and the upper face is set to be lower than the upper face of the inner side wall portion 29.

A first recessed portion 29a for locking opened forward and horizontally penetrated is formed in the front edge portion of the inner side wall portion 29. A second recessed portion 29b for locking opened backward and outward is formed in a position close to the rear edge of the inner side wall portion 29.

Holding slots 29c are formed in the inner face of the inner side wall portion 29, and the holding slots 29c are positioned in the vertical direction with an elongation of an equal interval.

A spring attachment recessed portion 29d is formed on one of the inner side wall portions 29. The spring attachment recessed portion 29d is opened upward and inward.

A hold-down spring 30 is inserted and attached to the spring attachment recessed portion 29d (see FIGS. 2 and 4). The hold-down spring 30 is configured, as illustrated in FIG. 7, by spring portions 30b protruding from the rear edges of the vertically long plate shaped attached portions 30a being formed of a metal material in an integral manner. The springs 30b are provided with an elongation of an equal interval in the vertical direction with the same interval as the vertical interval of the holding slots 29c, of which the number to be provided is the same as the number of the holding slots 29c.

The hold-down spring 30 is inserted into the spring attachment recessed portion 29d, and the tip portions of the spring portions 30b protrude in the inner side of the inner side wall portion 29.

A bridge member 31 is attached to a position close to the rear edge between the side face portions 27 of the second shell 4 (see FIGS. 2 and 7).

The bridge member 31 is formed by a plate-shaped metal material being folded in a predetermined shape. The bridge member 31 is attached between the side face portions 27, whereby high strength serving as the entirety of the second shell 4 can be secured.

With the disc cartridge 1, for example, an information input sheet 32 is adhered to the rear face of the case body 2 as information input medium. Predetermined information, for example, information relating to pitch between disc-shaped recording media 100 to be stored in the case body 2, and the number of stored disc-shaped recording media 100 is input to the information input sheet 32.

Note that the information input medium are not restricted to the information input sheet 32, and an appropriate medium may be employed, for example, such as printed information such as a barcode printed on the case body 2, or a recording chip embedded in the case body 2, or the like.

With the disc cartridge 1 configured as described above, the disc-shaped recording media 100 are held in the case body 2 (see FIGS. 1 and 2). With the disc-shaped recording media 100, in a state in which the first shell 3 and the second shell 4 are separated, the outer portion is inserted into the holding slots 29c formed in the side face portions 27 of the second shell 4 from the front, and is held in the case body 2. Accordingly, an opening positioned in the front edge of the second shell 4 is formed as a disc insertion/ejection opening 4a where insertion and ejection as to the second shells 4 of the disc-shaped recording media 100.

In a state in which the case body 2 is configured by the first shell 3 and the second shell 4 being connected, and the opening/closing panel 23 being attached to the first shell 3, insertion slots 2a each extending forward and backward are formed between the lower faces of the side face portion 8 of the first shell 3, and the upper faces of the outer side wall portions 28 of the second shell 4 (see FIG. 1). With the insertion slots 2a, the rear edges are each continued to the slider support portions 3a of the first shell 3, and the front edges are each continued to the notches 24b for insertion formed in the panel portion 24 of the opening/closing panel 23.

Coupled State of Disc Cartridge

Figure 8:
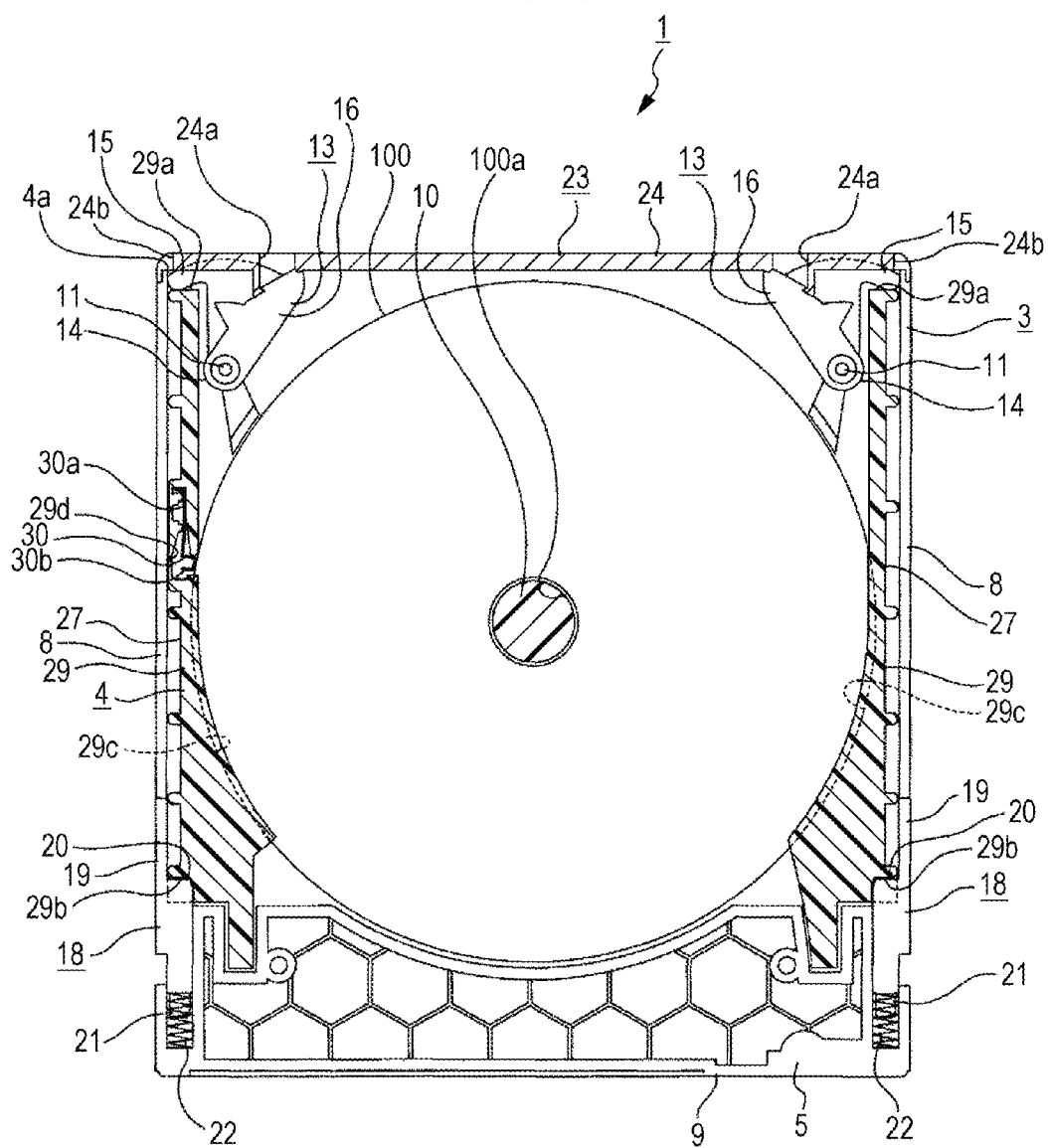
FIG. 8 is an enlarged cross-sectional view illustrating a state in which the first shell and the second shell are locked by a locking slider.

Hereafter, a coupled state of the disc cartridge 1 will be described (see FIG. 8).

The first shell 3 and the second shell 4 are coupled in a state in which the base face portion 7 and the base face portion 26 of the base body 5 are vertically faced.

In a state the first shell 3 and the second shell 4 are coupled, the first shell 3 and the second shell 4 are locked by the locking levers 13, and the locking sliders 18.

The locking levers 13 are positioned in turning edges in a direction (outward) where the tip portions of the locking portions 15 are mutually separated by pressing force of the pressing springs 17, and the protruding portions 15a for locking of the locking portions 15 are inserted into first recessed portions 29a for locking formed in the side face portions 27 of the second shell 4 and engaged therewith, respectively.

The locking sliders 18 are positioned in front movement edges by pressing force of the coil springs 22, and the locking portions 20 are inserted into second recessed portions 29b for locking formed in the side face portions 27 of the second shell 4 and engaged therewith, respectively.

As described above, in a state in which the first shell 3 and the second shell 4 are coupled and locked, and the disc-shaped recording media 100 are held in the case body 2, a part of the outer faces of the disc-shaped recording media 100 are in contact with the spring portions 30b of the hold-down spring 30, and are held down, respectively. At this time, a part of the holding slots 29c are pressed with other portions of the outer faces of the disc-shaped recording media 100, and the disc-shaped recording media 100 are positioned in normal positions within the case body 2.

In a state in which the first shell 3 and the second shell 4 are coupled, with the disc-shaped recording media 100, the center pin 10 provided to the first shell 3 is inserted into center holes 100*a*.

Overall Configuration of Disc Changer

Next, the configuration of a disc changer 40 will be described (see FIGS. 9 through 17).

The disc changer 40 is configured so that the components are disposed within an outer casing 41.

Figure 9:
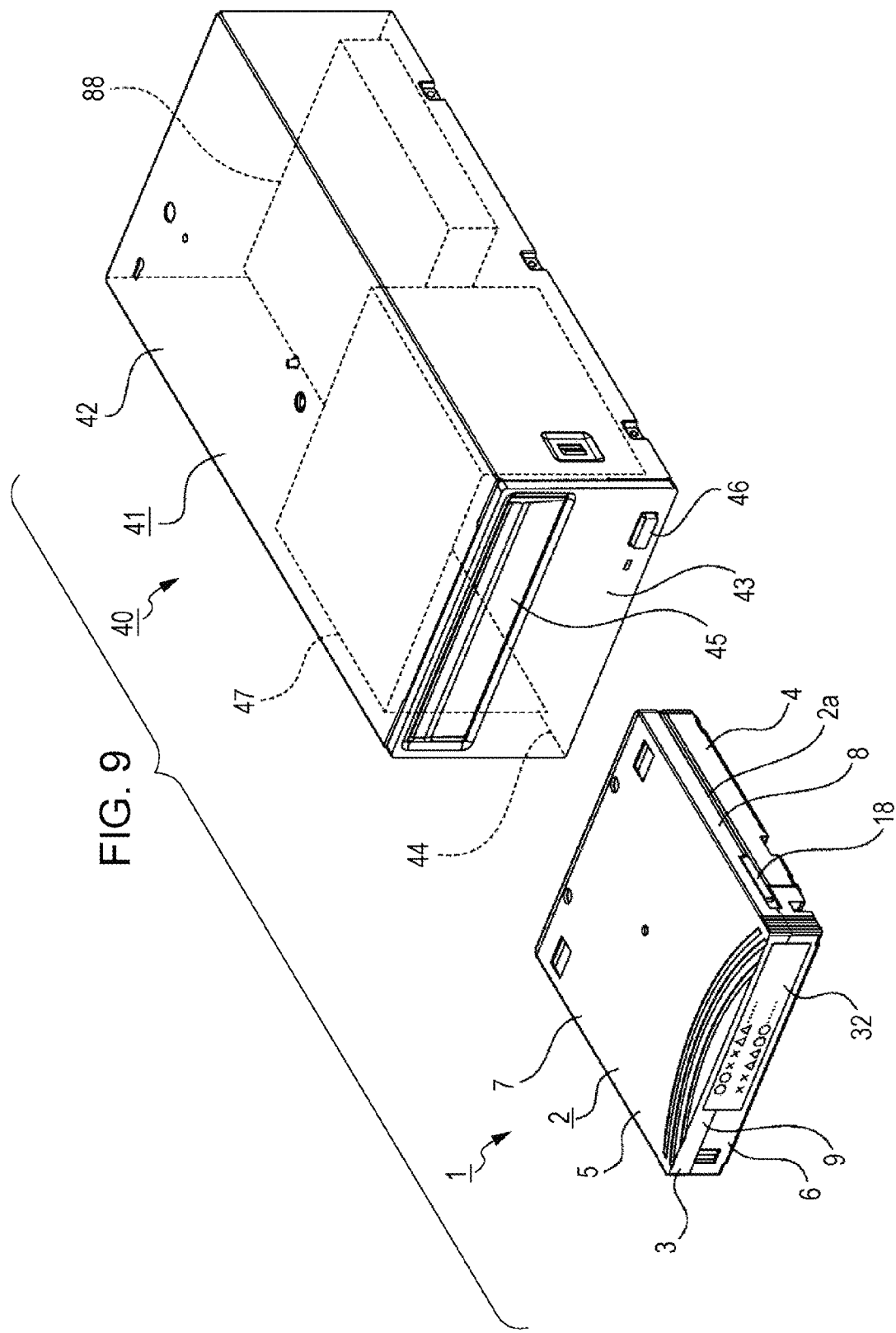
FIG. 9 is a perspective view illustrating the disc changed along with the disc cartridge.

The outer casing 41 is configured of, as illustrated in FIG. 9, an outer frame 42 opened backward and downward, a panel 43 facing the forward/backward direction, attached to the rear edge portion of the outer frame 42, and a base frame 44 facing the vertical direction, attached to the lower edge portion of the outer frame 42.

A cartridge insertion/ejection opening penetrated forward and backward is formed in the upper edge portion of the panel 43, and the cartridge insertion/ejection opening can be opened and closed by a shutter 45. An ejection button 46 is disposed on the lower edge portion of the panel 43.

A holder cover 47 is disposed in the outer casing 41. The holder cover 47 is made up of a top panel portion 48, side plate portions 49 protruding downward from each of the both side edges of the top panel portion 48, and a protruding plate portion 50 protruding downward from the front edge of the top panel portion 48 (see FIGS. 9 through 11).

Figure 12:
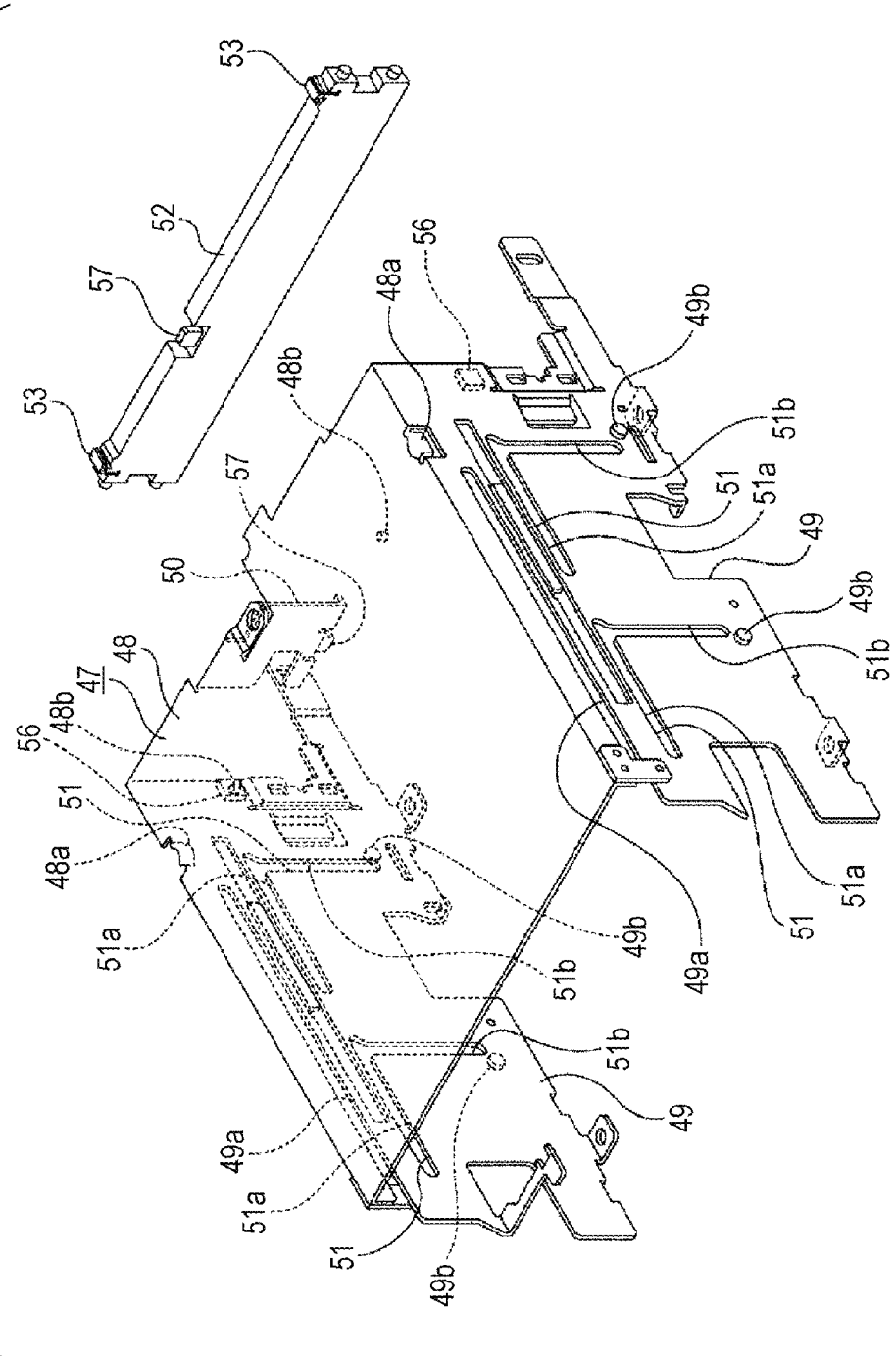
FIG. 12 is an exploded perspective view illustrating a holder cover, a connecting member, and a holding member.

Cam protruding pieces 48*a*, and pressure pins 48*b* are provided to positions close to the front edge of the top panel portion 48 in a horizontally separated manner, respectively (see FIG. 12). The cam protruding pieces 48*a* are provided to both side edge portions of the top panel portion 48 in a state protruding inward, and the pressure pints 48*b* are provided to the inner sides of the cam protruding pieces 48*a* in a state protruding downward, respectively.

A support hole 49*a* extending forward and backward is formed in the upper edge portion of the side plate portion 49.

Cam support holes 51 are formed in the side plate portion 49 in a state separated forward and backward. The cam support holes 51 are made up of a horizontal portion 51*a* extending forward and backward, and a vertical portion 51*b* vertically extending, and the front edge portion of the horizontal portion 51*a*, and the upper edge portion of the vertical portion 51*b* are continued.

Support protruding pins 49*b* protruding outward are provided to the lower edge portion of the side plate portion 49 in a state separated forward and backward.

A connecting member 52 is attached to the front edge portion of the holder cover 47. The connecting member 52 is formed vertically long, and both side edge portions are attached to the front edge portions of the side plate portions 49 of the holder cover 47, respectively.

Figure 13:
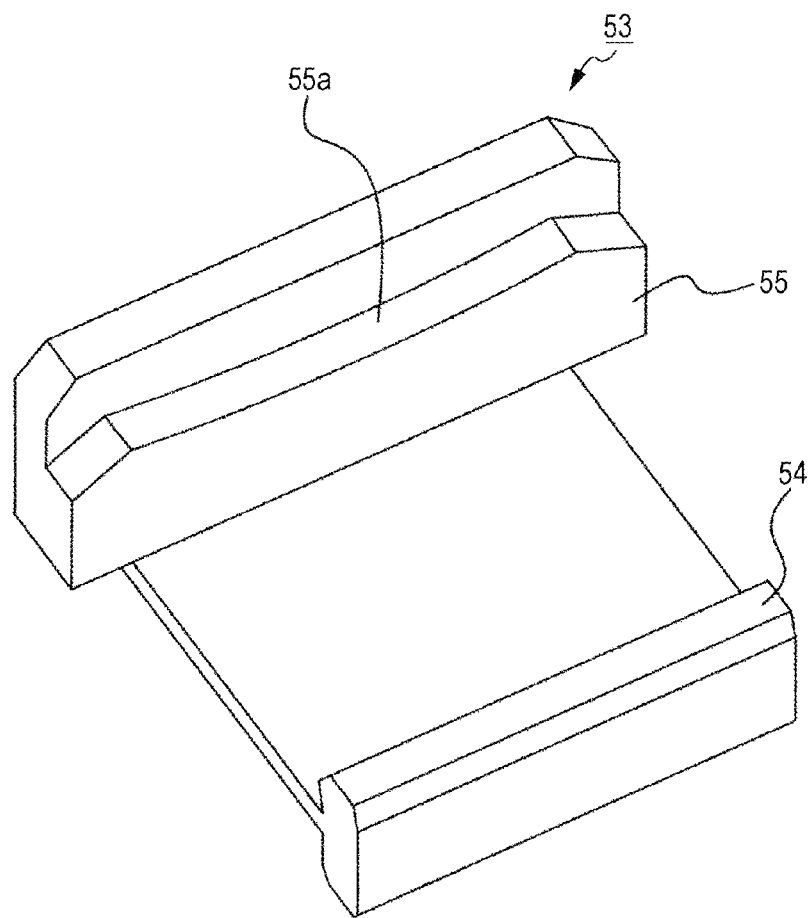
FIG. 13 is an enlarged perspective view of the holding member.

Holding members 53 are attached to both side edge portions of the upper face of the connecting member 52. The holding members 53 are each vertically extending as illustrated in FIG. 13, and are made up of attached portions 54 attached to the connecting member 52, and holding protruding portions 55 protruding in a mutually approaching direction from the upper edge portions of the attached portions 54, and holding faces 55*a* are formed on faces where the holding protruding portions 55 mutually face, respectively. The holding faces 55*a* are each formed in an arc face shape protruding outward. The curvatures of the holding faces 55*a* are set to be smaller than the curvatures of the disc-shaped recording media 100. Distance between the holding members 53 is set slightly smaller than the diameters of the disc-shaped recording media 100.

Elements 56 for detection are disposed in the inner faces of the front edge portions of the side plate portions 49, respectively (see FIG. 12). With the elements 56 for detection, for example, one is a light emitting element, and the other is a light receiving element.

Sensors 57 are disposed on the lower edge portion of the protruding plate portion 50, and the upper edge portion of the connecting member 52, respectively. With the sensors 57, for example, one is a light emitting element, and the other is a light receiving element.

Figure 10:
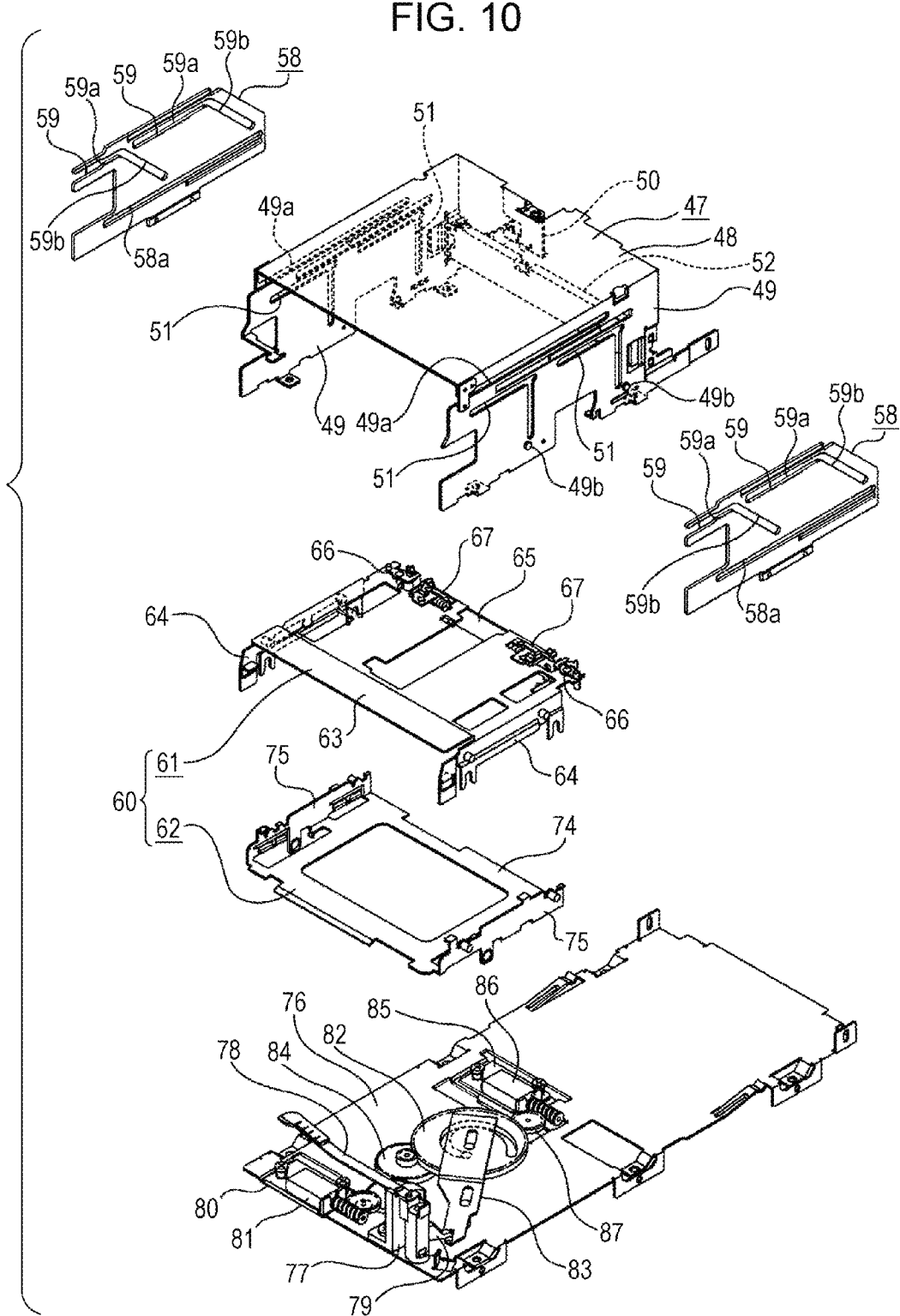
FIG. 10 is an exploded perspective view illustrating the internal configuration of the disc changer.

Sliders 58 are supported on the outer face sides of the side plate portions 49 of the holder cover 47 so as to freely move in the forward/backward direction (see FIG. 10).

Cam holes 59 are formed in the sliders 58 in a state separated forward and backward. The cam holes 59 are made up of a straight line portion 59*a* extending forward and backward, and a slanting portion 59*b* slanting so as to be displaced downward as it goes ahead, and the front edge portion of the straight line portion 59*a*, and the upper edge portion of the slanting portion 59*b* are continued. A supported hole 58*a* extending forward and backward is formed on the lower edge portion of the sliders 58.

With the sliders 58, support protruding pins 49*b* are slidably engaged with the supported hole 58*a*, and the sliders 58 are supported by the side plate portion 49 of the holder cover 47 so as to freely move in the forward/backward direction.

Figure 11:
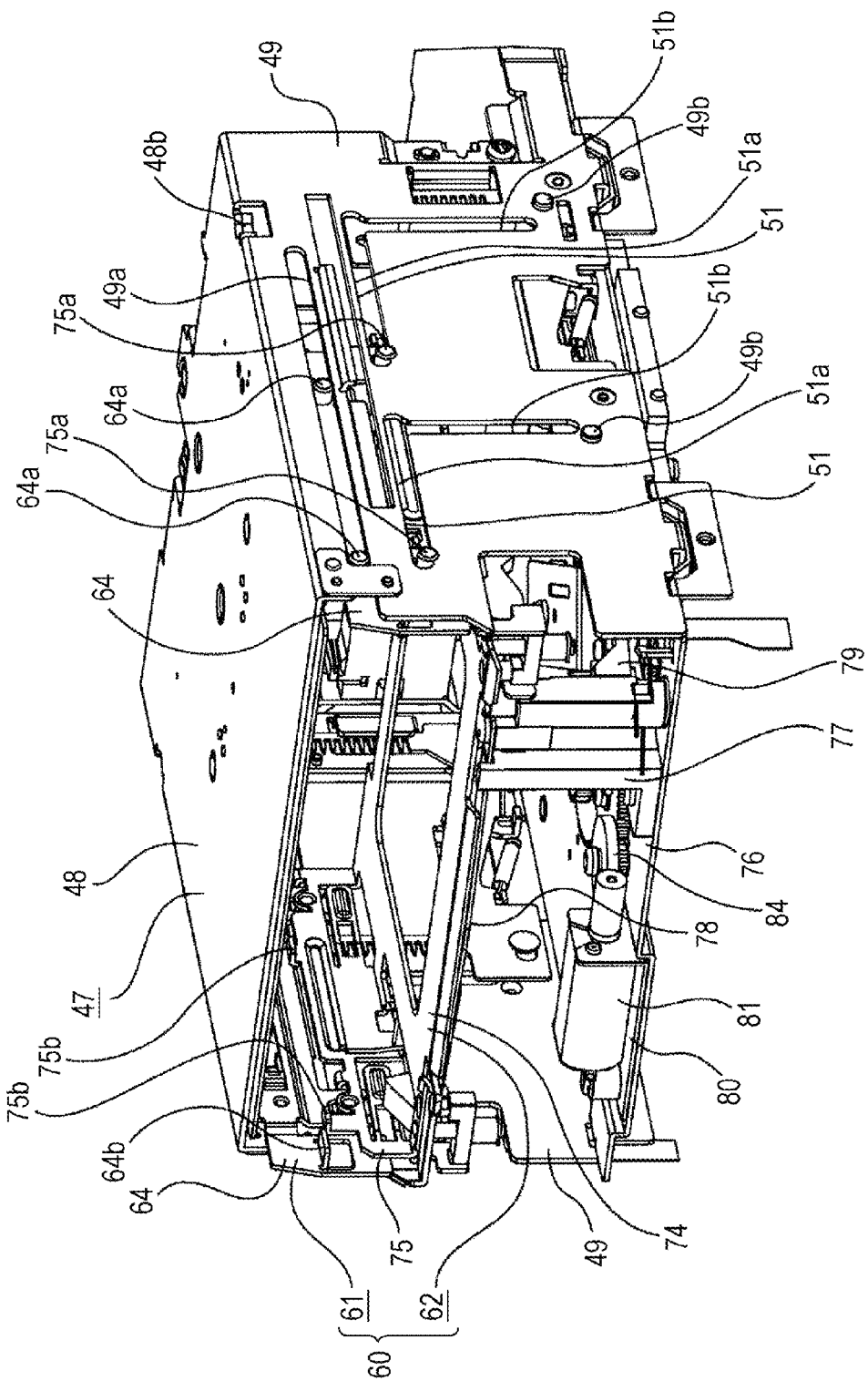
FIG. 11 is a perspective view illustrating the internal configuration of the disc changer.

The disc holder 60 is movably supported by the holder cover 47 (see FIGS. 10 and 11). The disc holder 60 is made up of an upper holder 61 and a lower holder 62 (see FIGS. 14 and 15).

Figure 14:
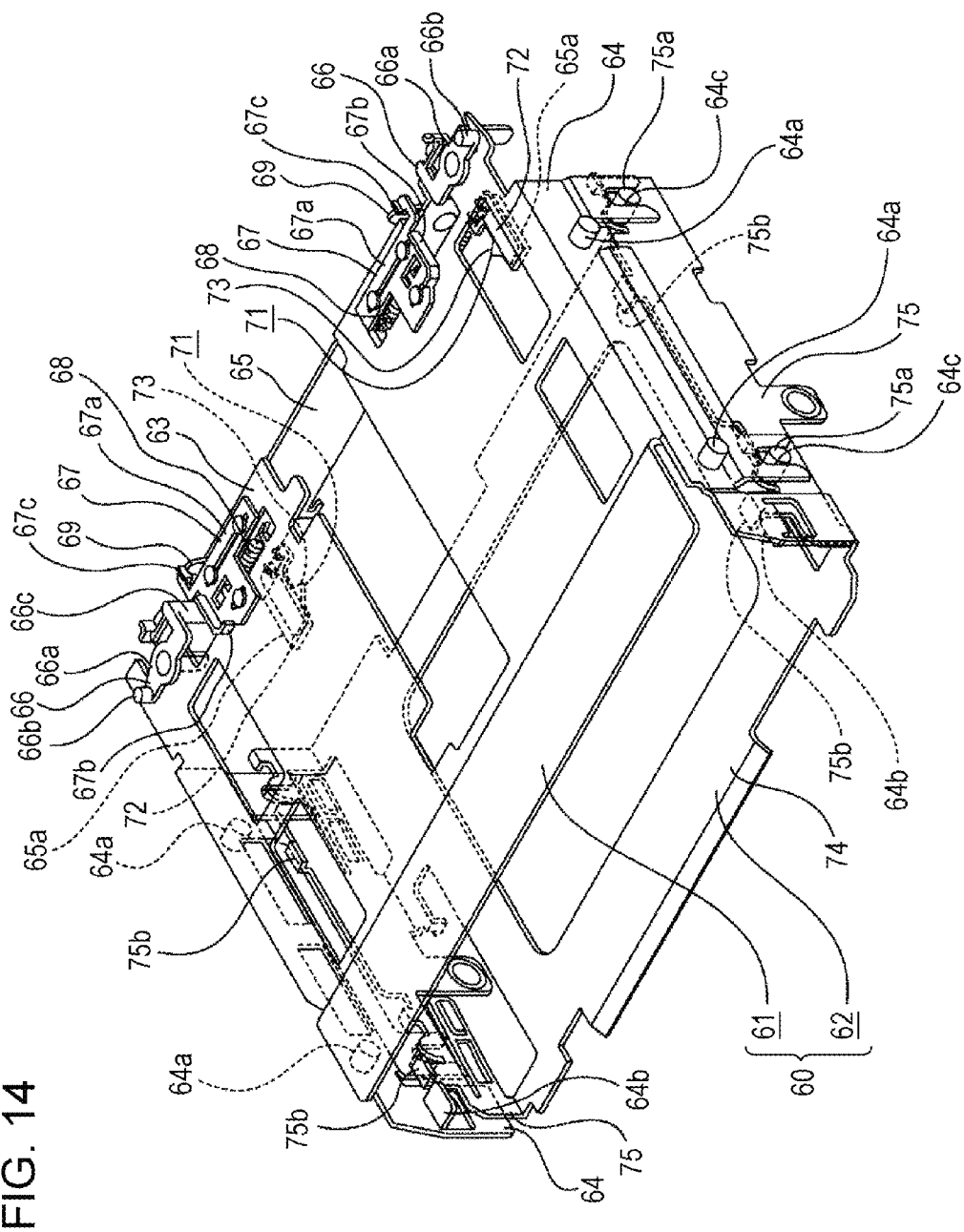
FIG. 14 is a perspective view of a disc holder and so forth.
Figure 15:
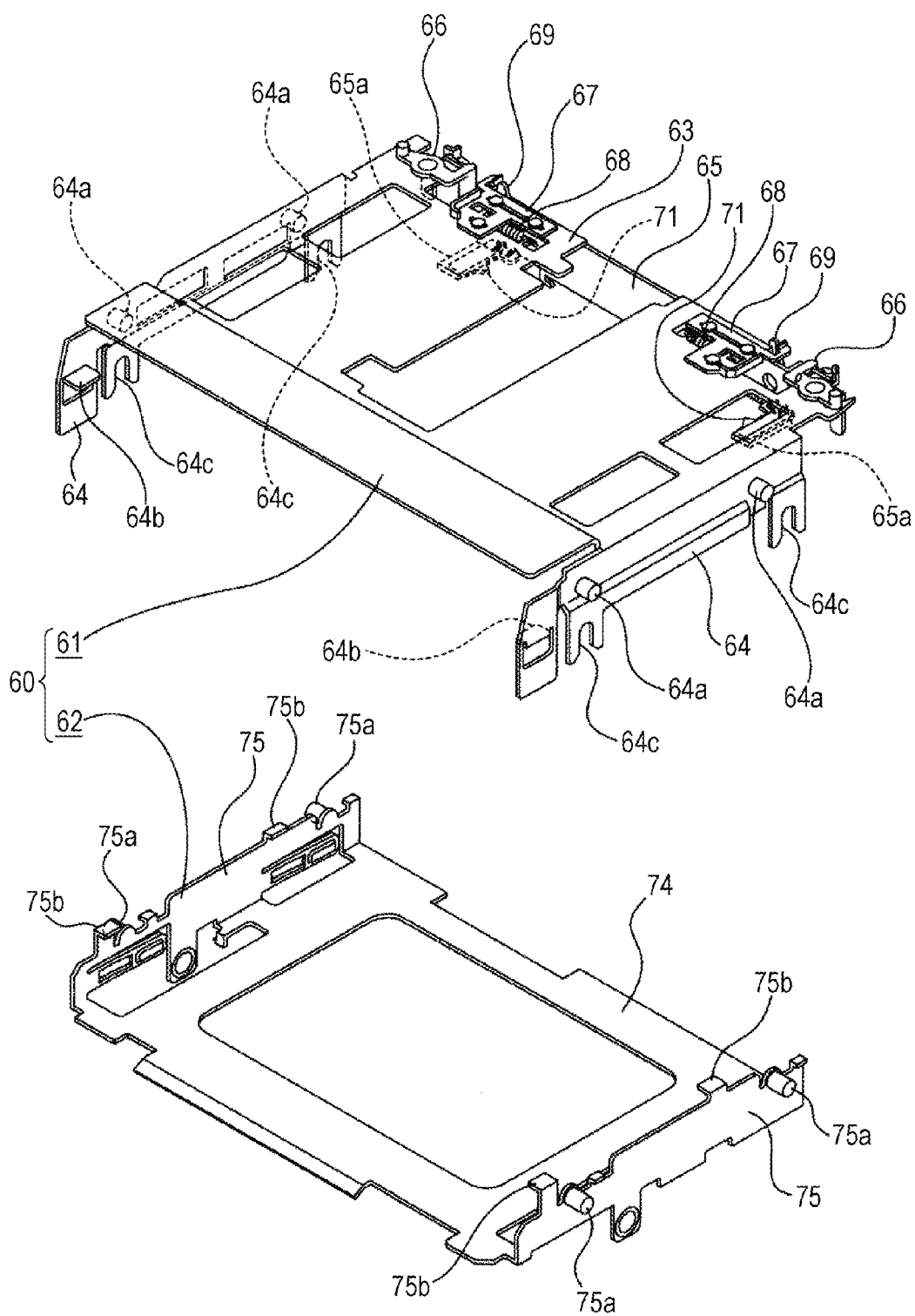
FIG. 15 is a perspective view illustrating the disc holder and so forth by being separated.
Figure 16:
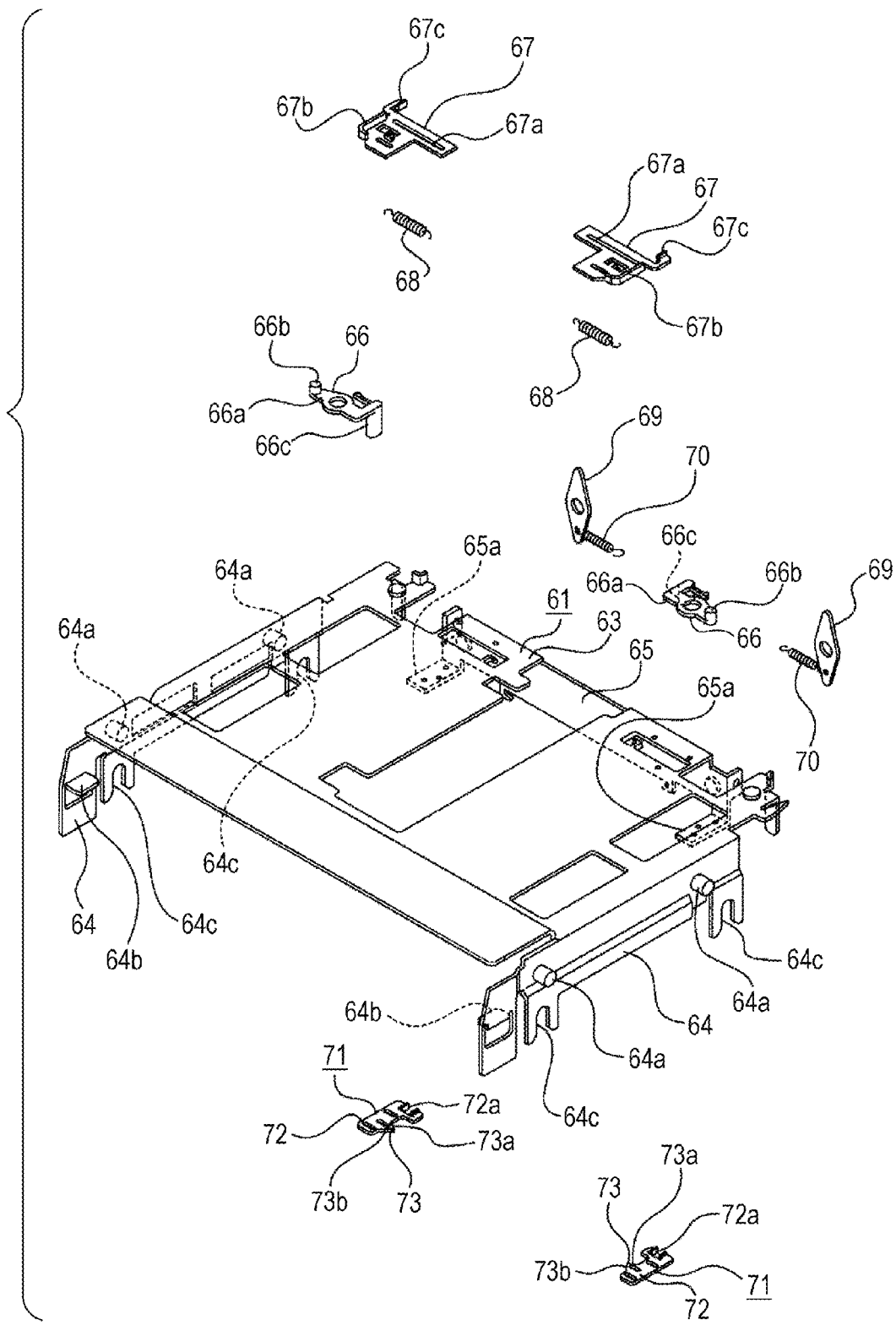
FIG. 16 is an exploded perspective view illustrating an upper holder, and each lever supported by the upper holder.

The upper holder 61 is, as illustrated in FIGS. 14 through 16, made up of a top face portion 63 facing the vertical direction, lateral face portions 64 protruding downward from both side edges of the top face portion 63 respectively, and a lever support portion 65 protruding downward from the front edge of the top face portion 63.

With the top face of the top face portion 63, pressure levers 66 are supported by both side edge portions of the front edge portion so as to freely turn, respectively. The pressure levers 66 are made up of a turning face portion 66*a* facing the vertical direction, a slide protruding portion 66*b* protruding upward from the outer side edge portion of the turning face portion 66*a*, and a pressure shaft portion 66*c* protruding downward from the front edge portion of the turning face portion 66*a*. With the pressure levers 66, a turning supporting point is provided to the turning face portion 66*a*, and the pressure shaft portion 66*c* is moved generally in the forward/backward direction in front of the top face portion 63. With the pressure levers 66, the pressure shaft portion 66*c* is pressed in a direction moving generally forward by an unshown spring member.

With the front edge portion of the top face of the top face portion 63, actuating levers 67 are supported in the inner sides of the pressure levers 66 so as to freely move in the horizontal direction. The actuating levers 67 are made up of a plate-shaped moving face portion 67*a* facing the vertical direction, an activating face portion 67*b* protruding upward from the outer side edge portion of the moving face portion 67*a*, and an activating protruding portion 67*c* protruding forward from the outer side edge portion of the moving face portion 67*a*. With the actuating levers 67, the moving face portion 67*a* and the activating face portion 67*b* are disposed on the top face portion 63, and the activating protruding portion 67*c* protrudes forward from the top face portion 63. The actuating levers 67 are pressed in a mutually approaching direction by extension coil springs 68 supported between the top face portion 63, respectively.

Slide pins 64a protruding sideward are provided to the outer faces of the lateral face portions 64 so as to be separated forward and backward. Releasing pieces 64b protruding in a mutually approaching direction are provided to the rear edge portions of the lateral face portions 64. Connecting grooves 64c opened downward are formed in the lower edge portions of the lateral face portions 64 so as to be separated forward and backward.

Unlocking pieces 65a are provided to the lever support portion 65 so as to be horizontally separated. The unlocking pieces 65a are provided in a state protruding backward.

Releasing levers 69 are turnably supported on the front face of the lever support portion 65 in a state horizontally separated. The releasing levers 69 are formed in a shape extending generally upward and downward, and a turning supporting point is provided to the central portion of the vertical direction. The releasing levers 69 are pressed in a direction where the lower edge portions mutually approach by springs 70 supported between the lever support portion 65.

Restricting levers 71 are supported on the lower faces of the unlocking pieces 65a so as to freely move in the horizontal direction, respectively. The restricting levers 71 are formed in a plate shape, and are each made up of base portions 72, and restricting portions 73 protruding in a mutually approaching direction from positions close to the rear edges of the base portions 72.

An engagement recessed portion 72a opened forward is formed on the front edge portions of the base portions 72.

The restricting portions 73 are formed in a triangular shape where the width becomes narrow as it approaches the protruding direction from the base portions 72, where a side edge positioned on the front side is formed as a first slanting edge 73a slanting so as to displace backward as it recedes from the base portions 72, and a side edge positioned on the rear side is formed as a second slanting edge 73b slanting so as to displace forward as it recedes from the base portions 72.

With the restricting levers 71, the lower edge portions of the releasing levers 69 are engaged with the engagement recessed portions 72a of the base portions 72, respectively. Accordingly, pressing force of the springs 70 is applied to the restricting levers 71 via the releasing levers 69, and the restricting levers 71 are pressed in a mutually approaching direction.

With the upper holder 61, the slide pins 64a are inserted into the support holes 49a from the inner face sides of the side plate portions 49 respectively, and are supported by the holder cover 47 so as to freely move in the forward/backward direction.

The lower holder 62 is made up of a lower plate portion 74 facing the vertical direction, and lateral plate portions 75 each protruding upward from both side edges of the lower plate portion 74 (see FIGS. 14 and 15).

Slide pins 75a protruding sideward are provided to the outer faces of the lateral plate portions 75 in a state separated forward and backward. Holding pieces 75b protruding inward are provided to the upper edge portions of the lateral plate portions 75 in a state separated forward and backward.

With the lower holder 62, the slide pins 75a are inserted into the cam support holes 51, and the cam holes 59 from the inner face sides of the side plate portions 49, and are supported by the holder cover 47 and the sliders 58 so as to freely move in the forward/backward direction and the vertical direction, respectively.

With the upper holder 61 and the lower holder 62, the slide pins 75a are inserted into the connecting grooves 64c from the lower side, and engaged therewith, thereby being connected in the vertical direction (see FIG. 14).

A chassis 76 is attached onto the base frame 44 of the outer casing 41 (see FIGS. 10 and 11).

Figure 17:
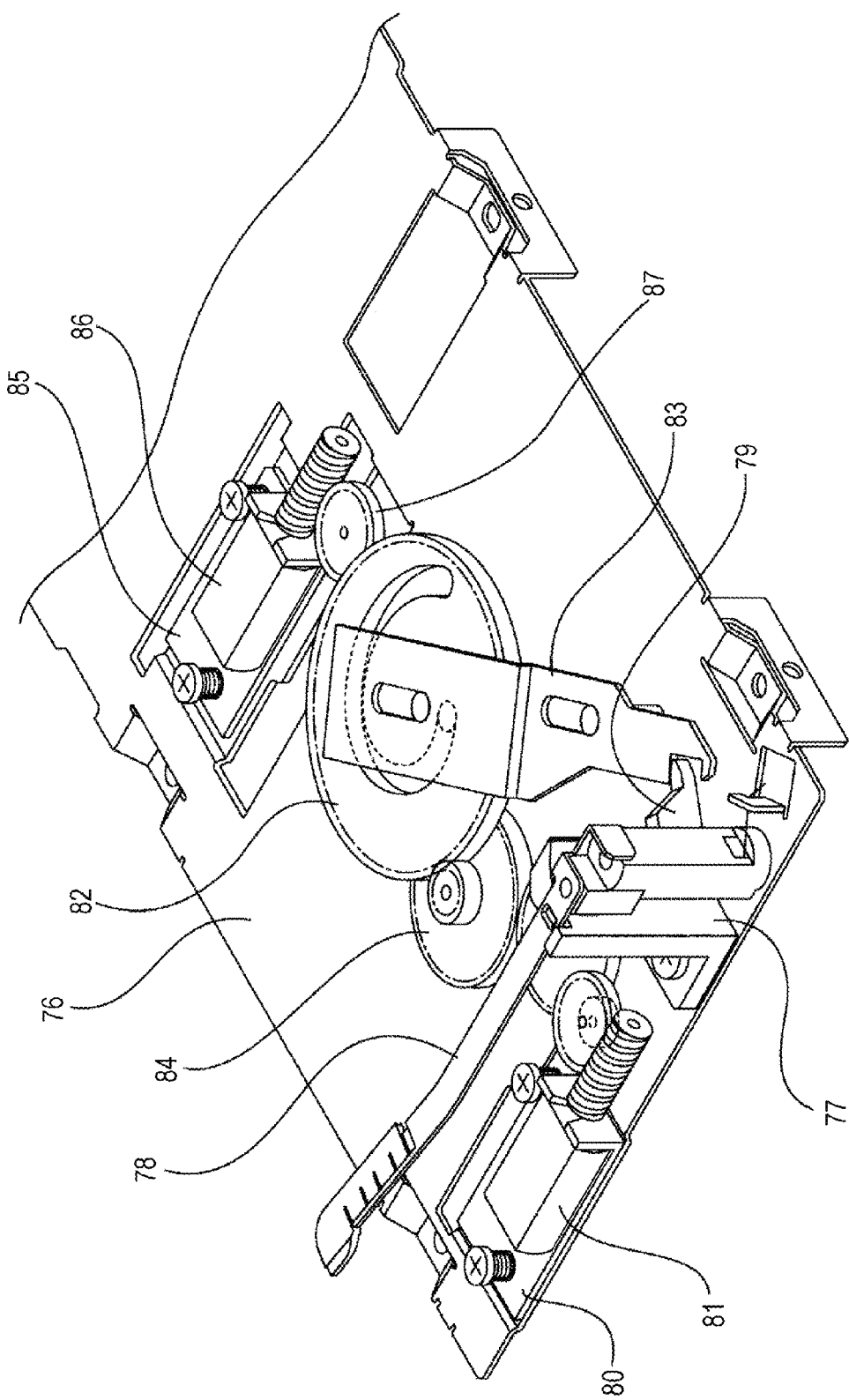
FIG. 17 is a perspective view illustrating a chassis, and each unit disposed in the chassis.

A support member 77 protruding upward is attached to the rear edge portion of the chassis 76 (see FIG. 17). An ejection lever 78 capable of turning in the horizontal direction is supported on the upper edge portion of the support member 77. The ejection lever 78 is connected with an activated member 79, and the lower edge portion of the activated member 79 is disposed on the chassis 76.

A first motor support plate 80 is disposed on the chassis 76, and a first driving motor 81 is attached onto the first motor support plate 80.

A rotating cam 82 is supported by the chassis 76, and the rotating cam 82 is connected with an arm lever 83. One edge portion of the arm lever 83 is connected to the lower edge portion of the activated member 79.

The rotating cam 82 is rotated by driving force of the first driving motor 81 being propagated via a first reduction gear group 84 supported onto the chassis 76, and the arm lever 83 is operated along with rotation of the rotating cam 82. Upon the arm lever 83 being operated, the activated member 79 is operated, and the ejection lever 78 is turned as to the support member 77.

Unshown rack gears each attached to the sliders 58 are disposed on the bottom face side of the chassis 76.

A second motor support plate 85 is disposed in front of the first driving motor 81 on the chassis 76, and a second driving motor 86 is attached onto the second motor support plate 85.

A second reduction gear group 87 is supported by the chassis 76, and the second reduction gear group 87 except for a part of this is supported on the lower face side of the chassis 76. The second reduction gear group 87 is geared with the rack gears each attached to the sliders 58.

The sliders 58 are moved in the forward/backward direction by driving force of the second driving motor 86 being propagated to the rack gears via the second reduction gear group 87. Upon the sliders 58 being moved in the forward/backward direction, as described later, the lower holder 62 of the disc holder 60 is moved in the vertical direction.

Accordingly, the second driving motor 86 and the second reduction gear group 87 serve as a moving mechanism for moving the disc holder 60 (lower holder 62). The moving mechanism includes an unshown encoder, and uses the encoder to determine a stop position in the vertical direction of the lower holder 62 based on information input to the information input sheet 32 serving as an information input medium added to the disc cartridge 1.

A drive unit 88 for performing recording or playback of information signals as to the disc-shaped recording media 100 is disposed on the lower edge portion on the front side within the outer casing 2 (see FIG. 9).

Operation of Disc Changer

Hereafter, operation of the disc changer 40 will be described (see FIGS. 18 through 42).

First, an initial state before the disc cartridge 1 is inserted into the disc changer 40 will be described (see FIGS. 18 through 20).

Figure 18:
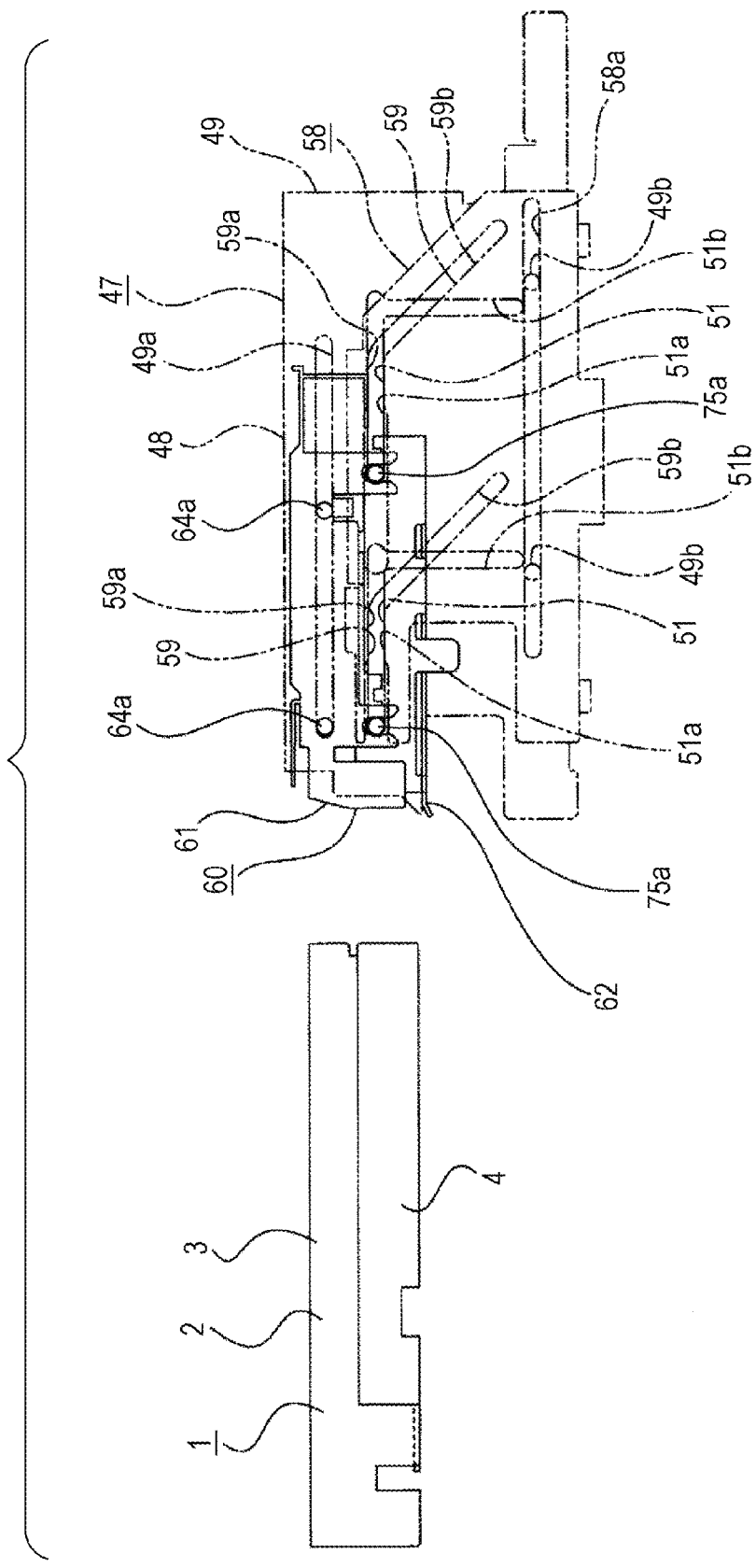
FIG. 18 illustrates the operation of the disc changer along with FIGS. 19 through 24, and is a schematic side view illustrating a state before the disc cartridge is inserted into the disc changer.

In the initial state, the slider 58 is positioned in the front movement edge, and the disc holder 60 is positioned in the rear movement edge (see FIG. 18).

At this time, with the upper holder 61, the slide pin 64a on the rear side is engaged with the rear edge portion of the support hole 49a in the holder cover 47. With the lower holder 62, the slide pin 75a is engaged with the rear edge portion of the horizontal portion 51a of the cam support hole 51 in the holder cover 47, and the rear edge portion of the straight line portion 59a of the cam hole 59 in the slider 58.

Figure 19:
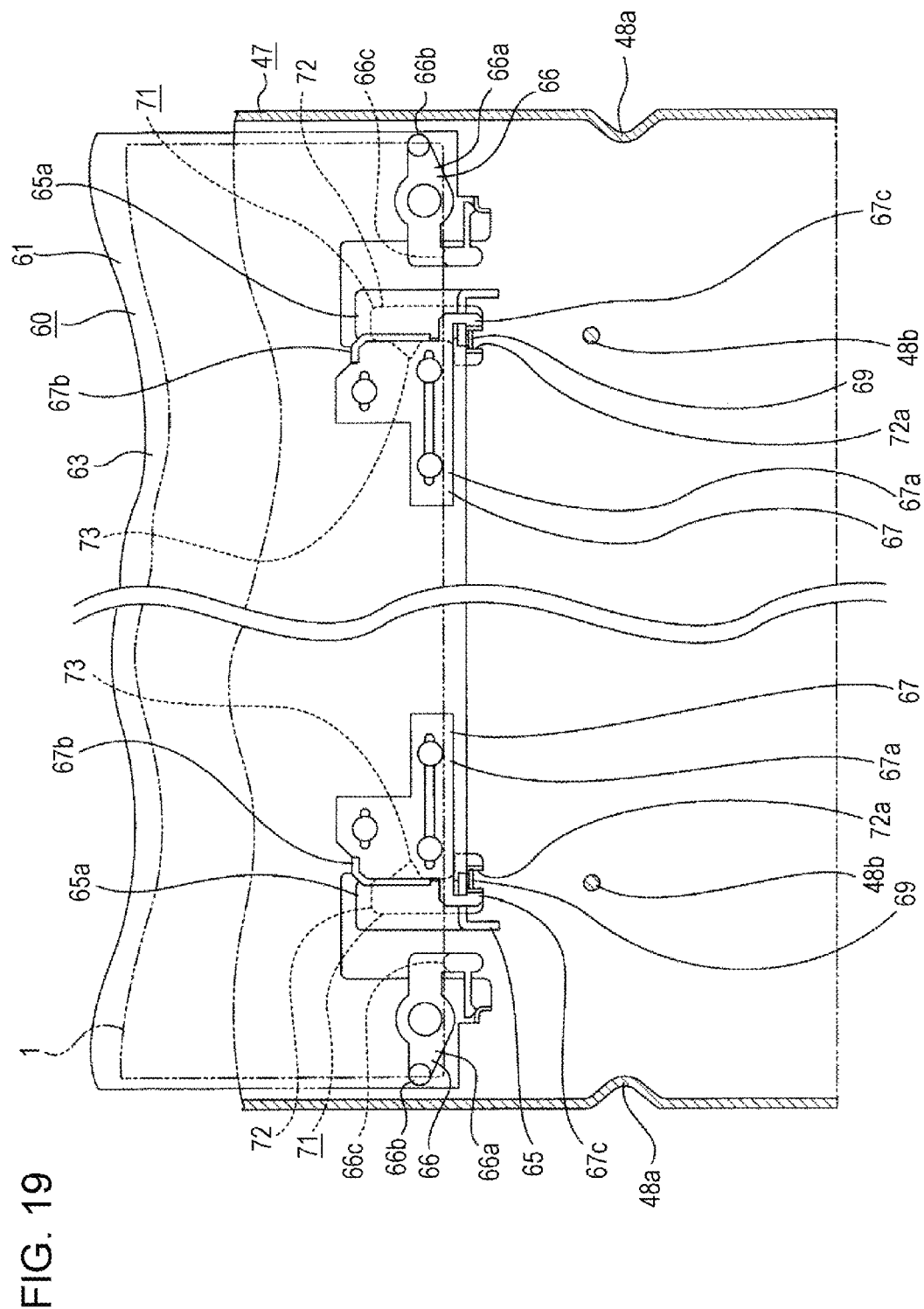
FIG. 19 is an enlarged plan view illustrating the initial state of each lever.
Figure 20:
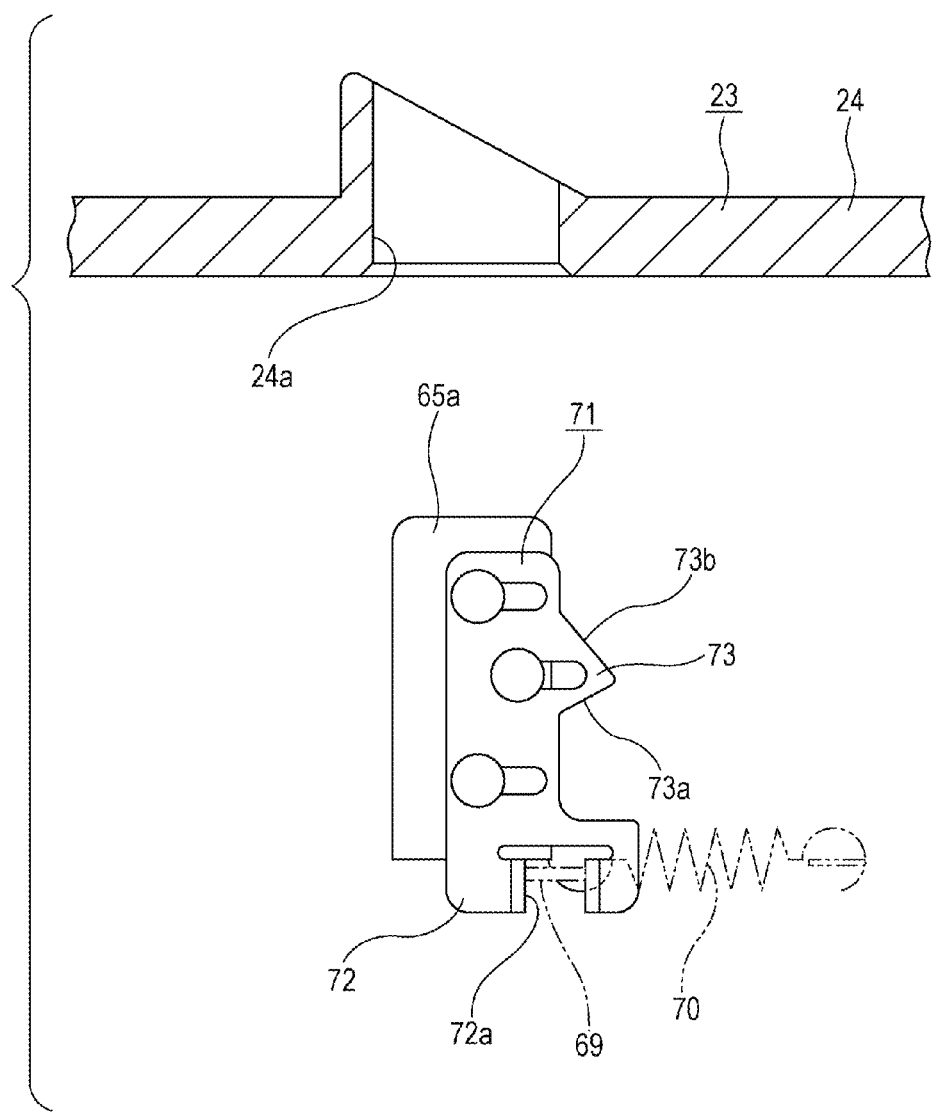
FIG. 20 is an enlarged plan view illustrating the initial state of a restricting lever, of which a part is illustrated with a cross section.

In the initial state, the pressure lever 66 supported by the disc holder 60 is in a state in which the pressure shaft portion 66c is positioned in the movement edge of the front side by pressing force of a spring member (see FIG. 19).

In the initial state, the releasing lever 69 supported by the disc holder 60 is positioned in a perpendicular state by pressing force of the spring 70. Accordingly, as illustrated in FIG. 20, the restricting lever 71 is held in the movement edge of the inner side, and the an actuating lever 67 is positioned in the movement edge of the outer side engaged by the activating protruding portion 67c is engaged with the upper edge portion of the restricting lever 71 from the outer side due to pressing force of the extension coil spring 68 (see FIG. 19).

In the initial state, the ejection lever 78 supported by the upper edge portion of the support member 77 is held in a state extending generally in the horizontal direction.

Figure 21:
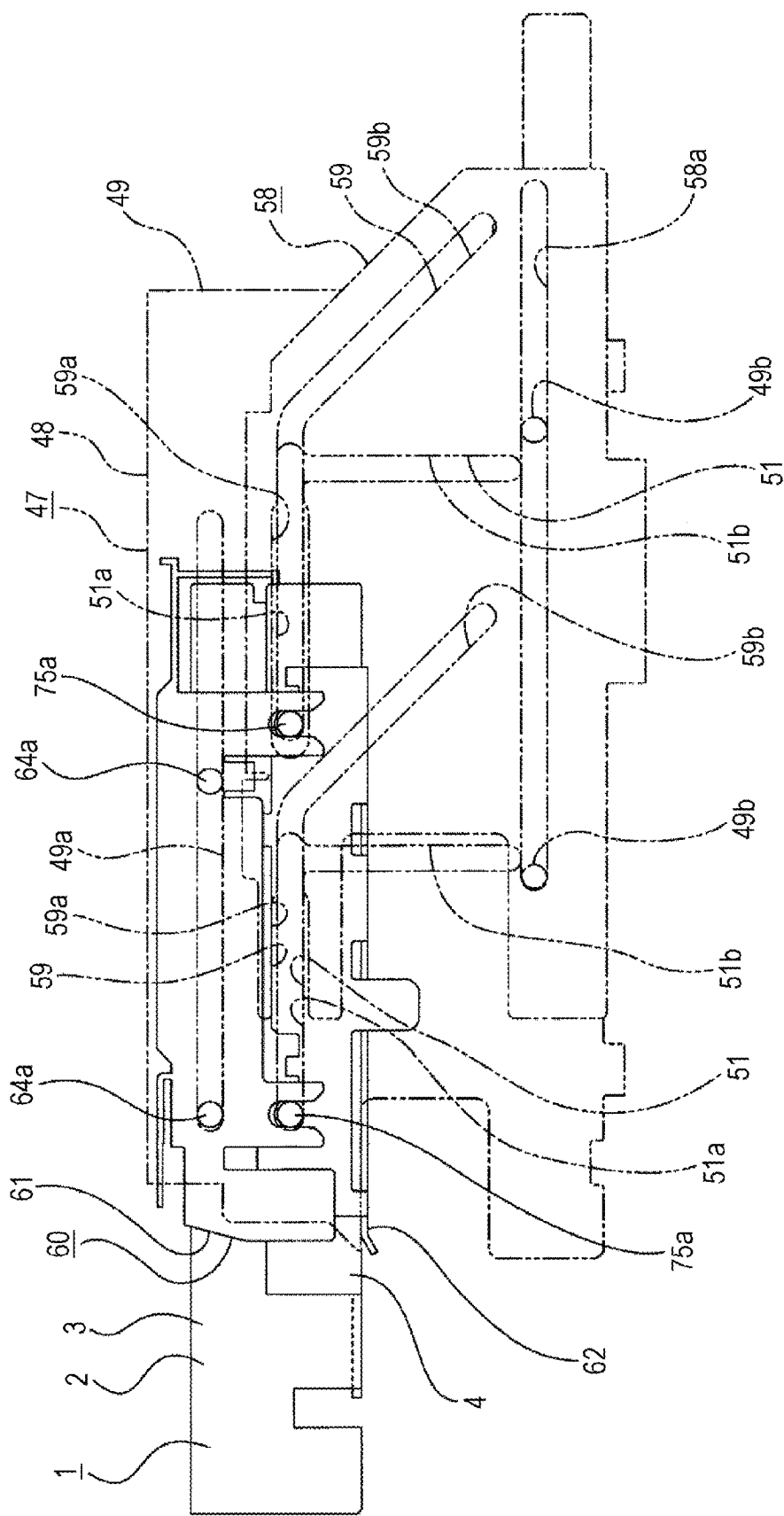
FIG. 21 is a schematic side view illustrating a state in which the disc cartridge is inserted into the disc cartridge.

In the above initial state, upon the disc cartridge 1 being inserted into the cartridge insertion/ejection opening of the panel 43, the disc cartridge 1 is inserted into the disc holder 60 from backward (see FIG. 21). When the disc cartridge 1 is gradually inserted from the cartridge insertion/ejection opening of the panel 43, the shutter 45 is pressed and turned.

Upon the disc cartridge 1 being gradually inserted into the disc holder 60 from behind, the releasing pieces 64b of the upper holder 61, and the holding pieces 75b of the lower holder 62 are inserted into the insertion slots 2a formed in the case body 2, respectively.

Upon the releasing pieces 64b being inserted into the insertion slots 2a respectively, when the disc cartridge 1 is moved to the depth side of the disc holder 60, the supported portions 19 of the locking sliders 18 are pressed by the releasing pieces 64b, respectively. Upon the supported portions 19 being pressed backward by the releasing pieces 64b respectively, the locking sliders 18 are moved backward against pressing force of the coil springs 22 respectively, and the locking portions 20 are pulled out from the second recessed portions 29b for locking of the second shell 4, respectively. Upon the locking portions 20 being pulled out from the second recessed portions 29b for locking respectively, locking between the first shell 3 and the second shell 4 by the locking sliders 18 is unlocked.

Figure 22:
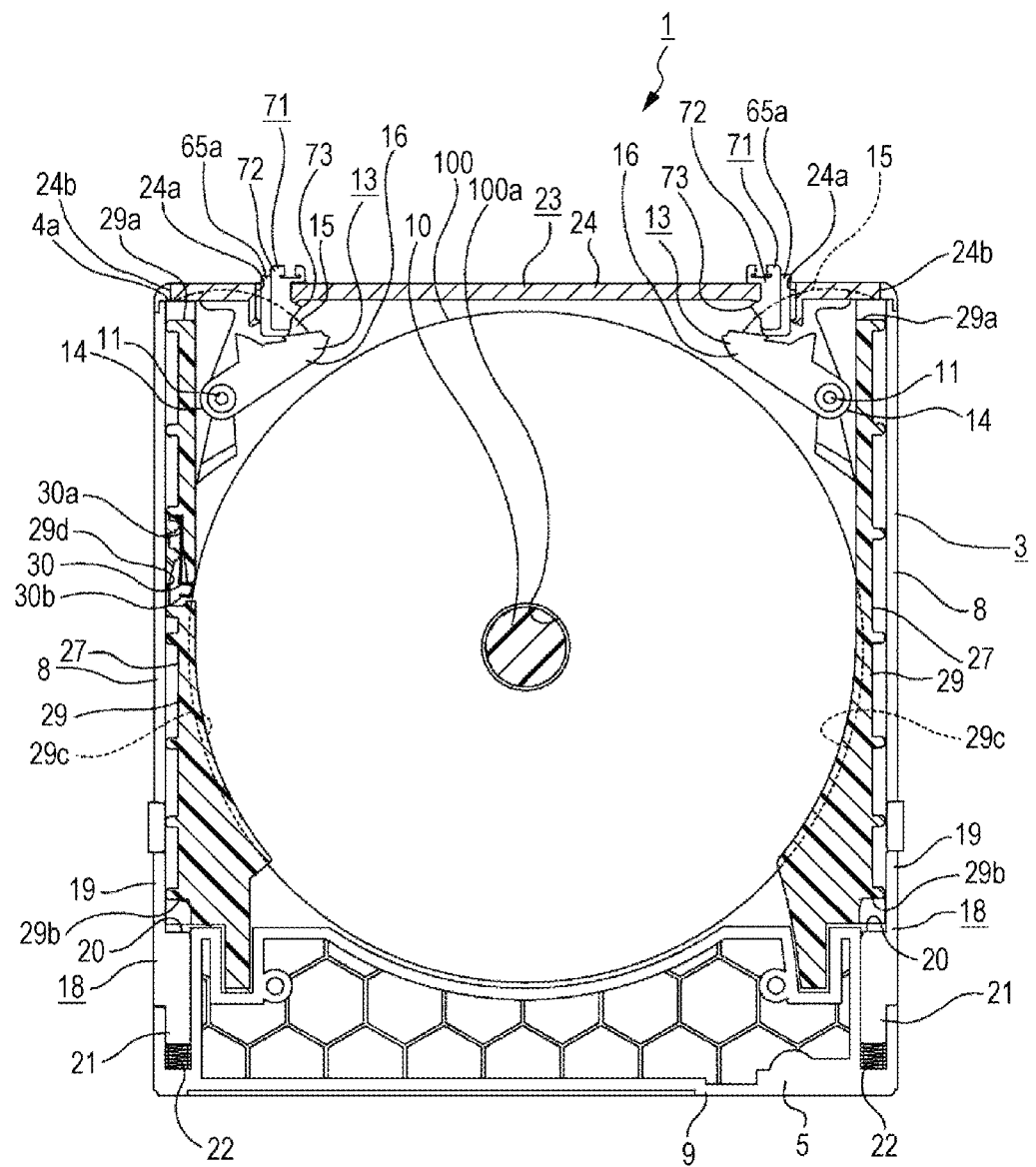
FIG. 22 is a cross-sectional view illustrating a state in which locking between the first shell and the second shell is unlocked.

Also, at this time, the unlocking pieces 65a provided to the disc holder 60 are inserted into the insertion holes 24a of the opening/closing panel 23 respectively (see FIG. 22). Upon the unlocking pieces 65a being inserted into the insertion holes 24a respectively, the unlocking portions 16 of the locking levers 13 are pressed backward by the unlocking pieces 65a respectively. Upon the unlocking portions 16 being pressed backward by the unlocking pieces 65a respectively, the locking levers 13 is turned against pressing force of the pressing springs 17, and the locking portions 15 are pulled out from the first recessed portions 29a for locking of the second shell 4. Upon the locking portions 15 being pulled out from the first recessed portions 29a for locking respectively, locking between the first shell 3 and the second shell 4 by the locking levers 13 is unlocked.

The above unlocking of locking between the first shell 3 and the second shell 4 by the locking levers 13 is performed at the same time as unlocking of locking between the first shell 3 and the second shell 4 by the locking sliders 18.

Upon locking between the first shell 3 and the second shell 4 by the locking levers 13, and the locking sliders 18 being unlocked, the first shell 3 and the second shell 4 proceed to a vertically separable state.

As described above, when the unlocking pieces 65a provided to the disc holder 60 are inserted into the insertion holes 24a of the opening/closing panel 23 respectively, at the same time the restricting levers 71 supported by the unlocking pieces 65a are gradually inserted into the insertion holes 24a from forward, respectively.

Figure 23:
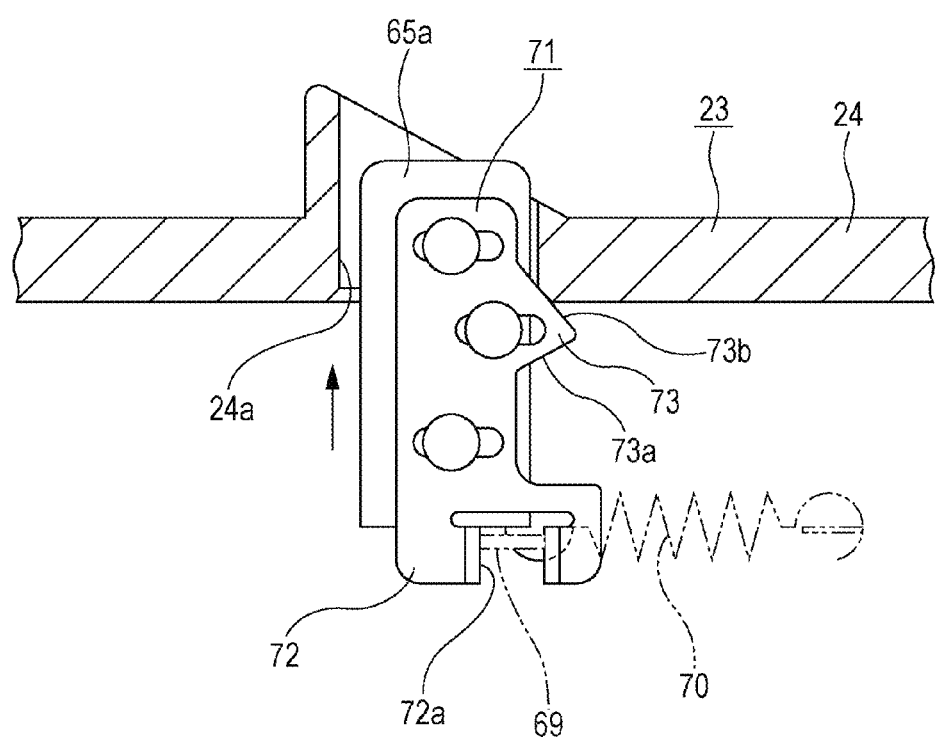
FIG. 23 is an enlarged plan view illustrating a state in which the restricting lever is inserted into an insertion hole, of which a part is illustrated with a cross section.

Upon the restricting levers 71 being gradually inserted into the insertion holes 24a, since the restricting levers 71 are positioned in the inner side movement edge by the springs 70, first the second slanting edge 73b slidably comes into contact with the front side opening edge of the insertion holes 24a, and are gradually moved outward against pressing force of the springs 70 (see FIG. 23).

Figure 24:
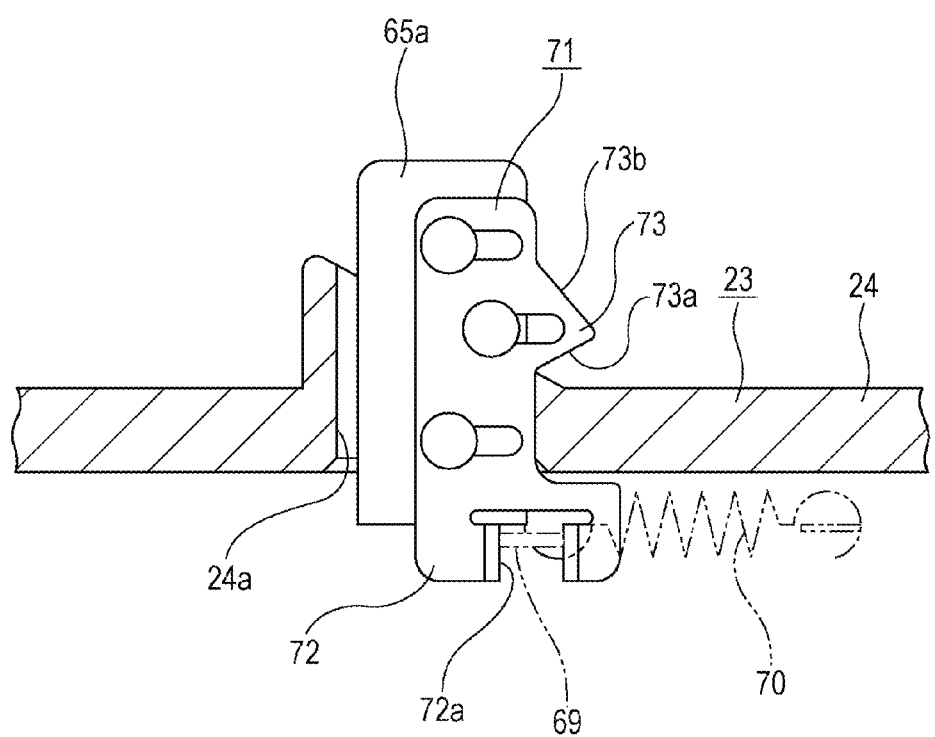
FIG. 24 is an enlarged plan view illustrating a state in which the restricting lever is inserted into the insertion hole, and movement of the disc cartridge is restricted by the restricting lever, of which a part is illustrated with a cross section.

Next, with the restricting levers 71, upon the tip of the restricting portion 73 slidably coming into contact with the opening edge of the insertion hole 24a, and the restricting portion 73 moving to the rear side of the insertion hole 24a, the restricting levers 71 are moved inward by pressing force of the springs 70, and the first slanting edge 73a is engaged with the rear side opening edge of the insertion hole 24a (see FIG. 24). Accordingly, movement backward (in the extracting direction) of the disc cartridge 1 is restricted by the restricting levers 71, and a state in which locking between the first shell 3 and the second shell 4 by the locking levers 13, and the locking sliders 18 is unlocked is held.

In this way, with the disc changer 40, there are provided the restricting levers 71 for restricting and holding movement backward of the disc cartridge 1 in a state in which locking as to the first shell 3 and the second shell 4 is unlocked, and accordingly, the holding state of the disc cartridge 1 by the disc holder 60 when the locking is unlocked can be secured. Accordingly, in a state in which the locking is unlocked, the disc cartridge 1 is prevented from being moved in the extracting direction, and state transition to an unintentional locked state is prevented, whereby the suitable holding state of the disc cartridge 1 by the disc holder 60 can be secured.

Also, the unlocking pieces 65a and restricting levers 71 of the disc holder 60 are inserted into the insertion holes 24a of the case body 2 at the same time, respectively, and accordingly, unlocking of the case body 2, and holding of the disc cartridge 1 by the restricting levers 71 are performed at the same time, whereby improvement in operating reliability, and speed-up of operation can be realized.

Further, the unlocking pieces 65a, and the restricting levers 71 are both formed in a plate shape, and are disposed in a state adjacent to the thickness direction, and accordingly, the insertion holes 24a can be reduced in size by that much, whereby reduction in the size of the disc cartridge 1 can be realized, and also entry of moisture and dust from the insertion holes 24a can be suppressed.

Note that, in a state in which restriction of movement of the disc cartridge 1 by the restricting levers 71 has been performed, when great external force (movement force) in the extracting direction is applied to the disc cartridge 1, e.g., when a user pulls out the disc cartridge 1 from the disc holder 60, the disc cartridge 1 can be pulled out from the disc holder 60 as follows.

Figure 25:
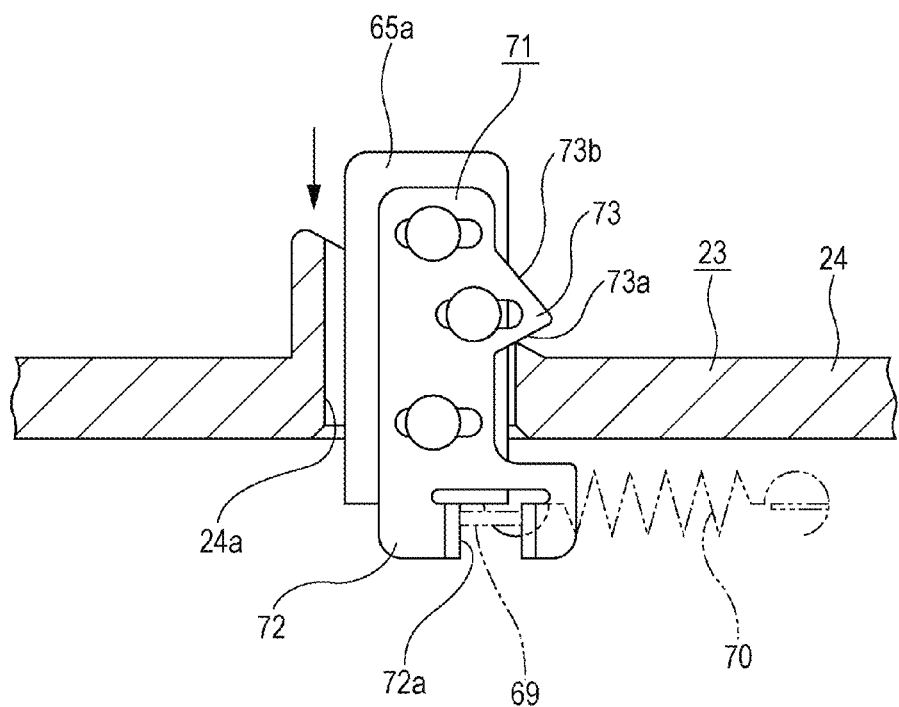
FIG. 25 is an enlarged plan view illustrating a state in which the disc cartridge is moved in the extracting direction in a state in which the restricting lever is inserted into the insertion hole, of which a part is illustrated with a cross section.

Upon great force in the extracting direction being applied to the disc cartridge 1, the restricting lever 71 is moved outward against the pressing force of the spring 70 by the first slanting edge 73a of the restricting portion 73 slidably coming into contact with the rear side opening edge of the insertion hole 24a (see FIG. 25).

Next, upon the tip of the restricting portion 73 slidably coming into contact with the opening edge of the insertion hole 24a, and the restricting portion 73 moving to the front side of the insertion hole 24a, the restricting lever 71 is moved inward by the pressing force of the spring 70, and engagement of the restricting portion 73 as to the case body 2 is released. Accordingly, restriction by the restricting levers 71 is released, and the disc cartridge 1 is moved in the extracting direction.

In this way, with the disc changer 40, in the state that the motion of the disc cartridge 1 is restricted by the restricting levers 71, there are formed first slanting edges 73a for allowing movement of the disc cartridge 1 in the extracting direction when great movement force is applied to the disc cartridge 1 in the extracting direction.

Accordingly, when great movement force is applied to the disc cartridge 1 in the extracting direction, no great load is applied to the disc cartridge 1 and disc changer 40, whereby damage of the disc cartridge 1 and disc changer 40 can be prevented.

As described above, when the disc cartridge 1 is inserted into the depth side of the disc holder 60, and movement in the extracting direction is restricted by the restricting levers 71, an unshown switch is operated by the disc cartridge 1, and the disc holder 60 and disc cartridge 1 are moved forward in an integral manner by an unshown transport mechanism.

Figure 26:
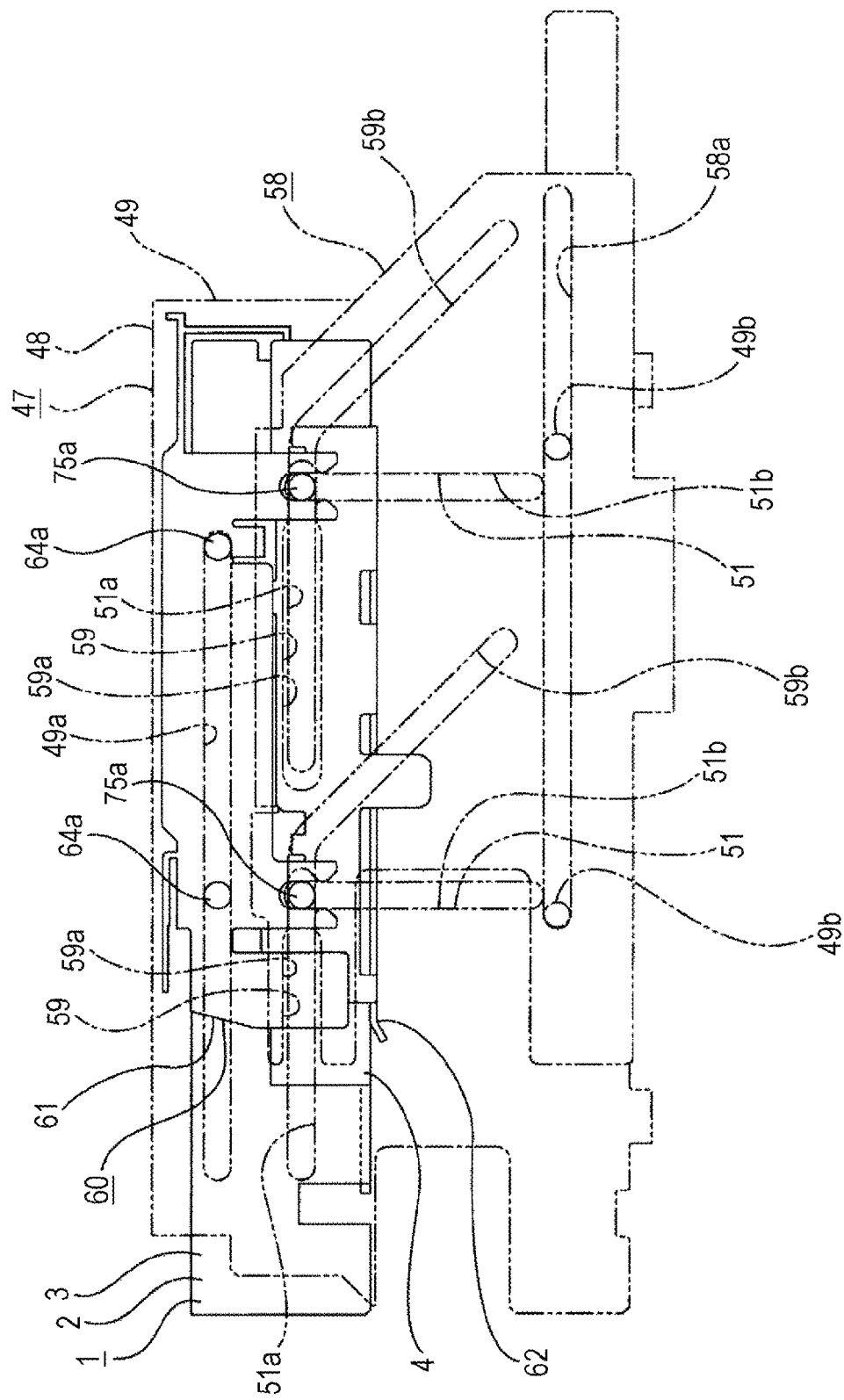
FIG. 26 is a schematic side view illustrating a state in which the disc holder is moved to a separable position.
Figure 27:
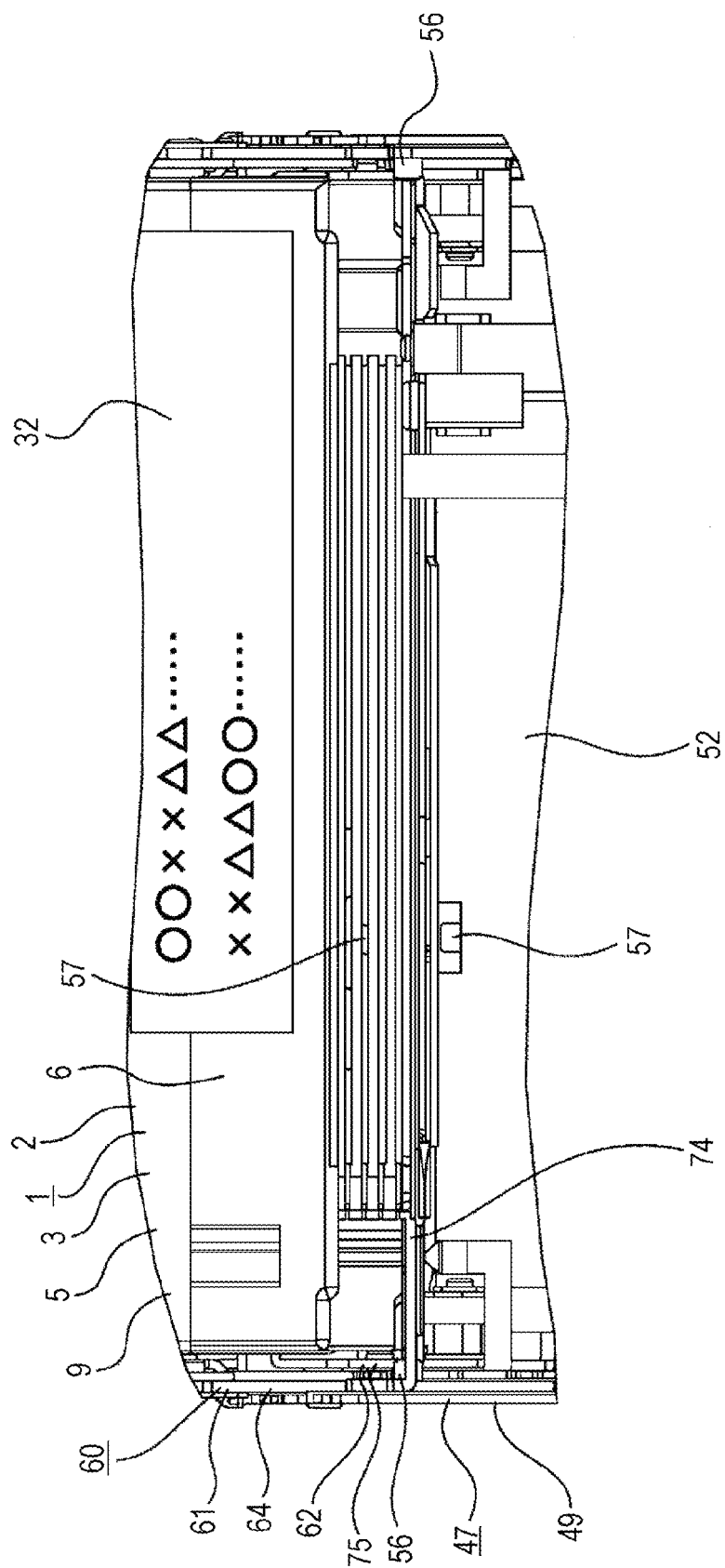
FIG. 27 is a rear view illustrating the position of an element for detection as to the disc cartridge.

With the disc holder 60, the slide pin 64a on the front side of the upper holder 61 is moved to the front edge portion of the support hole 49a in the holder cover 47, and with the lower holder 62, the slide pin 75a is moved to the front edge portion of the horizontal portion 51a of the cam support hole 51 in the holder cover 47, and to the front edge portion of the straight line portion 59a of the cam hole 59 in the slider 58 (see FIG. 26). A position where the slide pin 64a on the front side of the upper holder 61 is engaged with the front edge portion of the support hole 49a, and the slide pin 75a of the lower holder 62 is engaged with the front edge portion of the straight line portion 59a of the cam hole 59 is taken as a separation start position where separation between the upper holder 61 and lower holder 62 of the disc holder 60 is started.

When the disc holder 60 is moved to the separation start position, the entirety of the disc cartridge 1 is stored in the outer casing 41, and the cartridge insertion/ejection opening of the panel 43 is closed by the shutter 45 again.

When the disc holder 60 is moved to the separation start position, the disc holder 60 is positioned in an upward movement edge. At this time, the elements 56 for detection disposed in the side plate portions 49 of the holder cover 47 respectively are positioned in the same height as the lower face of the disc cartridge 1, for example (see FIG. 27). Upon the disc holder 60 being moved to the separation start position, the position of the lower face of the disc cartridge 1 is detected by the elements 56 for detection as the initial position in the vertical direction.

Note that, in a state in which the disc holder 60 has been moved to the separation start position, for example, the elements 56 for detection may be positioned in the same height as the lower face of the disc holder 60, and at this time, the position of the lower face of the lower holder 62 may be detected by the elements 56 for detection as the initial position in the vertical direction.

Also, an arbitrary position of the disc cartridge 1 or disc holder 60 may be detected as the initial position.

When the disc holder 60 is moved to the separation start position, information input to the information input sheet 32 adhered to the disc cartridge 1 is scanned by an unshown scanning device. Specifically, information relating to pitch between the disc-shaped recording media 100 stored in the case body 2, the number of stored disc-shaped recording media 100, and so forth are scanned by the scanning device.

Upon the disc holder 60 being moved to the separation start position, rotation of the second driving motor 86 is started, the driving force of the second driving motor 86 is propagated to the sliders 58 via the rack gears, and the sliders 58 are moved backward as to the holder cover 47. The sliders 58 are moved backward by the supported hole 58a being guided by the support protruding pins 49b of the holder cover 47.

Upon the slider 58 being moved backward, the slide pin 75a of the lower holder 62 in the disc holder 60 moves the slanting portion 59b of the cam hole 59 downward, and moves the vertical portion 51b of the cam support hole 51 in the holder cover 47 downward, and thus, the lower holder 62 is moved downward. At this time, with the disc cartridge 1, the first shell 3 is held by the unlocking pieces 65a and releasing pieces 64b of the upper holder 61, the second shell 4 is held by the holding pieces 75b of the lower holder 62, the first shell 3 is not moved downward, and the second shell 4 is moved downward integral with the lower holder 62. Consequently, the first shell 3 and the second shell 4 are separated.

Figure 28:
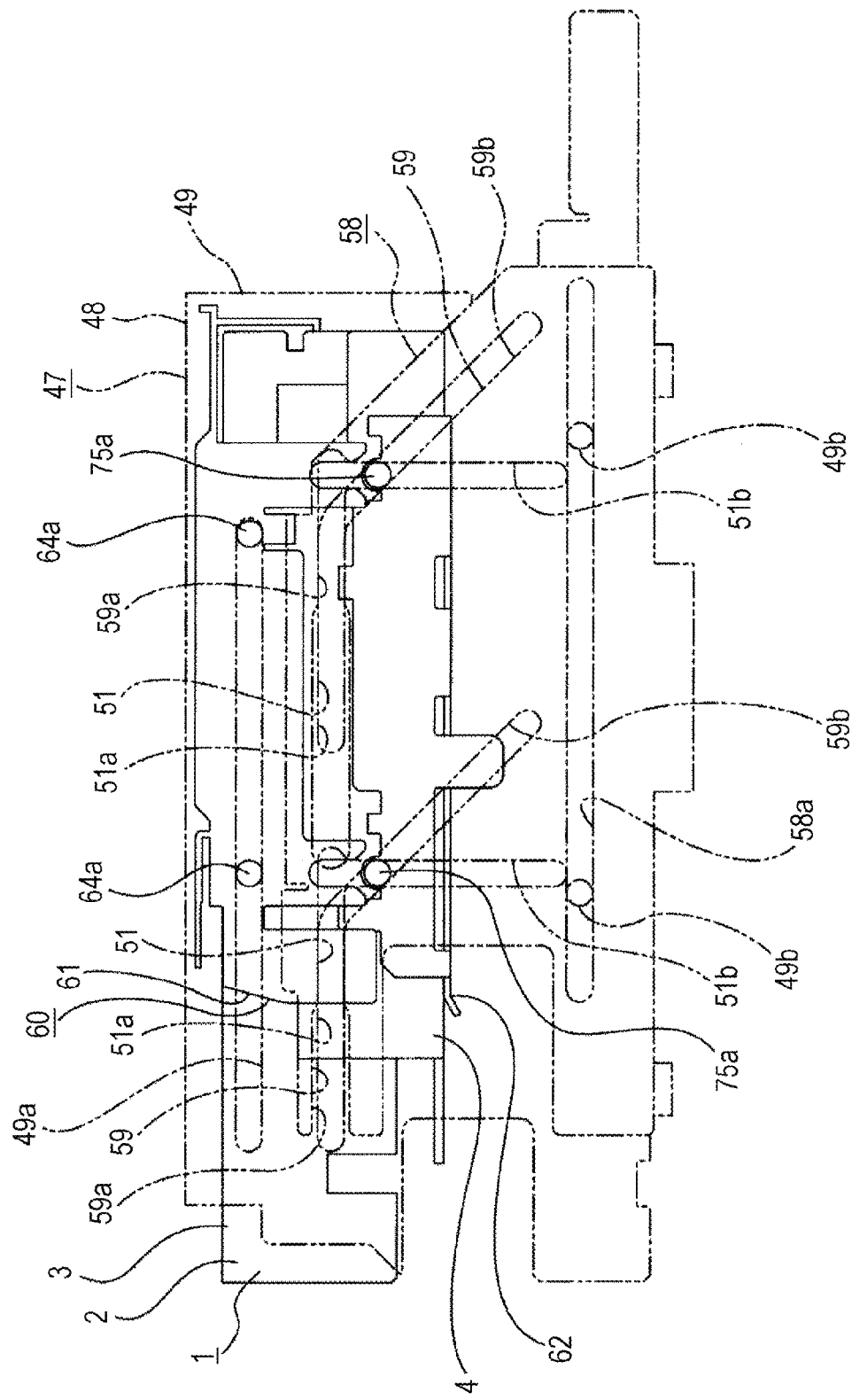
FIG. 28 is a schematic side view illustrating a state in the middle of the disc holder moving in the up-and-down direction.

Upon the slider 58 being moved backward, movement (descent) of the disc holder 60 is performed for the a distance equivalent to difference between the lower face of the disc-shaped recording medium 100 held by the lowest side holding slots 29c formed in the case body 2, and the lower face of the second shell 4 (see FIG. 28).

Figure 29:
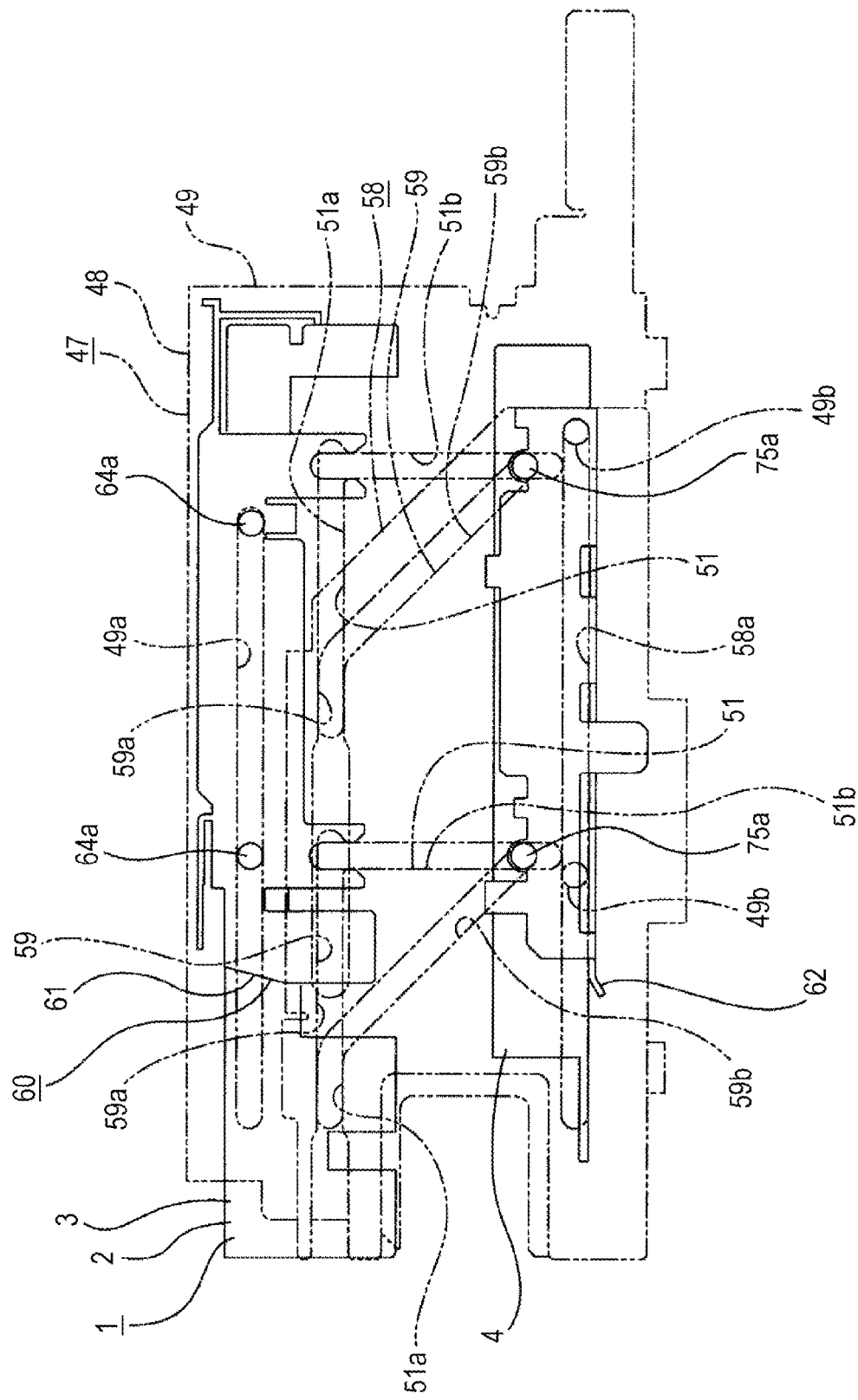
FIG. 29 is a schematic side view illustrating a state in which the disc holder is moved to a downward movement edge.

Subsequently, the slider 58 is moved backward by the driving force of the second driving motor 86, and the lower holder 62 is moved to the downward movement edge, for example (see FIG. 29). In a state in which the lower holder 62 has been moved to the downward movement edge, the slide pin 75a of the lower holder 62 is engaged with the lower edge portion of the slanting portion 59b of the cam hole 59, and the lower edge portion of the vertical portion 51b of the cam support hole 51.

Upon the lower holder 62 being moved and stopped by movement of the slider 58, rotation of the first driving motor 81 is started, and the ejection lever 78 is rotated.

Figure 30:
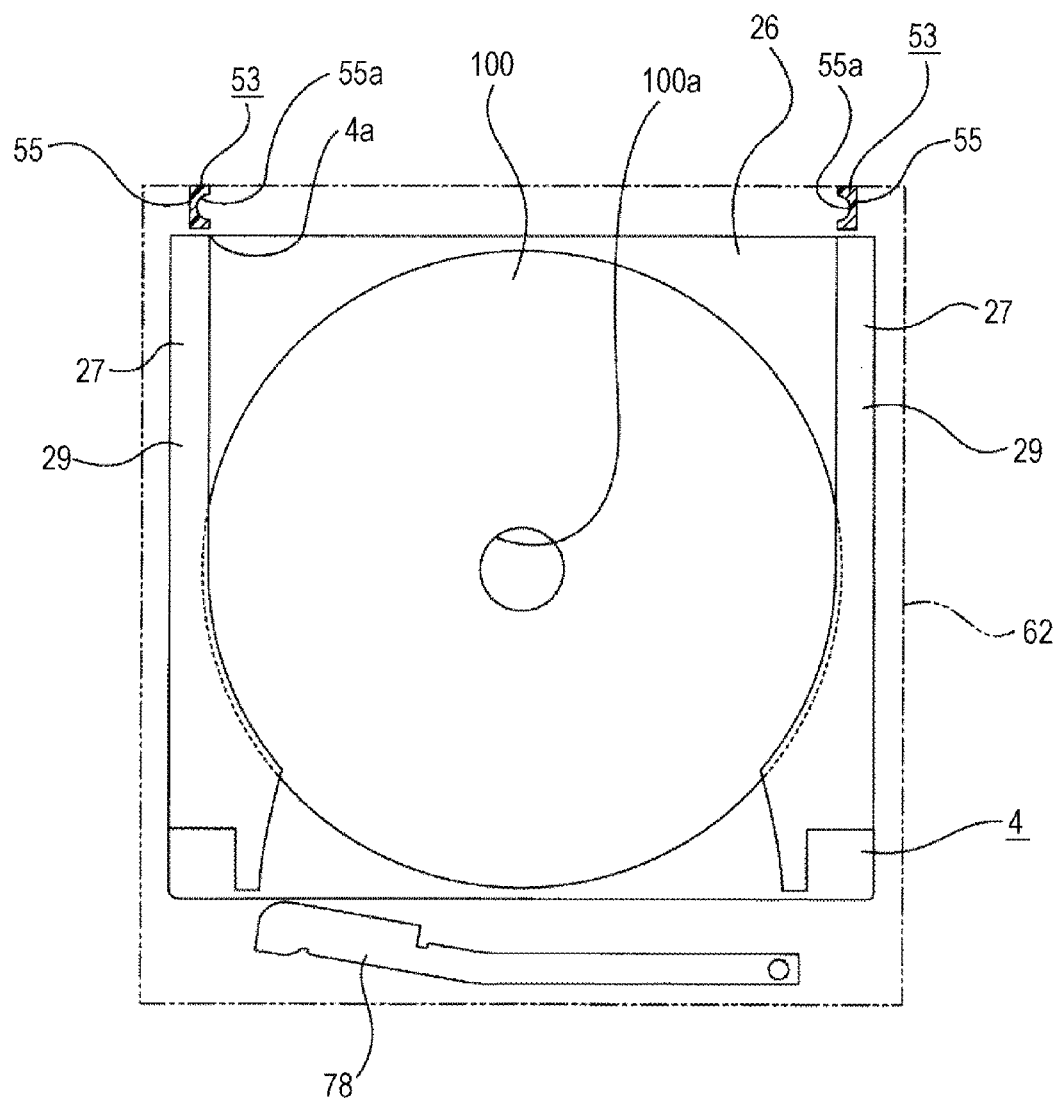
FIG. 30 is a schematic plan view illustrating a state before a disc-shaped recording medium is ejected from the second shell by an ejection lever.

The ejection lever 78 is positioned in the backward of the second shell 4 held by the lower holder 62 during movement of the lower holder 62 (see FIG. 30).

Figure 31:
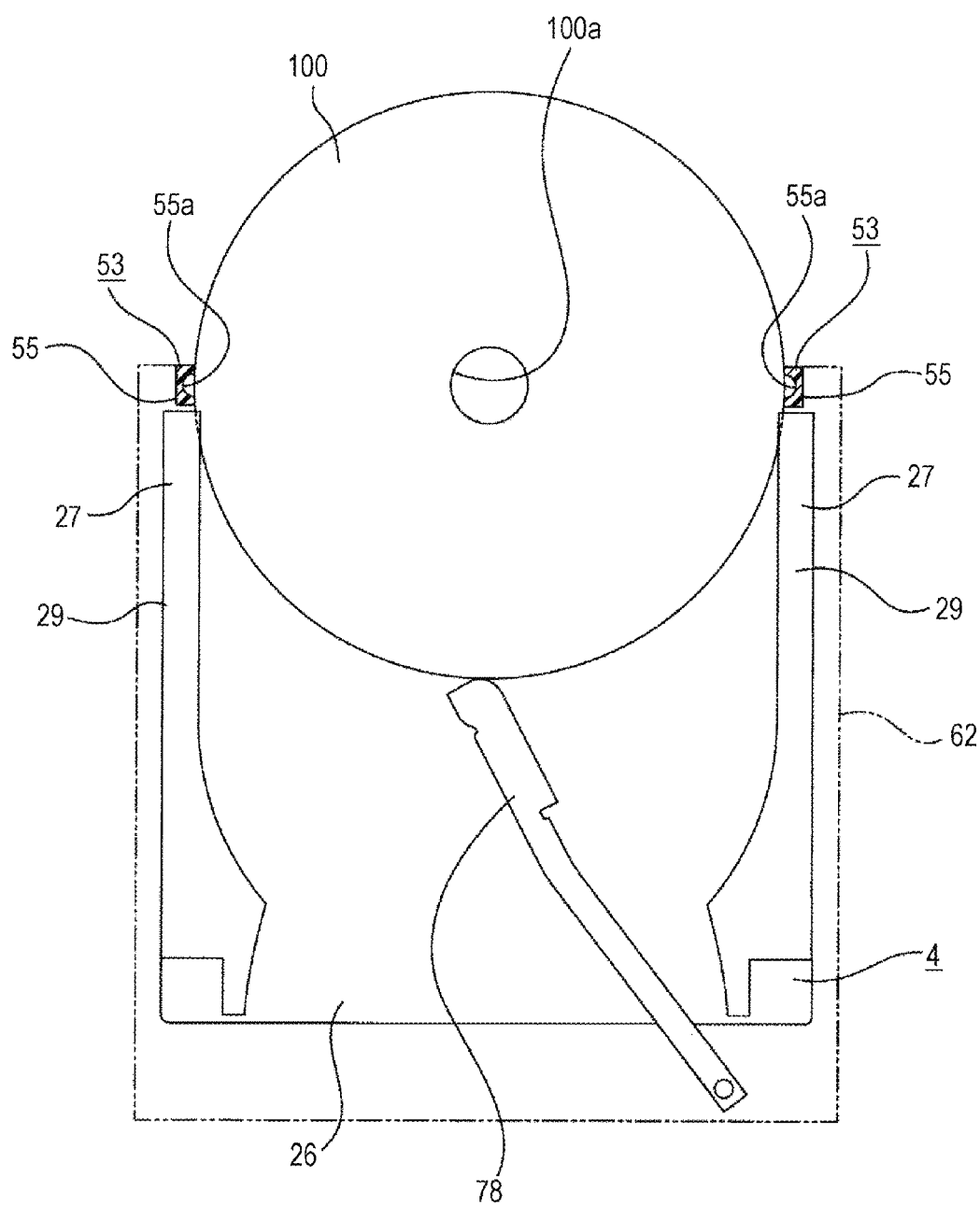
FIG. 31 is a schematic plane view illustrating a state in which the disc-shaped recording medium is ejected from the second shell by the ejection lever, and the disc-shaped recording medium is held by the holding member.

As described above, upon the ejection lever 78 being rotated, the outer face of the disc-shaped recording medium 100 existing at the height according to the stop position of the lower holder 62 is pressed forward by the ejection lever 78, and the pressed disc-shaped recording medium 100 is ejected to the drive unit 88 side from the second shell 4 (see FIG. 31). At this time, detection of the disc-shaped recording medium 100 to be ejected is performed by sensors 57 disposed on the protruding plate portion 50 and connecting member 52 in the holder cover 47.

With the disc changer 40, detection of the disc-shaped recording medium 100 to be ejected is performed by the sensors 57, and in the event that existence of the disc-shaped recording medium 100 has not been detected, the processing proceeds to the next operation.

Figure 32:
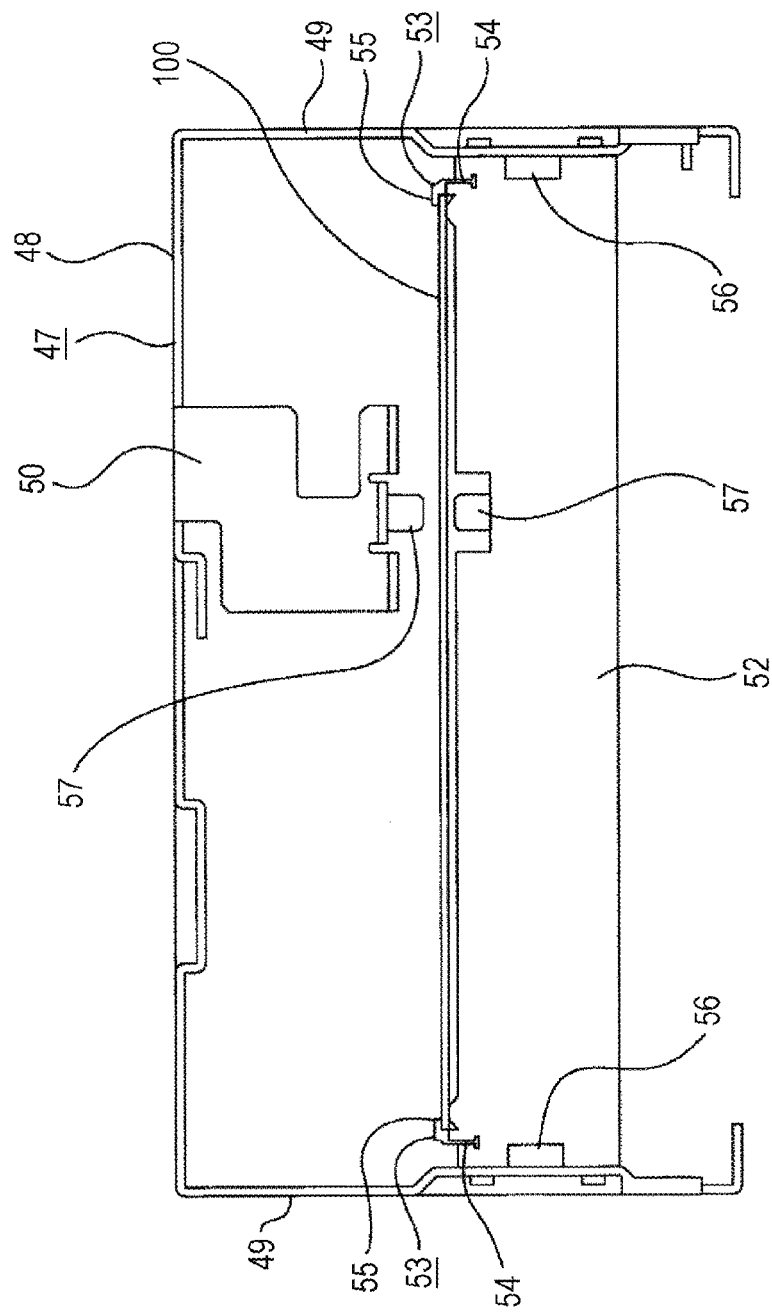
FIG. 32 is a front view illustrating a state in which the disc-shaped recording medium is ejected from the second shell by the ejection lever, and the disc-shaped recording medium is held by the holding member.
Figure 33:
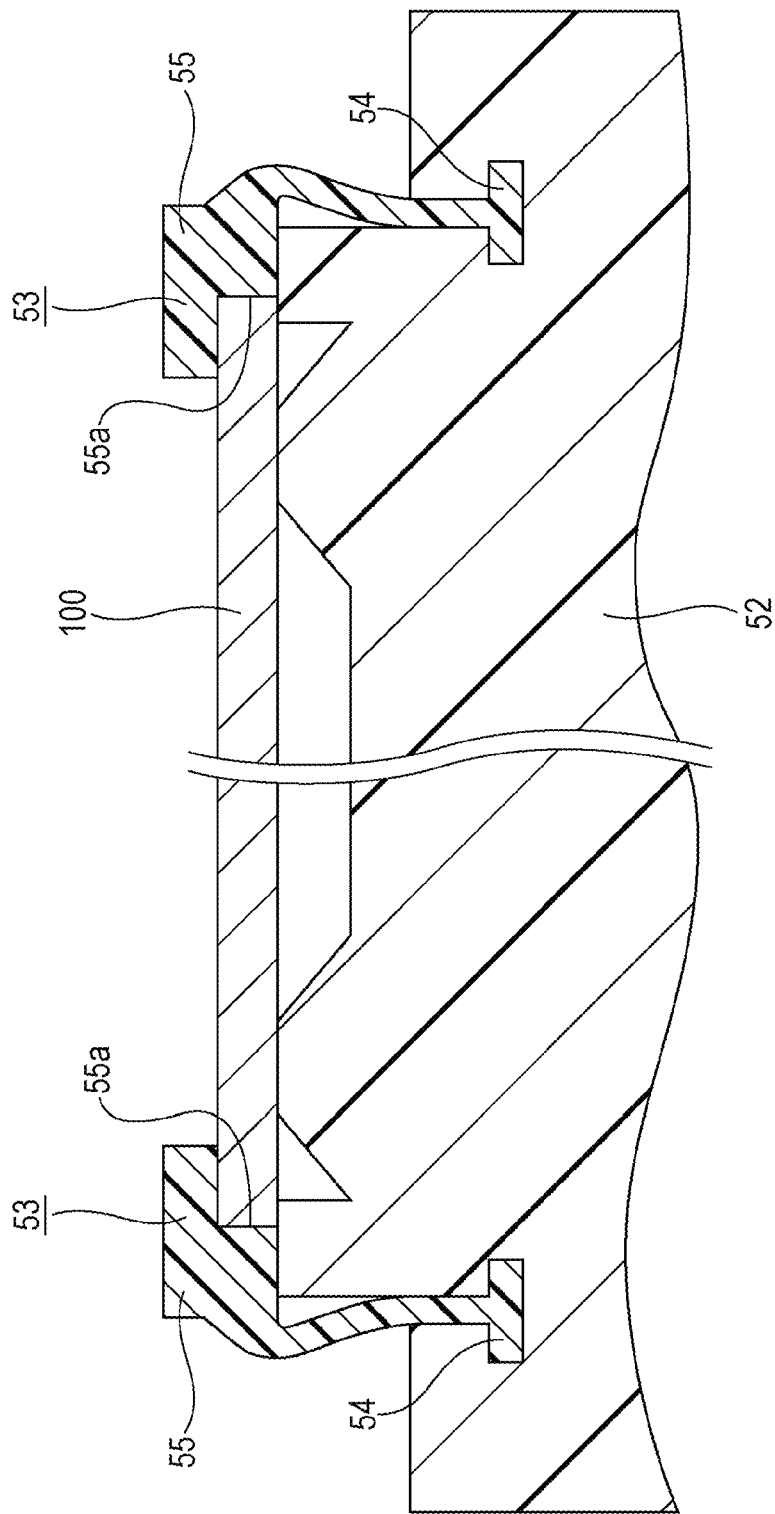
FIG. 33 is a conceptual diagram illustrating a state in which the disc-shaped recording medium is held by the holding member, and the holding member is subjected to elastic deformation.

When the disc-shaped recording medium 100 is ejected from the second shell 4 by the ejection lever 78, the disc-shaped recording medium 100 is inserted between the holding members 53, and the disc-shaped recording medium 100 is held by the holding faces 55a of the holding protruding portions 55 (see FIGS. 31 and 32). Distance between the holding members 53 is, as described above, slightly smaller than the diameter of the disc-shaped recording medium 100, and accordingly, the holding protruding portions 55 are subjected to elastic deformation in a mutually separated direction when the disc-shaped recording medium 100 is inserted between the holding members 53, and the disc-shaped recording medium 100 is held in a state sandwiched by the holding protruding portions 55 (see FIG. 33).

Figure 34:
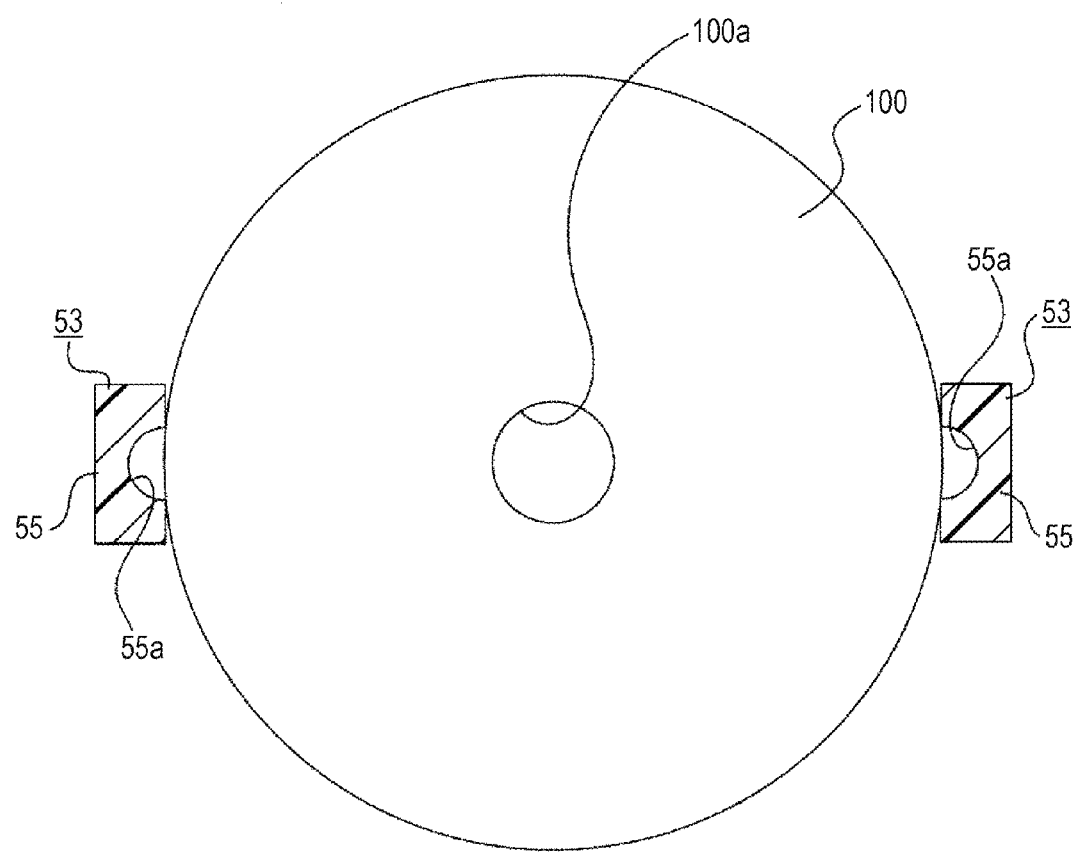
FIG. 34 is a conceptual diagram illustrating a state in which the disc-shaped recording medium is held by the holding member.
Figure 35:
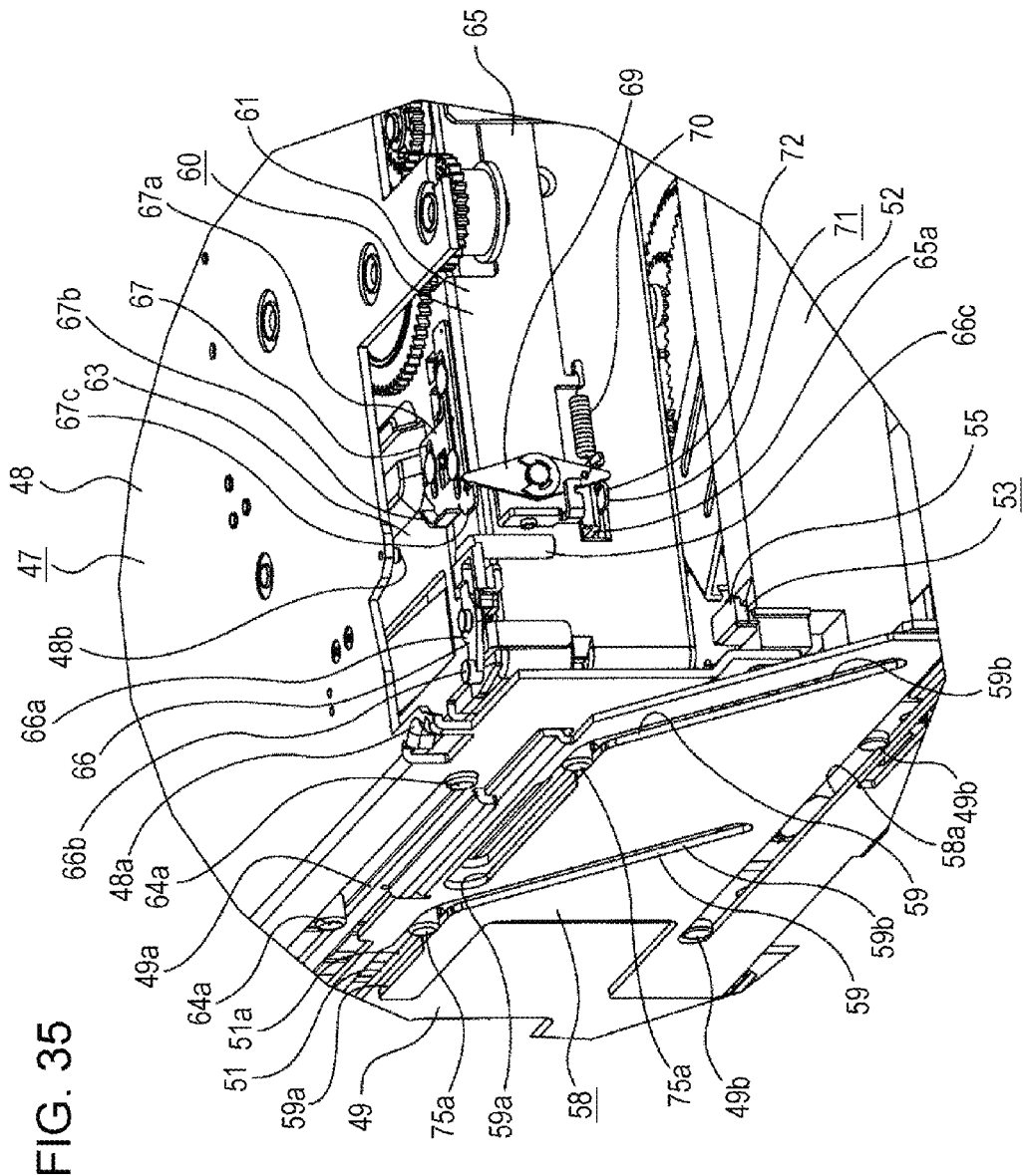
FIG. 35 is a perspective view illustrating a state in which the disc holder is positioned in a forward movement edge, during ejection operation.
Figure 36:
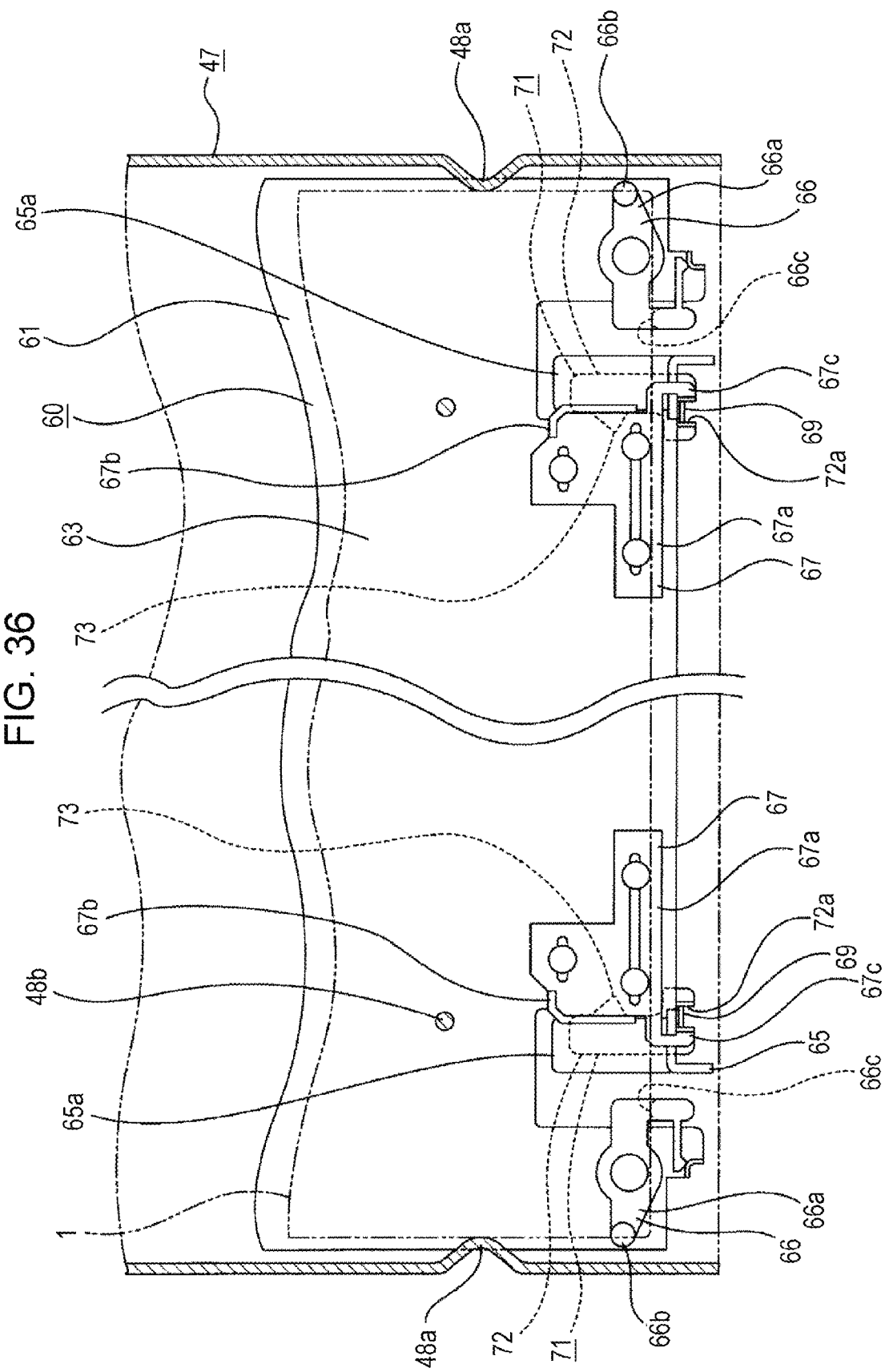
FIG. 36 is a schematic plan view illustrating a state in which the disc holder is positioned in the forward movement edge, during ejection operation.

Also, with regard to the holding faces 55a formed on the holding protruding portions 55 of the holding members 53, each of the curvatures is smaller than the curvature of the disc-shaped recording medium 100, and accordingly, the disc-shaped recording medium 100 is held in a state in which at least two portions of the holding protruding portions 55 are in contact with the outer face (see FIG. 34).

Upon the disc-shaped recording medium 100 being held by the holding members 53, the first driving motor 81 is inverted, and the ejection lever 78 is turned to the original position.

Upon the disc-shaped recording medium 100 being held by the holding members 53, the disc-shaped recording medium 100 held by the holding members 53 is ejected by an unshown disc ejection mechanism, and mounted on the drive unit 88, and recording or playback of information signals as to the disc-shaped recording medium 100 is performed.

In this way, the disc-shaped recording medium 100 ejected from the second shell 4 by the ejection lever 78 is temporarily held by the holding members 53, and accordingly, the ejection position of the disc-shaped recording medium 100 ejected from the second shell 4 becomes a fixed position, and suitability of the ejection operation of the disc-shaped recording medium 100 by the disc ejection mechanism can be realized.

Also, with the disc changer 40, pressing force of the ejection lever 78 as to the disc-shaped recording medium 100 is set smaller than the holding force of the holding members 53 as to the disc-shaped recording medium 100.

Accordingly, when the disc-shaped recording medium 100 is ejected from the second shell 4 by the ejection lever 78, the ejected disc-shaped recording medium 100 is held by the holding members 53 in a sure manner, whereby further suitability of ejection operation of the disc-shaped recording medium 100 by the disc ejection mechanism can be realized.

Note that there may be a case where the disc-shaped recording medium 100 is ejected from the second shell 4 in a direction where the disc-shaped recording medium 100 faces the horizontal direction and is mounted, depending on the type of the disc changer, but in this case, the ejected disc-shaped recording medium 100 is in a state of being easy to roll. Accordingly, as described above, there are provided the holding members 53 for holding the disc-shaped recording medium 100 ejected from the second shell 4 by the ejection lever 78, whereby suitability of the ejection operation of the disc-shaped recording medium 100 by the disc ejection mechanism can be realized by preventing rolling of the disc-shaped recording medium 100.

Also, the holding members 53 hold the disc-shaped recording medium 100 in a state subjected to elastic deformation, whereby holding of the disc-shaped recording medium 100 can be performed in an easy and sure manner.

Further, when the disc-shaped recording medium 100 is held by the holding members 53, the outer face of the disc-shaped recording medium 100 is in contact with at least two portions of the holding protruding portions 55 at a time, whereby stability of the holding state of the disc-shaped recording medium 100 by the holding members 53 can be realized.

Additionally, the holding faces 55a of the holding members 53 are formed in an arc face shape, and the curvatures of the holding faces 55a are set smaller than the curvature of the disc-shaped recording medium 100. Accordingly, the disc-shaped recording medium 100 is held by the holding members 53 in a state subjected to point contact, stability of the holding state of the disc-shaped recording medium 100 by the holding members 53 can be realized, and also damage of the outer face when holding the disc-shaped recording medium 100 can be prevented.

The disc-shaped recording medium 100 where recording or playback of information signals has been completed is ejected from the drive unit 88 by the disc ejection mechanism by the ejection button 46 disposed on the panel 43 of the outer casing 41 being operated, ejection operation is started. The disc-shaped recording medium 100 ejected by the disc ejection mechanism is held by the holding slots 29c existing in predetermined positions of the second shell 4 again.

Upon the disc-shaped recording medium 100 being held by the second shell 4, inversion of the second driving motor 86 is started, and the sliders 58 are moved forward as to the holder cover 47.

Upon the slider 58 being moved forward, the slide pin 75a of the lower holder 62 moves the slanting portion 59b of the cam hole 59 upward, moves the vertical portion 51b of the cam support hole 51 in the holder cover 47 upward, and the lower holder 62 is moved upward integral with the second shell 4.

The lower holder 62 is, for example, moved to the upward movement edge, and the second shell 4 is connected to the first shell 3 (see FIG. 26). In a state in which the lower holder 62 is moved to the upward movement edge, the slide pin 75a of the lower holder 62 is engaged with the front edge portion of the straight line portion 59a of the cam hole 59, and the upper edge portion of the vertical portion 51b of the cam support hole 51 of the holder cover 47.

In the event that the lower holder 62 has moved from the downward movement edge to the upward movement edge, the upper holder 61 is positioned in the forward movement edge. At this time, the pressure lever 66 is positioned apart in front of the cam protruding piece 48a provided to the top panel portion 48 of the holder cover 47, and the actuating lever 67 is positioned apart in front of the pressure pin 48b provide to the top panel portion 48 of the holder cover 47 (see FIGS. 35 and 36).

Upon the lower holder 62 being moved from the downward movement edge to the upward movement edge, and the second shell 4 being coupled with the first shell 3, the disc holder 60 is gradually moved backward integral with the disc cartridge 1 by the transport mechanism.

Figure 37:
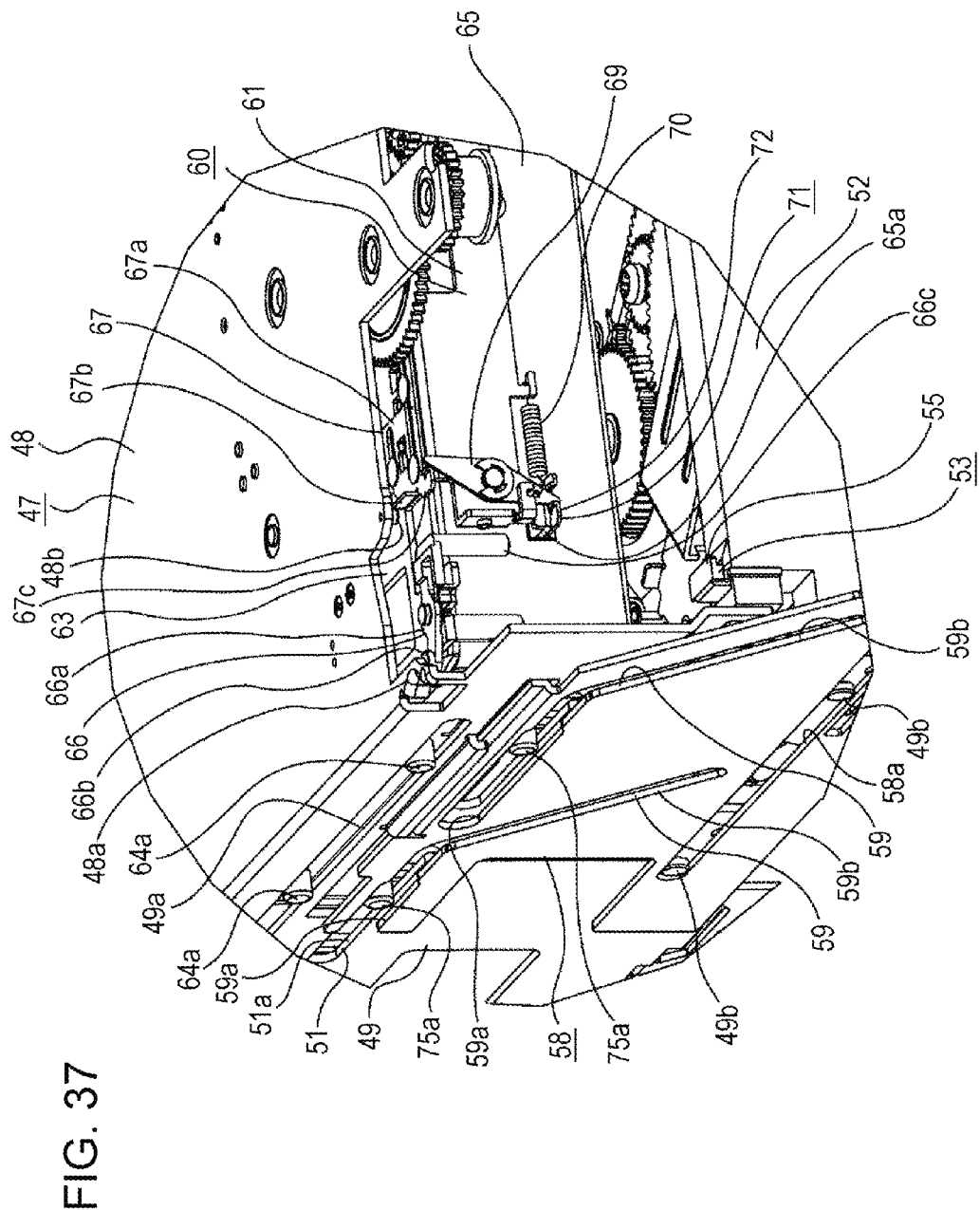
FIG. 37 is a perspective view illustrating a state in which the disc holder is moved backward, and a releasing lever is turned, during ejection operation.
Figure 38:
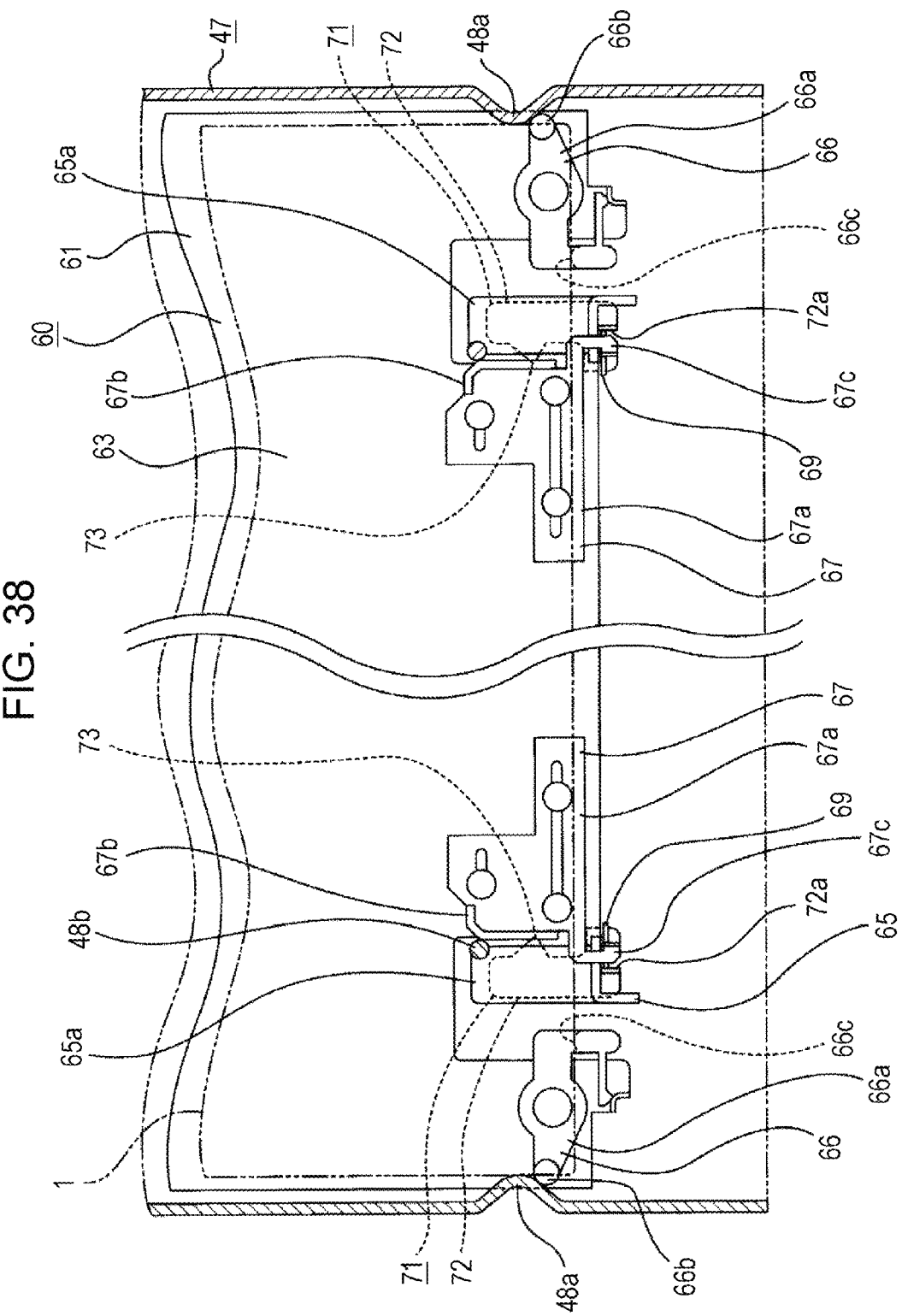
FIG. 38 is a schematic plan view illustrating a state in which the disc holder is moved backward, and an actuating lever is moved by a pressing pin, during ejection operation.
Figure 39:
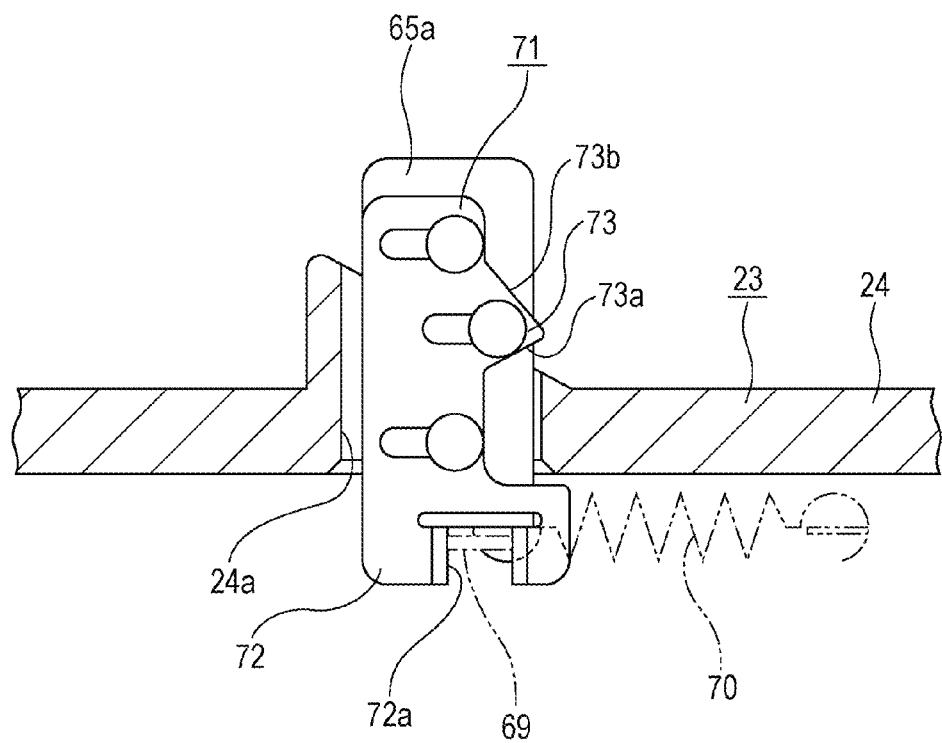
FIG. 39 is a schematic plan view illustrating a state in which the disc holder is moved backward, and restriction by the restricting lever is released, during ejection operation.

Upon the disc holder 60 being gradually moved backward integral with the disc cartridge 1, the pressure pin 48b of the holder cover 47 slidably comes into contact with the activating face portion 67b of the actuating lever 67, and the actuating lever 67 is moved inward against the pressing force of the spring 70 (see FIGS. 37 and 38). Upon the actuating lever 67 being moved inward, the upper edge portion of the releasing lever 69 being pressed by the activating protruding portion 67c of the actuating lever 67, the releasing lever 69 is turned, and the restricting lever 71 is moved outward. Accordingly, engagement of the restricting portion 73 of the restricting lever 71 as to the opening edge of the insertion hole 24a is released, and restriction for backward (extracting direction) movement of the disc cartridge 1 by the restricting lever 71 is released (see FIG. 39).

Figure 40:
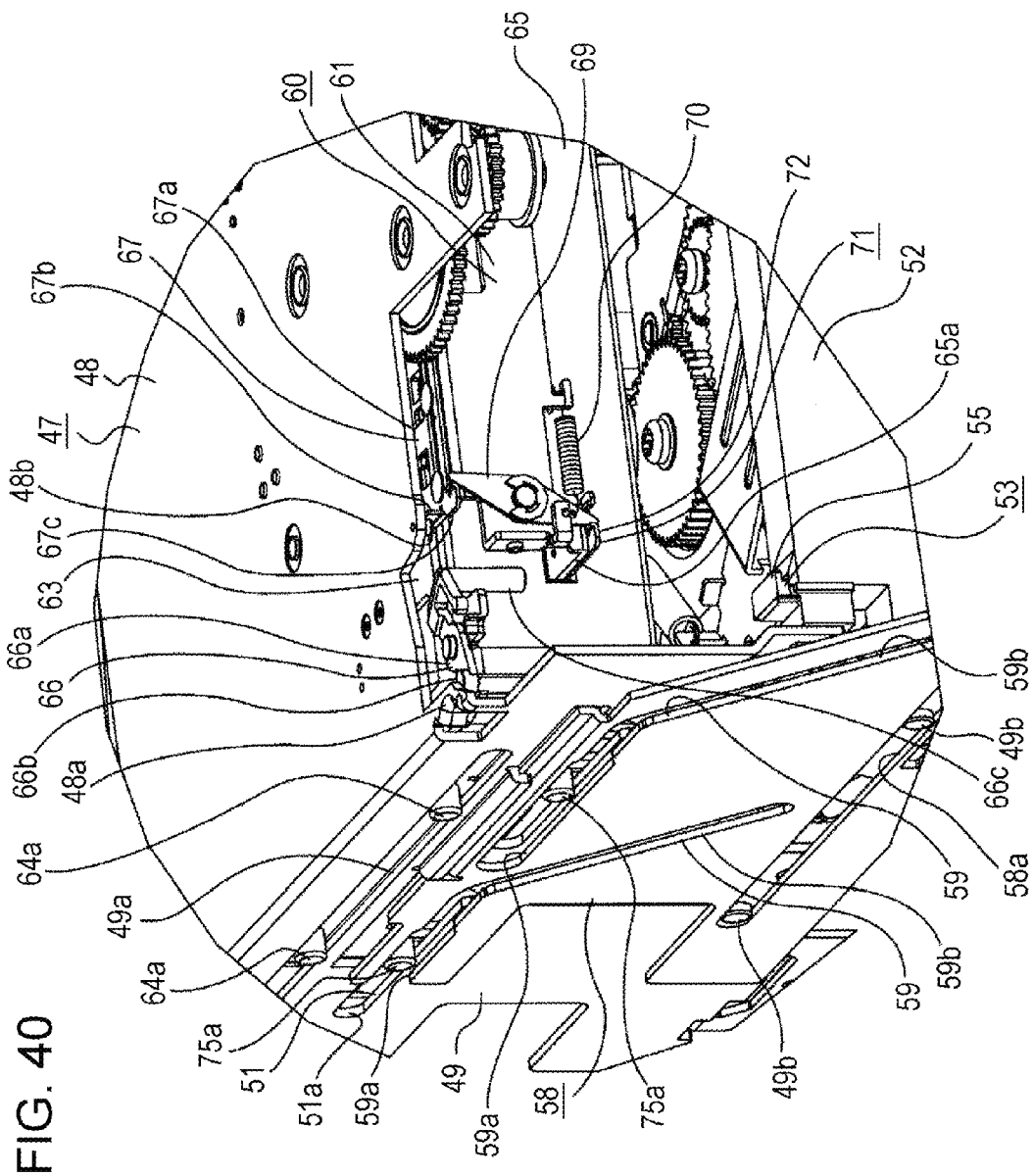
FIG. 40 is a perspective view illustrating a state in which the disc holder is moved backward, and a pressure lever is turned, during ejection operation.
Figure 41:
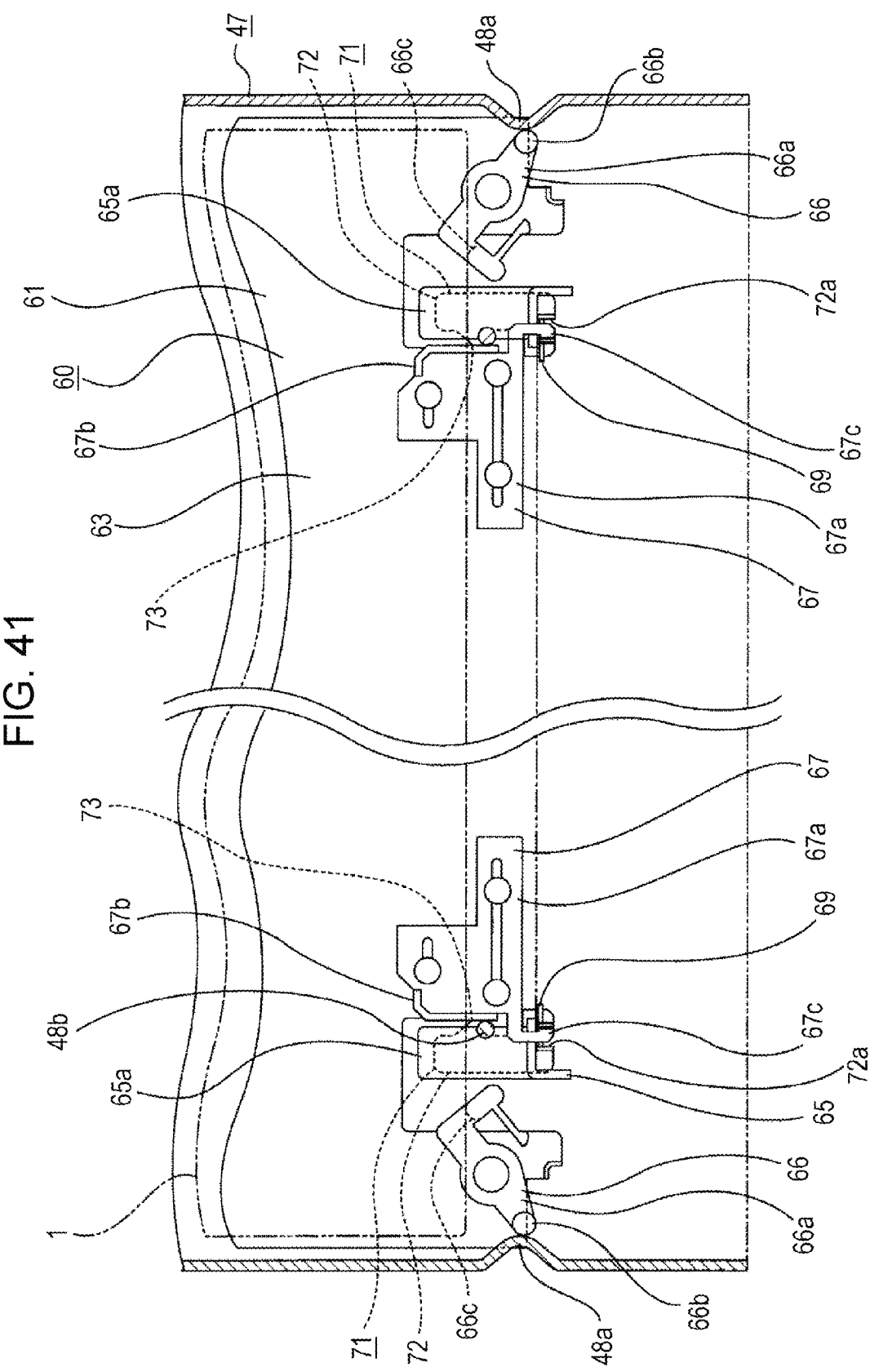
FIG. 41 is a schematic plan view illustrating a state in which the disc holder is moved backward, and the disc cartridge is pressed by the pressure lever, during ejection operation.

Subsequently, upon the disc holder 60 being moved backward integral with the disc cartridge 1, the cam protruding piece 48a of the holder cover 47 slidably comes into contact with the slide protruding portion 66b of the pressure lever 66, the pressure lever 66 is turned, and the pressure shaft portion 66c is moved generally backward (see FIGS. 40 and 41). Upon the pressure shaft portion 66c being moved generally backward according to turning of the pressure lever 66, the panel portion 24 of the case body 2 is pressed from the front by the pressure shaft portion 66c, and the disc cartridge 1 is moved backward as to the disc holder 60.

Movement backward of the disc cartridge 1 as to the disc holder 60 is smoothly performed since restriction by the restricting levers 71 is released as described above.

Upon the disc cartridge 1 being moved backward as to the disc holder 60, the unlocking pieces 65a provided to the upper holder 61 are pulled out from the insertion holes 24a of the opening/closing panel 23, respectively. Upon the unlocking pieces 65a being pulled out from the insertion holes 24a respectively, the locking lever 13 are turned by pressure force of the pressing springs 17, the locking portions 15 are inserted into and engaged with the first recessed portions 29a for locking of the second shell 4 respectively, and the first shell 3 and the second shell 4 are locked in a coupled state.

At the same time, according to movement backward of the disc cartridge 1 as to the disc holder 60, pressure as to the locking sliders 18 is released by the releasing pieces 64b provided to the upper holder 61. Upon pressure as to the locking sliders 18 being released by the releasing pieces 64b, the locking sliders 18 are moved forward by pressure force of the coil springs 22, the locking portions 20 are inserted into and engaged with the second recessed portions 29b for locking of the second shell 4 respectively, and the first shell 3 and the second shell 4 are locked in a coupled state.

As described above, with the disc changer 40, there are provided the releasing levers 69 for releasing restriction as to the disc cartridge 1 by the restricting levers 71 when the disc cartridge 1 is pulled out from the disc holder 60. Accordingly, pullout of the disc cartridge 1 from the disc holder 60 can be performed in a smooth and sure manner.

Also, with the disc changer 40, there are provided the pressure levers 66 for pressing the disc cartridge 1 in the pullout direction when restriction as to the disc cartridge 1 by the restricting levers 71 is released by the releasing levers 69.

Accordingly, the disc cartridge 1 can be pulled out from the disc holder 60 without receiving influence from the restricting levers 71, whereby pullout of the disc cartridge 1 from the disc holder 60 can be performed in a smooth and sure manner.

The disc holder 60 is moved to the backward movement edge by the transport mechanism (see FIG. 21), and the rear edge portion of the disc cartridge 1 protrudes backward from the cartridge insertion/ejection opening of the panel 43.

In a state in which the disc holder 60 has been moved to the backward movement edge, engagement between the activating face portion 67b of the actuating lever 67 and the pressure pin 48b of the holder cover 47 is released, and the actuating lever 67, releasing lever 69, and restricting lever 71 return to the initial state. Accordingly, the releasing lever 69 is positioned in a perpendicular state by the pressure force of the spring 70, the restricting lever 71 is held on the inner side movement edge, and the actuating lever 67 is moved to the outer side movement edge by the pressure force of the extension coil spring 68 (see FIG. 19).

Also, in a state in which the disc holder 60 has been moved to the backward movement edge, engagement between the slide protruding portion 66b of the pressure lever 66 and the cam protruding piece 48a of the holder cover 47 is released, and the pressure lever 66 also return to the initial state. Accordingly, the pressure lever 66 is set to a state in which the pressure shaft portion 66c is positioned in the backward side movement edge by the pressure force of the spring member (see FIG. 19).

The user is allowed to pull out the disc cartridge 1 from the disc changer 40 by gripping the rear edge portion of the disc cartridge 1 protruding backward from the cartridge insertion/ejection opening of the panel 43.

Note that pullout of the disc cartridge 1 from the disc changer 40 may also be performed by gripping and pulling out the grippers 6a formed on the case body 2 by an unshown disc gripping mechanism. Alternatively, the grippers 6a may be gripped by the disc gripping mechanism to insert the disc cartridge 1 into the disc changer 40.

With the disc changer 40, as described above, information input to the information input sheet 32 of the disc cartridge 1 is scanned by the scanning device, and movement in the vertical direction of the above-described lower holder 62 is performed based on this scanned information.

Figure 42:
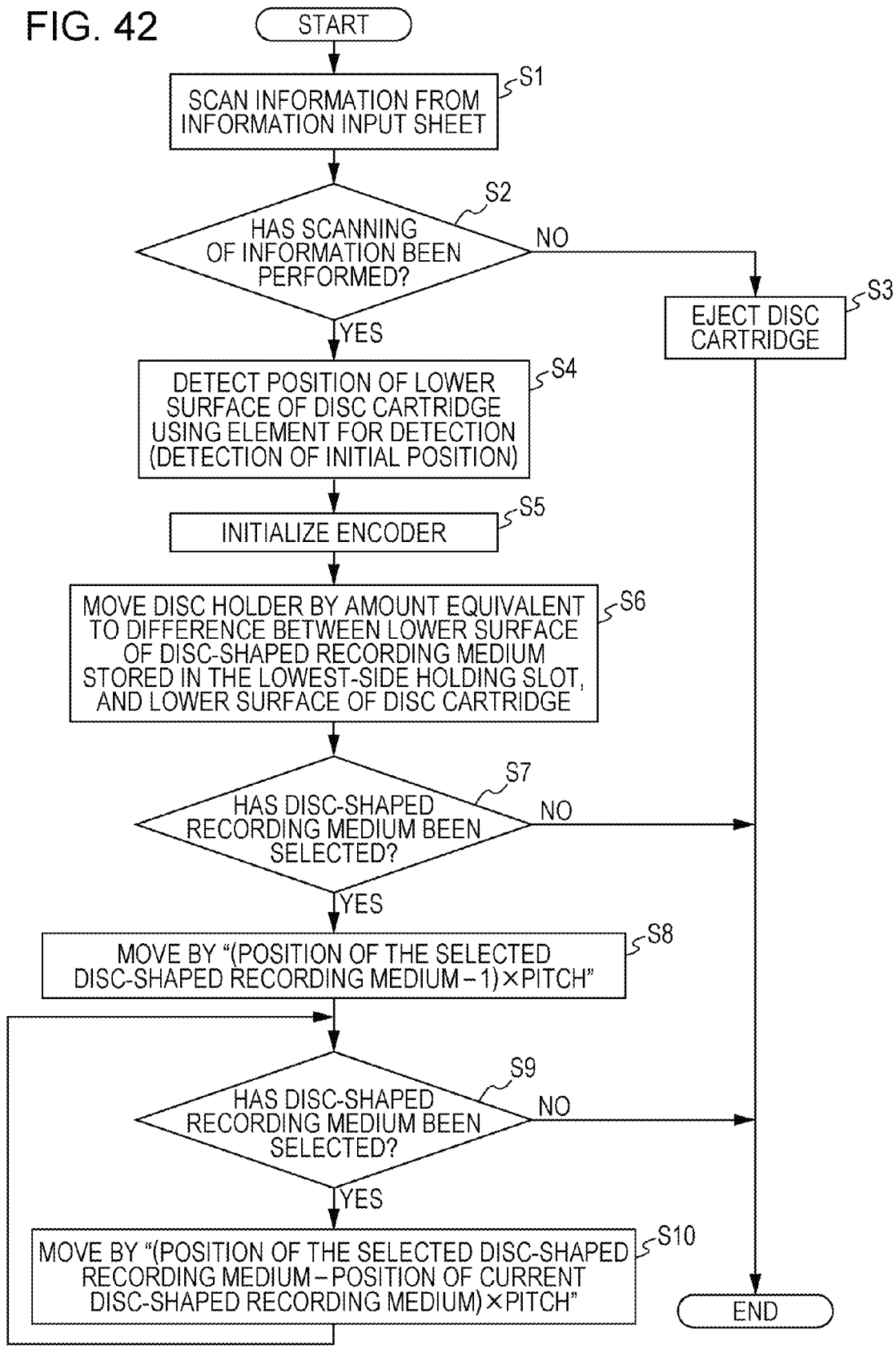
FIG. 42 is a flowchart illustrating the movement operation of the disc holder according to a movement mechanism.

Hereafter, description will be made regarding movement operation by the movement mechanism in the vertical direction of the lower holder 62 based on the information input to the information input sheet 32 (see FIG. 42).

Multiple patterns regarding relations between the number of disc-shaped recording media 100, stored in the disc cartridge 1 and the pitch between the disc-shaped recording media 100 are stored in unshown memory of the disc changer 40, and distance where the disc holder 60 is vertically moved is calculated according to the stored patterns, and the stop position of the disc holder 60 is determined.

(S1) Upon the disc cartridge 1 being inserted into the disc changer 40, as described above, information input to the information input sheet 32 adhered to the disc cartridge 1 is scanned by the scanning device. Accordingly, information regarding the pitch between the disc-shaped recording media 100 stored in the case body 2, the number of stored disc-shaped recording media 100, and so forth are scanned by the scanning device.

(S2) Detection is made regarding whether or not scanning of information has been performed by the scanning device. In the event that detection is made that scanning of information has not been performed, for example, in the event that no information is recorded in the information input sheet 32, or the like, the operation proceeds to (S3), and in the event that detection is made that scanning of information has been performed, the operation proceeds to (S4).

(S3) Ejection operation of the disc cartridge 1 is started, the disc cartridge 1 is ejected from the disc changer 40, and the operation ends.

(S4) In the event that the disc cartridge 1 has moved to the separation start position, as described above, the position of the lower face of the disc cartridge 1 is detected by the elements 56 for detection, and positional detection regarding the initial position is performed. The initial position is taken as a reference position when moving the disc holder 60 in the vertical direction, and determining the stop position of the disc holder 60.

(S5) The encoder is initialized.

(S6) Movement (descent) of the disc holder 60 is performed for a distance equivalent to difference between the lower face of the disc-shaped recording medium 100 held by the lowest side holding slots 29c formed in the case body 2, and the lower face of the second shell 4. This movement position is taken as the position of the disc-shaped recording medium 100 positioned most downward (the disc stop position of the first disc).

(S7) Detection is made regarding whether or not selection of the disc-shaped recording medium 100 to be ejected by the disc ejection mechanism has been performed. In the event that detection is made that selection of the disc-shaped recording medium 100 has not been performed, the operation ends. In the event that detection is made that selection of the disc-shaped recording medium 100 has been performed, the operation proceeds to (S8).

(S8) The disc holder 60 is moved for a distance obtained by multiplying a number obtained by subtracting 1 from the number of counts of the disc stop position of the selected disc-shaped recording medium 100 by the pitch, and is moved to a predetermined ejection position where the selected disc-shaped recording medium 100 is ejected from the disc ejection mechanism. This movement amount is calculated based on the information input to the information input sheet 32.

(S9) Detection is made regarding whether or not selection of the disc-shaped recording medium 100 to be ejected by the disc ejection mechanism has been performed. In the event that detection is made that selection of the disc-shaped recording medium 100 has not been performed, the operation ends. In the event that detection is made that selection of the disc-shaped recording medium 100 has been performed, the operation proceeds to (S10).

(S10) The disc holder 60 is moved for a distance obtained by multiplying a number obtained by subtracting the number of counts of the current disc stop position of the disc holder 60 from the number of counts of the disc stop position of the selected disc-shaped recording medium 100 by the pitch, and is moved to a predetermined ejection position where the selected disc-shaped recording medium 100 is ejected from the disc ejection mechanism. This movement amount is calculated based on the information input to the information input sheet 32.

As described above, with the disc changer 40, the stop position in the vertical direction of the disc holder 60 is determined based on the information input to the information input sheet 32.

Accordingly, the disc-shaped recording media 100 can be moved to a suitable stop position according to difference of the thickness or the number of stored disc-shaped recording media 100, and movement operation according to the type of the disc-shaped recording media 100, and the type of the disc cartridge 1 is enabled, whereby improvement in versatility can be realized.

Also, a predetermined position in the movement direction of the disc cartridge 1 or disc holder 60 is determined as the initial position in the movement direction of the disc holder 60, whereby detection of the initial position can readily be performed, and also the initial position can accurately be detected.

Further, the upper face or lower face of the disc cartridge 1 or disc holder 60 is determined as the initial position, whereby detection of the initial position can further readily be performed, and also the stop position of the disc holder 60 can accurately be calculated.

Moreover, as described above, in the event that the disc cartridge 1 has been inserted into and held at the disc holder 60, scanning of the information input to the information input sheet 32 is performed, whereby scanning of the information can be performed in the optimal position and at the optimal point-in-time.

Additionally, the information input sheet 32 adhered to the case body 2 of the disc cartridge 1 is employed as an information input mechanism, whereby scanning of the information can be performed by a simple mechanism without leading to runaway manufacturing costs.

Others

As the information to be input to the information input sheet 32, information relating to pitch between the disc-shaped recording media 100 to be stored in the case body 2, and the number of stored disc-shaped recording media 100 has been described above as an example. However, the types of disc-shaped recording media 100 to be stored in the disc cartridge 1 may be input to the information input sheet 32.

Examples of information regarding the types of the disc-shaped recording media 100 include different types of formats such as CD (Compact Disc), DVD (Digital Versatile Disc), BD (Blu-ray Disc), or the like, different types of functions such as only for playback, recordable/playable, or the like, different types of recording capacity such as simplex recording or duplex recording, and different types of thicknesses.

In the event that information regarding the types of the disc-shaped recording media 100 is input to the information input sheet 32, these different types of multiple disc-shaped recording media 100 are stored in the disc cartridge 1, and according to the types of the disc-shaped recording media 100 to be stored, different types of drive units 88 may be disposed (see FIG. 43).

With such a disc changer 40A, when a portion where the disc holder 60 is moved upward, downward, forward, or backward is taken as a holder movement portion 89, the drive units 88 are disposed by being arrayed vertically in font of the holder movement portion 89.

For example, DVDs and BDs are stored in the disc cartridge 1 in a mixed manner as the disc-shaped recording media 100, and one of the drive units 88 is configured to perform recording or playback as to the DVDs, and the other drive unit 88 is configured to perform recording or playback as to the BDs.

With the disc changer 40A, in the event that the disc cartridge 1 has been held at the disc holder 60, and the disc holder 60 has been moved to the separation start position, information input to the information input sheet 32 is scanned by an unshown scanning device. Accordingly, the scanning device scans regarding what kind of disc-shaped recoding media 100 is stored in which holding slot 29c.

At this time, upon a recording command or playback command regarding a particular disc-shaped recording medium 100 stored in the disc cartridge 1 having been issued by the user's operation, this disc-shaped recording medium 100 is pulled out from the disc cartridge 1, this disc-shaped recording medium 100 is mounted on the drive unit 88 corresponding to the type of the pulled out disc-shaped recording medium 100, and recording or playback operation is performed.

As described above, an arrangement is made so that the drive units 88 arrayed in the vertical direction are disposed, and the disc-shaped recording medium 100 is mounted on the drive unit 88 of which the type corresponds to the type thereof based on the information input to the information input sheet 32, whereby recording or playback can be performed as to multiple types of disc-shaped recording media 100 at the disc changer 40A.

Accordingly, the disc changer 40A has wider application, whereby improvement in usability can be realized.

Note that, with the above description, an example has been illustrated wherein the two types of disc-shaped recording media 100 are stored in the disc cartridge 1, but the types of disc-shaped recording media 100 to be stored in the disc cartridge 1 are not restricted to two types, and may be three types or more. In this case, drive units 88 of which the number corresponding to the number of types should be disposed.

The specific shape and configuration of each portion illustrated in the above preferred embodiment are only specific examples at the time of implementing the present invention, and the technical scope of the present invention should not be interpreted thereby in a restrictive manner.

The present application contains subject matter related to that disclosed in Japanese Priority Patent Application JP 2010-123337 filed in the Japan Patent Office on May 28, 2010 and Japanese Priority Patent Application JP 2010-251269 filed in the Japan Patent Office on Nov. 9, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc changer comprising:
a disc cartridge comprising:
  a case body in which a plurality of disc-shaped recording media of different thicknesses are storable by being arrayed in an axial direction of the center axis; and
  information input medium to which at least information relating to said different thicknesses of said plurality of disc-shaped recording media, and a number of stored disc-shaped recording media associated with each of said different thicknesses is input;
a disc holder configured to hold the disc cartridge, wherein a portion of said disc holder is moveable in a center axial direction of said plurality of disc-shaped recording media; and
a movement mechanism comprising an encoder, configured to determine a stop position in said center axial direction of said disc holder based at least in part on said at least information input to said information input medium.

2. The disc changer according to claim 1, wherein a predetermined position in a movement direction of said disc cartridge or said disc holder is determined as an initial position in said movement direction of said disc holder.

3. The disc changer according to claim 2, wherein an edge face in said movement direction of said disc cartridge is determined as said initial position.

4. The disc changer according to claim 1, wherein said disc cartridge is inserted into and held at said disc holder; and wherein scanning of information input to said information input medium is performed when said disc cartridge is inserted into and held at said disc holder.

5. The disc changer according to claim 1, wherein an information input sheet is adhered to a surface of said case body of said disc cartridge as said information input medium.

6. The disc changer according to claim 1, further comprising:
a holder movement portion where said disc holder is moved in at least said center axial direction; and
a plurality of drive units, wherein said plurality of disc-shaped recording media stored in said disc cartridge held in said disc holder which is moved in said holder movement portion are ejected in a direction orthogonal to said center axial direction from said disc cartridge, and are mounted thereupon;
wherein different types of said plurality of disc-shaped recording media are storable in said disc cartridge, and said plurality of drive units are each taken as different types according to said different types of said plurality of disc-shaped recording media, and also disposed arrayed in said center axial direction; and
wherein each of said plurality of disc-shaped recording media is mounted on a predetermined said drive unit based at least in part on information input to said information input medium.

7. The disc changer according to claim 1, wherein said movement mechanism comprises one or more driving motors and one or more reduction gear groups for moving said portion of said disc holder.

8. The disc changer according to claim 1, wherein said information input medium comprises one or both of a barcode printed on said case body or a recording chip embedded in said case body.

9. A method to operate a disc changer comprising:
storing, in a disc cartridge in said disc changer, a plurality of disc-shaped recording media of different thicknesses arranged in an axial direction of the center axis;
receiving at least information relating to said different thicknesses of said plurality of disc-shaped recording media, and a number of stored disc-shaped recording media associated with each of said different thicknesses; and
determining a stop position in a center axial direction of a disc holder holding said disc cartridge based at least in part on said at least information, wherein a portion of said disc holder is moveable in said center axial direction of said plurality of disc-shaped recording media.

10. The method to operate a disc changer according to claim 9, further comprising determining a predetermined position in a movement direction of said disc cartridge or said disc holder as an initial position in said movement direction of said disc holder.

11. The method to operate a disc changer according to claim 10, wherein an edge face in said movement direction of said disc cartridge is determined as said initial position.

12. The method to operate a disc changer according to claim 9, wherein said stop position is determined by a movement mechanism that comprises an encoder.

13. The method to operate a disc changer according to claim 9, wherein said at least information is received from an information input sheet adhered to a surface of a case body of said disc cartridge as an information input medium.

14. The method to operate a disc changer according to claim 13, wherein said at least information is received from said information input sheet through a scanning device.

15. The method to operate a disc changer according to claim 14, wherein said information input medium comprises one or both: of a barcode printed on said case body or a recording chip embedded in said case body.

* * * * *